United States Patent
Hennon

(10) Patent No.: US 11,592,123 B2
(45) Date of Patent: Feb. 28, 2023

(54) SLOPE ADJUSTING AND LOCKING PIPE HANGER

(71) Applicant: John Hennon, Wall, NJ (US)

(72) Inventor: John Hennon, Wall, NJ (US)

( * ) Notice: Subject to any disclaimer, the term of this patent is extended or adjusted under 35 U.S.C. 154(b) by 0 days.

(21) Appl. No.: 16/843,933

(22) Filed: Apr. 9, 2020

(65) Prior Publication Data

US 2020/0326019 A1   Oct. 15, 2020

Related U.S. Application Data

(60) Provisional application No. 62/831,213, filed on Apr. 9, 2019.

(51) Int. Cl.
*F16L 3/16* (2006.01)
*F16L 3/10* (2006.01)

(52) U.S. Cl.
CPC .............. *F16L 3/16* (2013.01); *F16L 3/1091* (2013.01)

(58) Field of Classification Search
CPC ............. F16L 3/16; F16L 3/1091; F16L 3/11
USPC ........................................................ 248/70
See application file for complete search history.

(56) References Cited

U.S. PATENT DOCUMENTS

| | | | | |
|---|---|---|---|---|
| 675,106 | A * | 5/1901 | Oberle | F16L 3/26 403/90 |
| 6,676,704 | B1 * | 1/2004 | Pope | A61F 2/32 623/18.11 |
| 2003/0147688 | A1 * | 8/2003 | Hathaway | F16C 11/0619 403/90 |
| 2004/0227049 | A1 * | 11/2004 | Lang | B60R 1/066 248/476 |
| 2014/0346291 | A1 * | 11/2014 | Booth | F16L 3/1091 248/74.4 |
| 2016/0235539 | A1 * | 8/2016 | Overes | A61F 2/40 |
| 2018/0264630 | A1 * | 9/2018 | Short | F16L 3/20 |

FOREIGN PATENT DOCUMENTS

DE    10211212 A1 *   9/2003   .......... B25J 19/0025

* cited by examiner

*Primary Examiner* — Muhammad Ijaz
(74) *Attorney, Agent, or Firm* — Z IP Law PLLC

(57) ABSTRACT

A slope adjusting and locking pipe hanger, and more particularly, a bracket style pipe hanger that includes a plastic or elastomeric insert that is configured to be rotated to a specified angle to adjust, align and secure a pipe at a percentage of slope to place at an angle for gravity drainage and to a series of interlocking tongue and groove ridges and indentations to adjust and secure the percentage slope of a pipe in place for gravity drainage. The pipe hanger provides for supporting a pipe in either a horizontal or vertical orientation along a ceiling, floor, wall, panel or equipment frame. The pipe hanger further provides a smooth contact surface to prevent bacterial build-up and other contaminants from collecting. The pipe hanger is therefore suitable for use in sterile clean room environments.

20 Claims, 46 Drawing Sheets

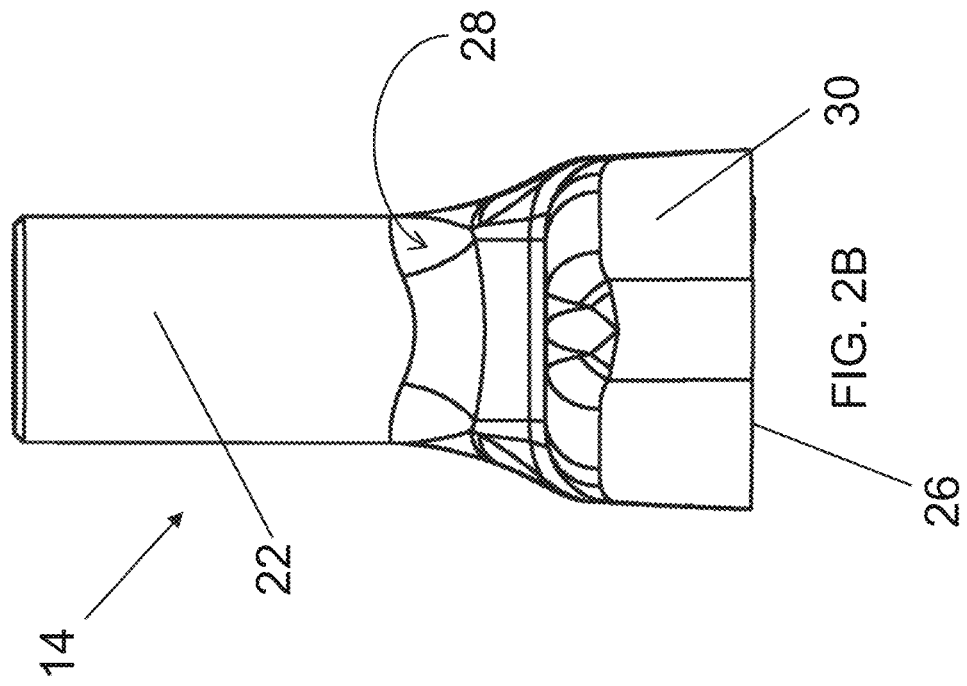
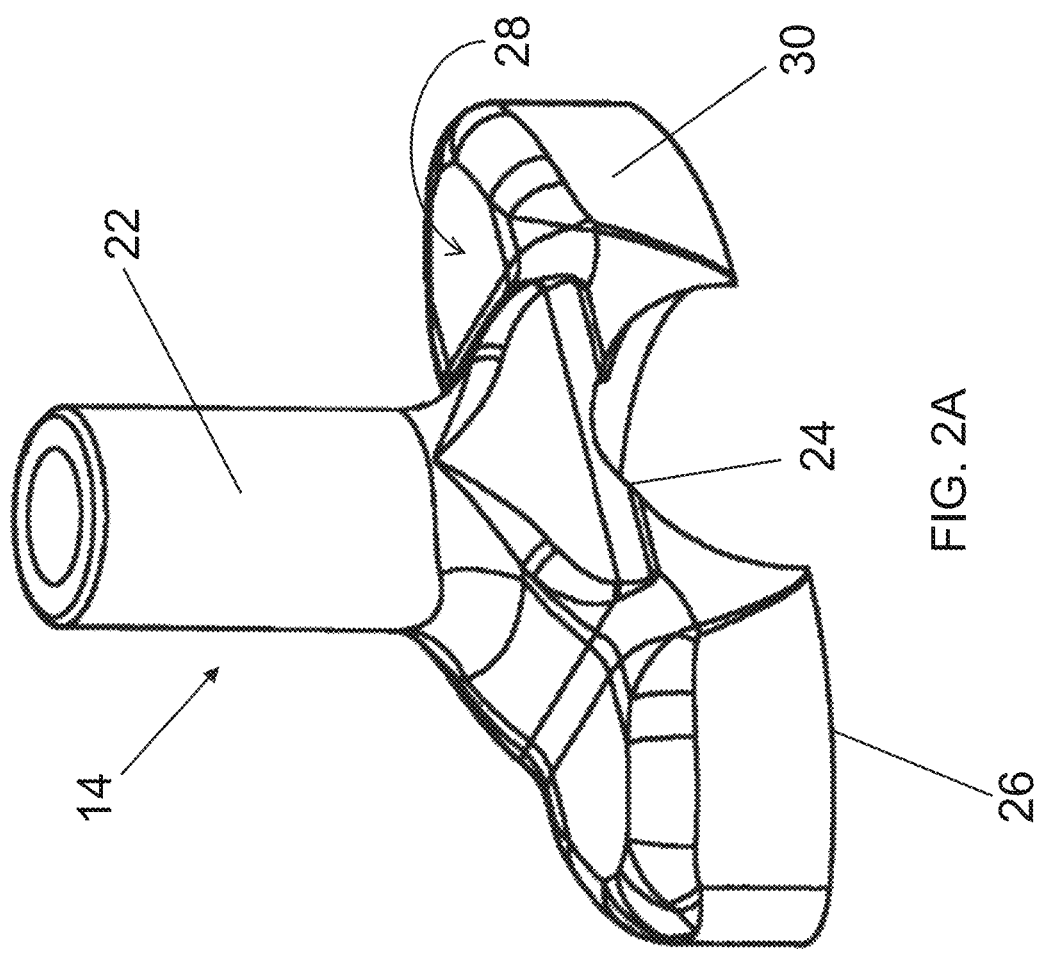

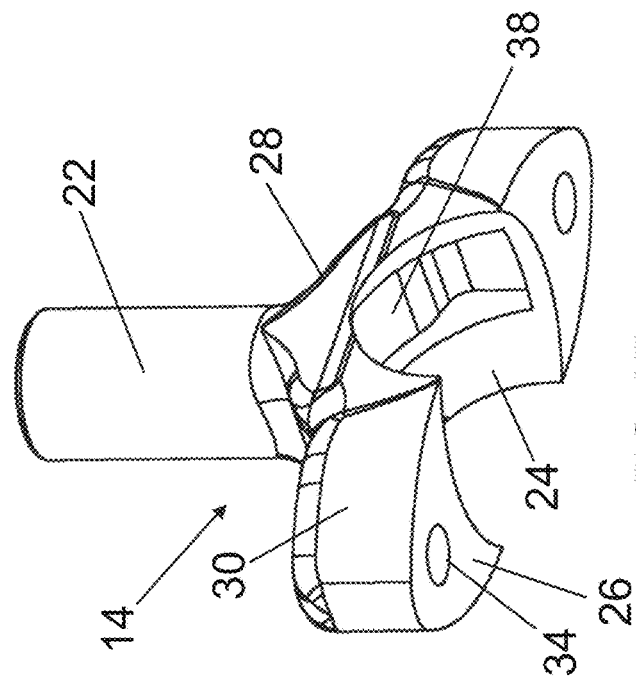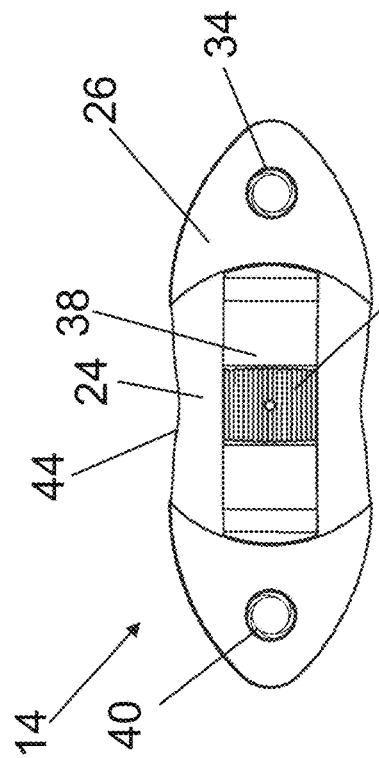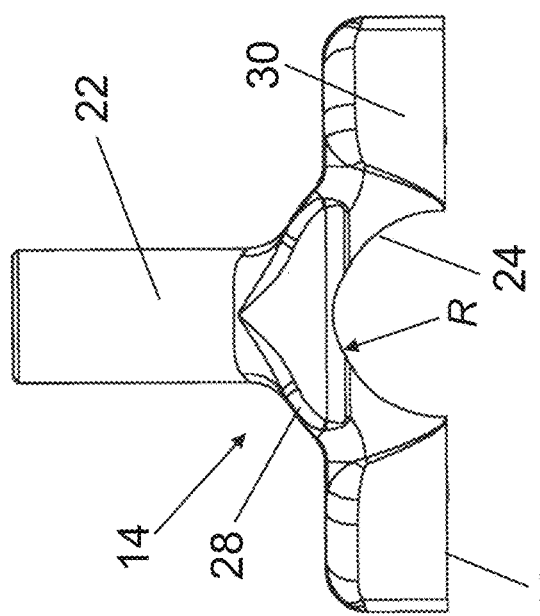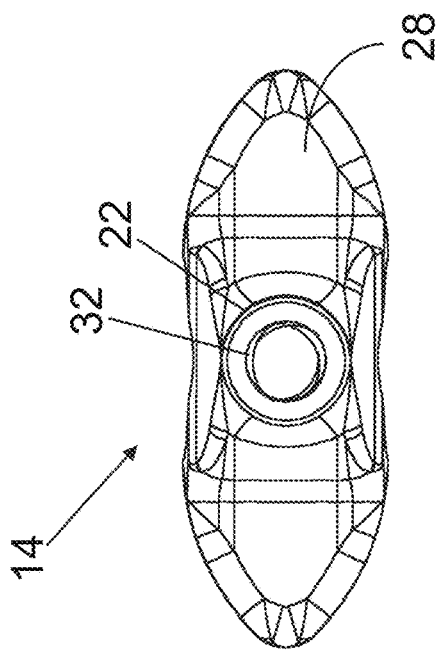

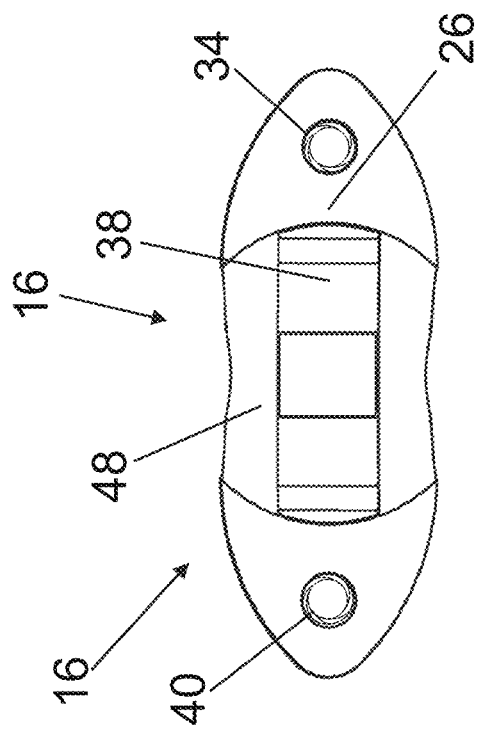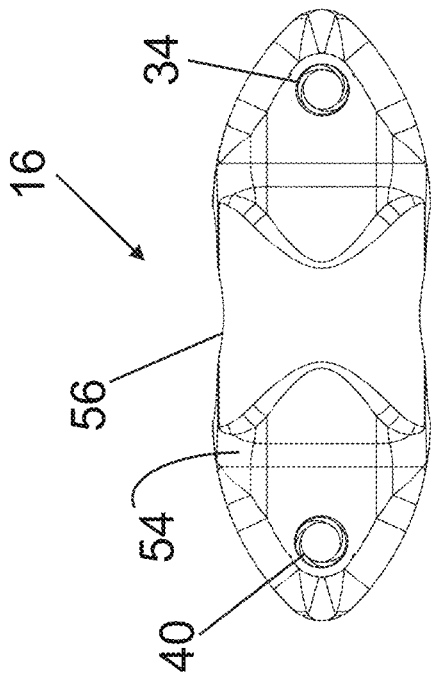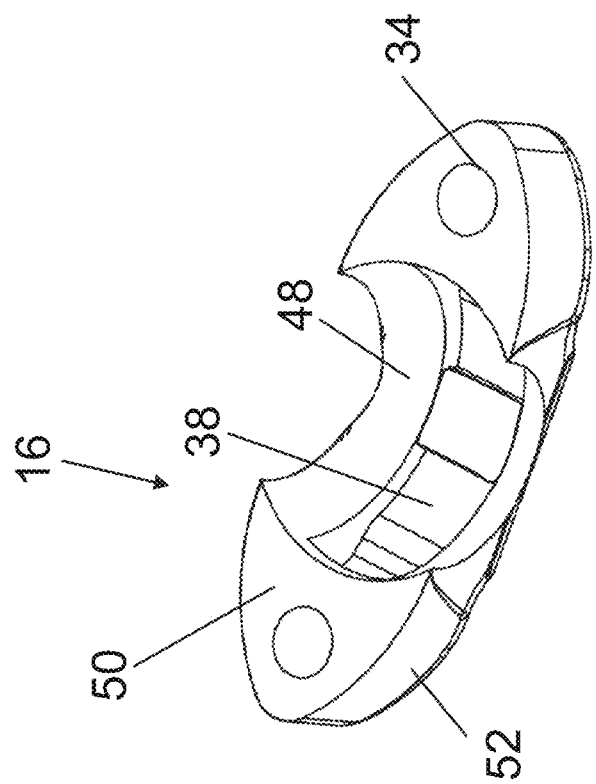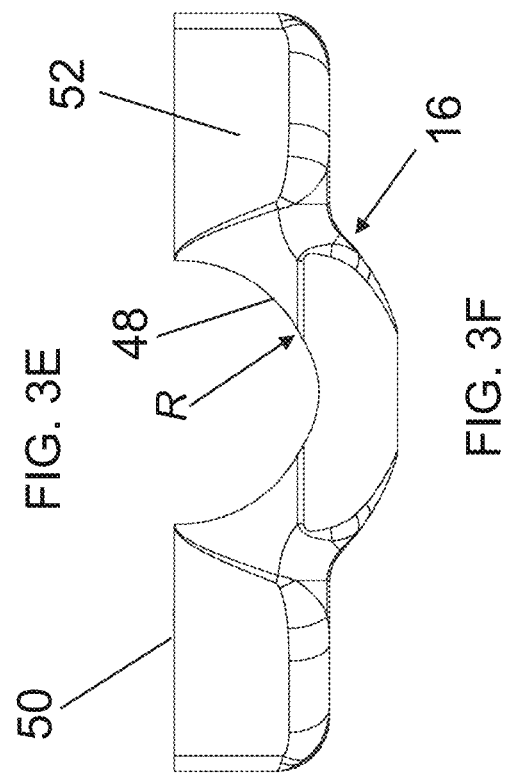

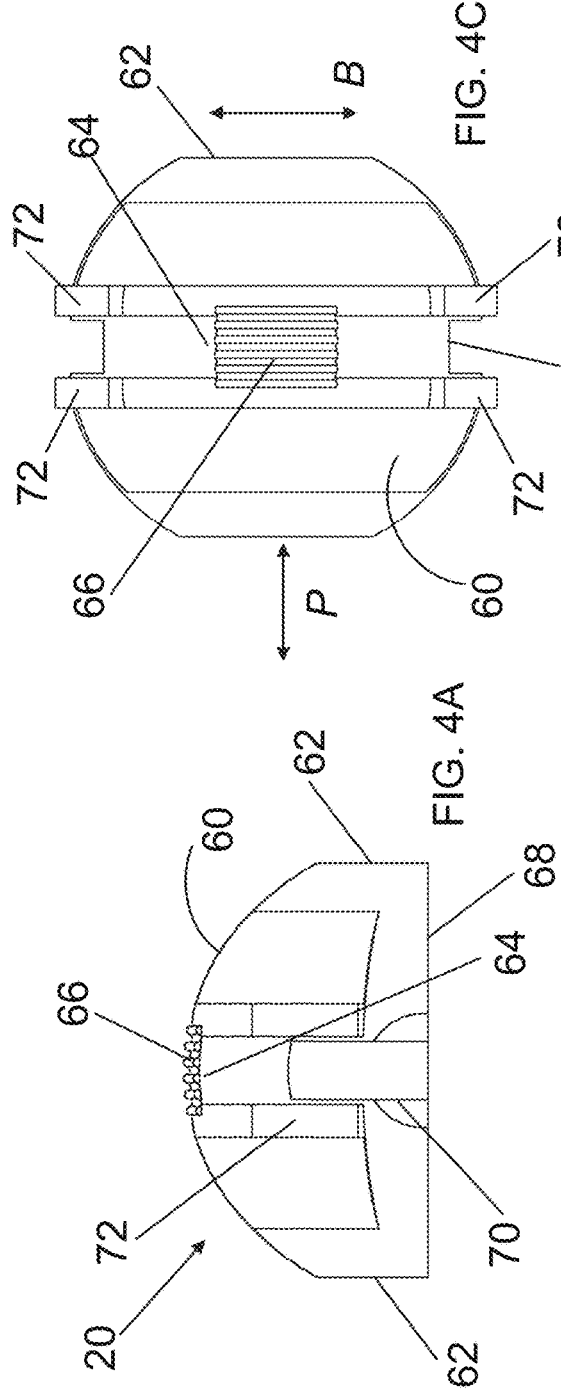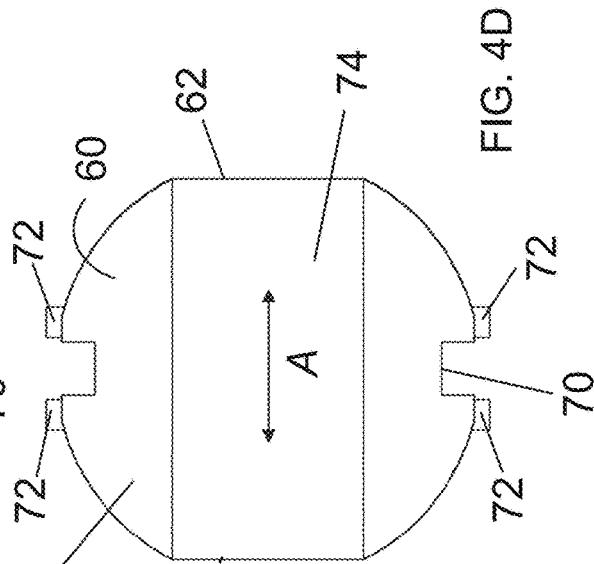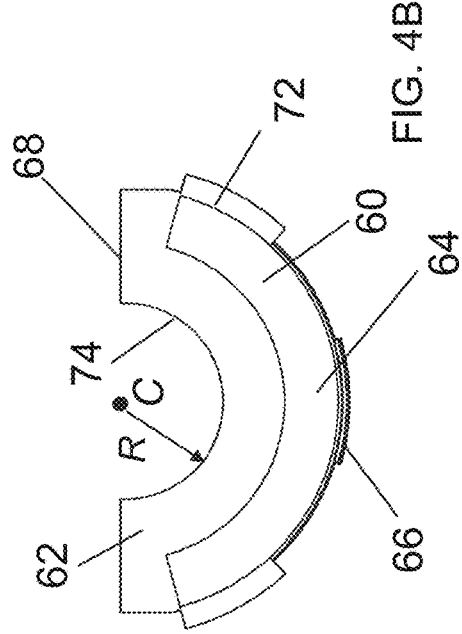

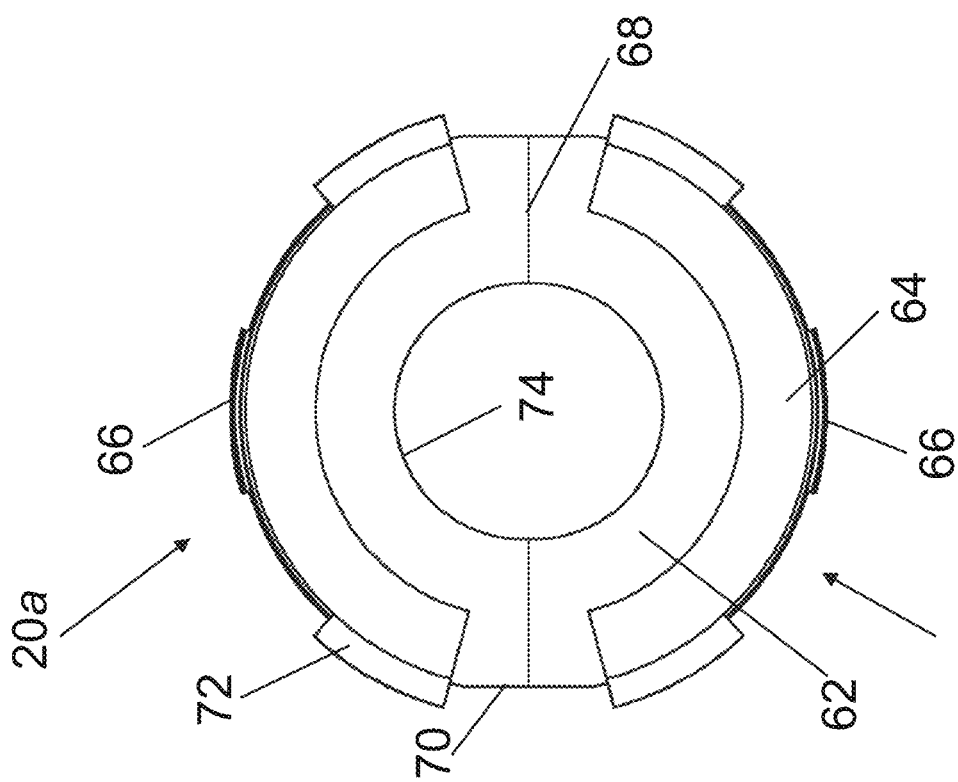
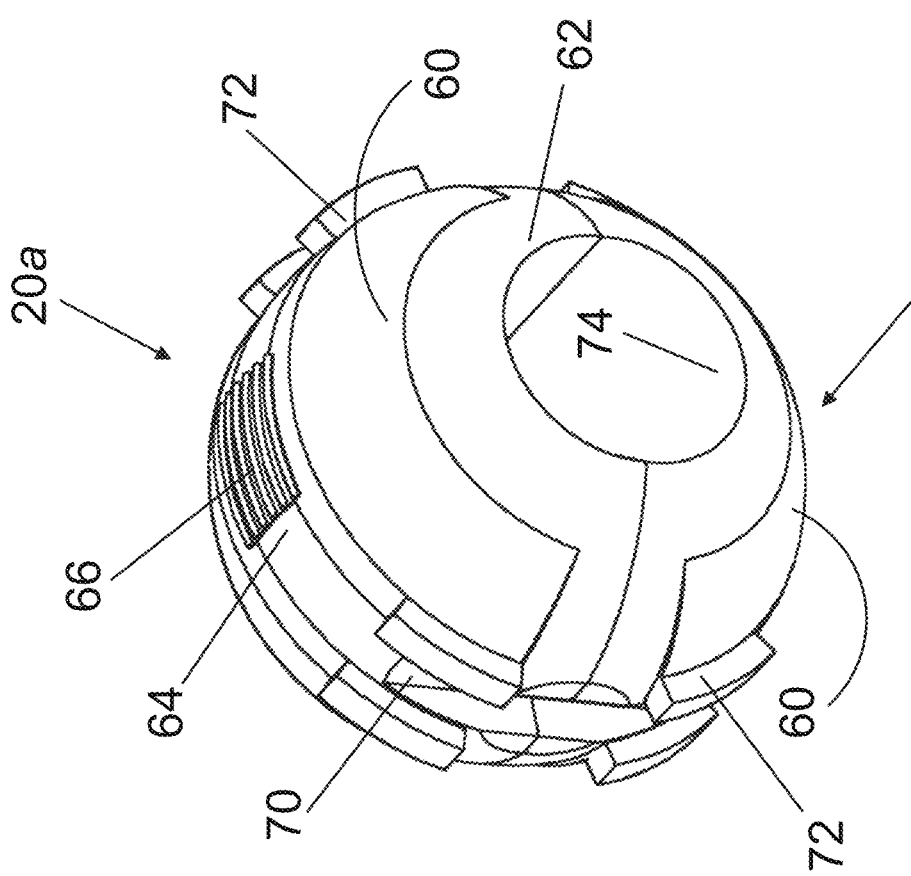

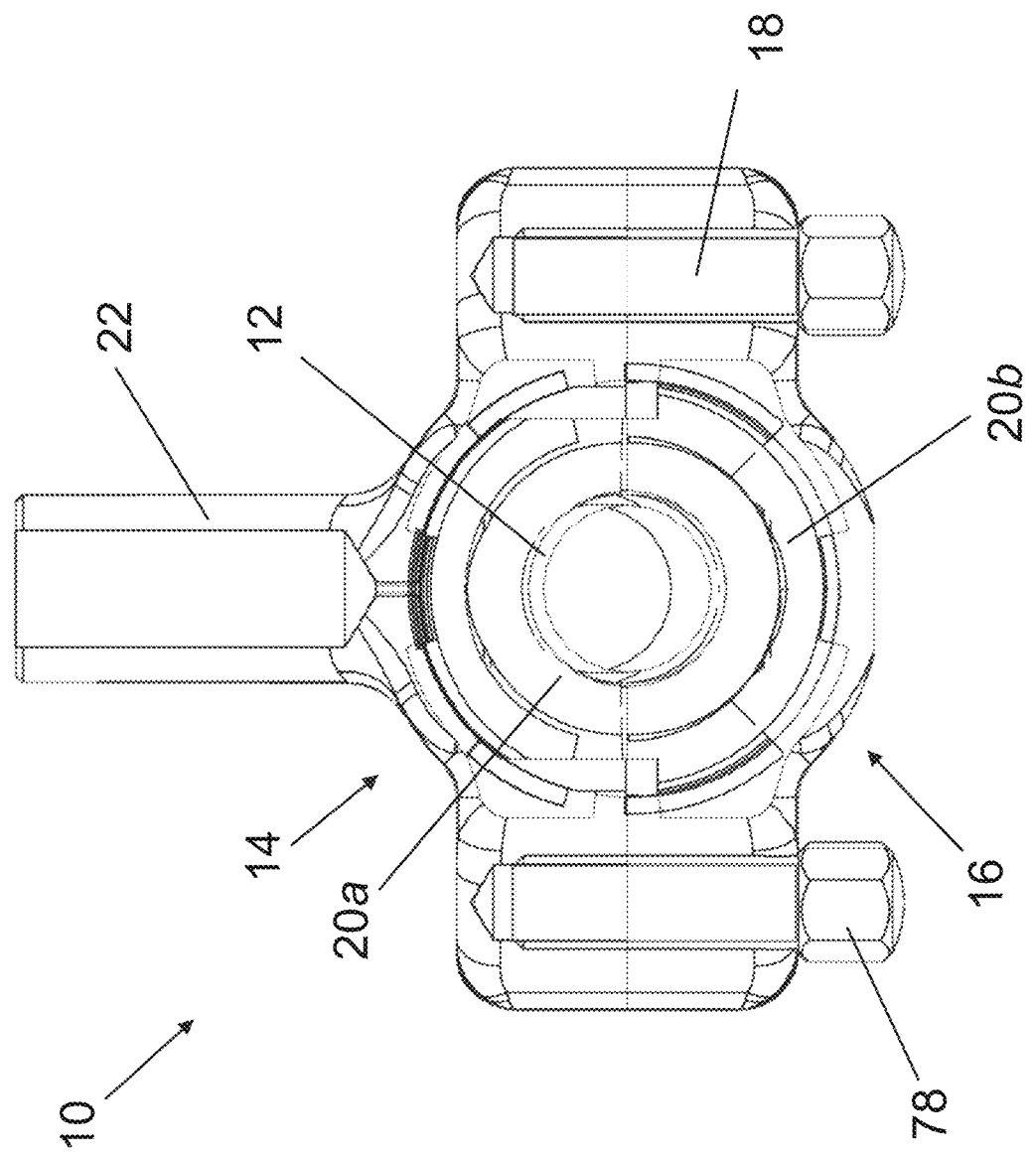

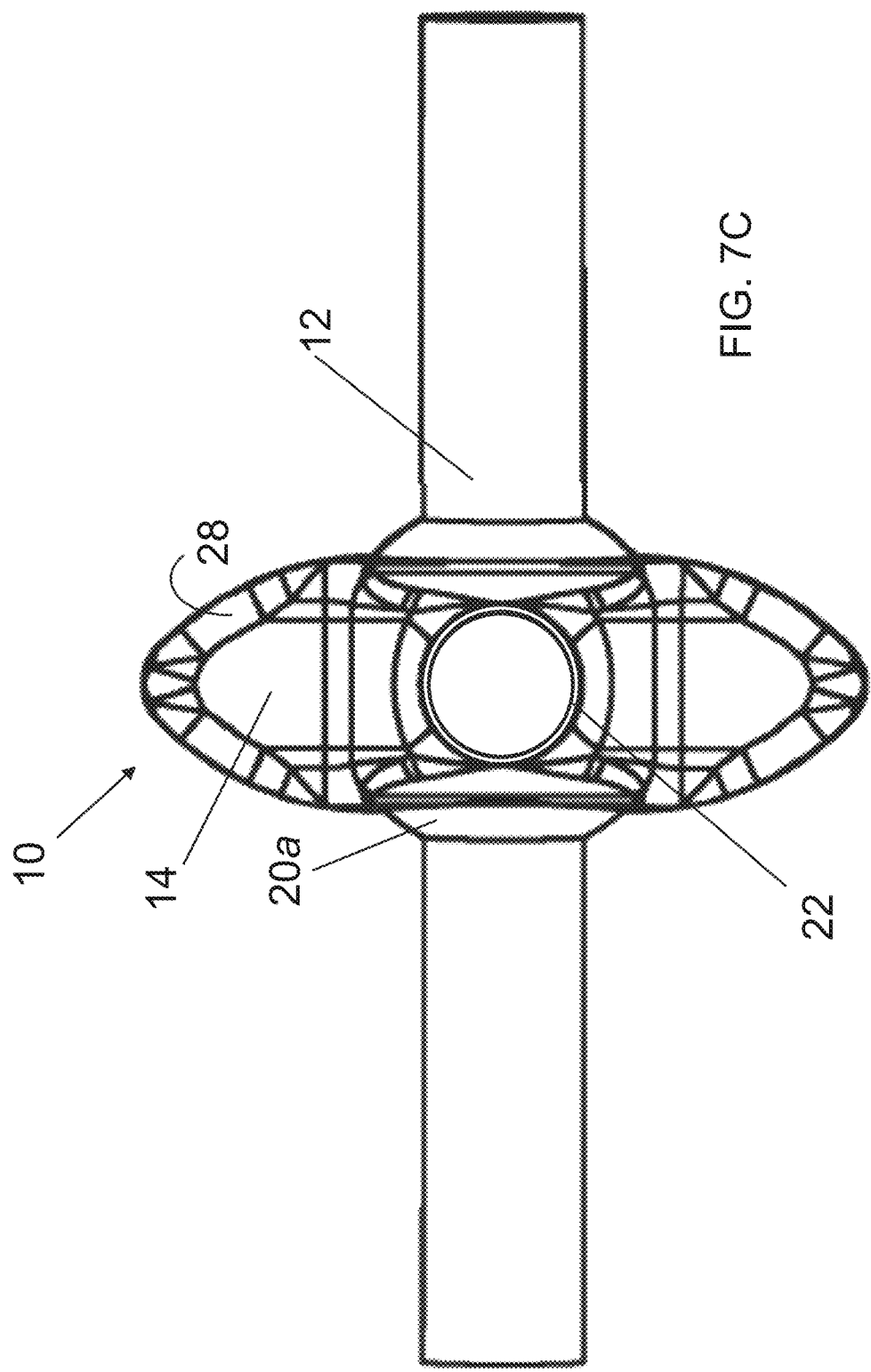

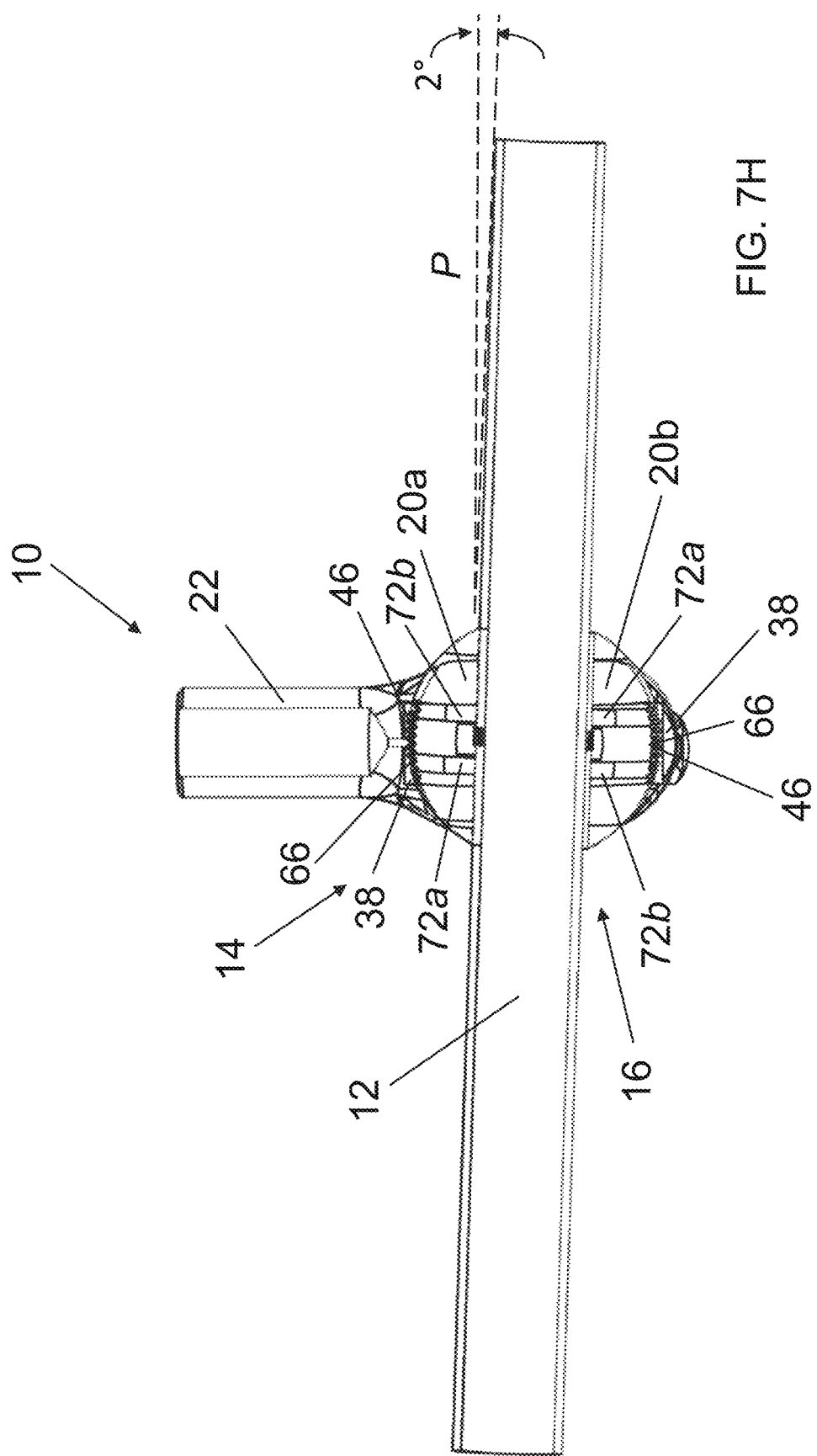

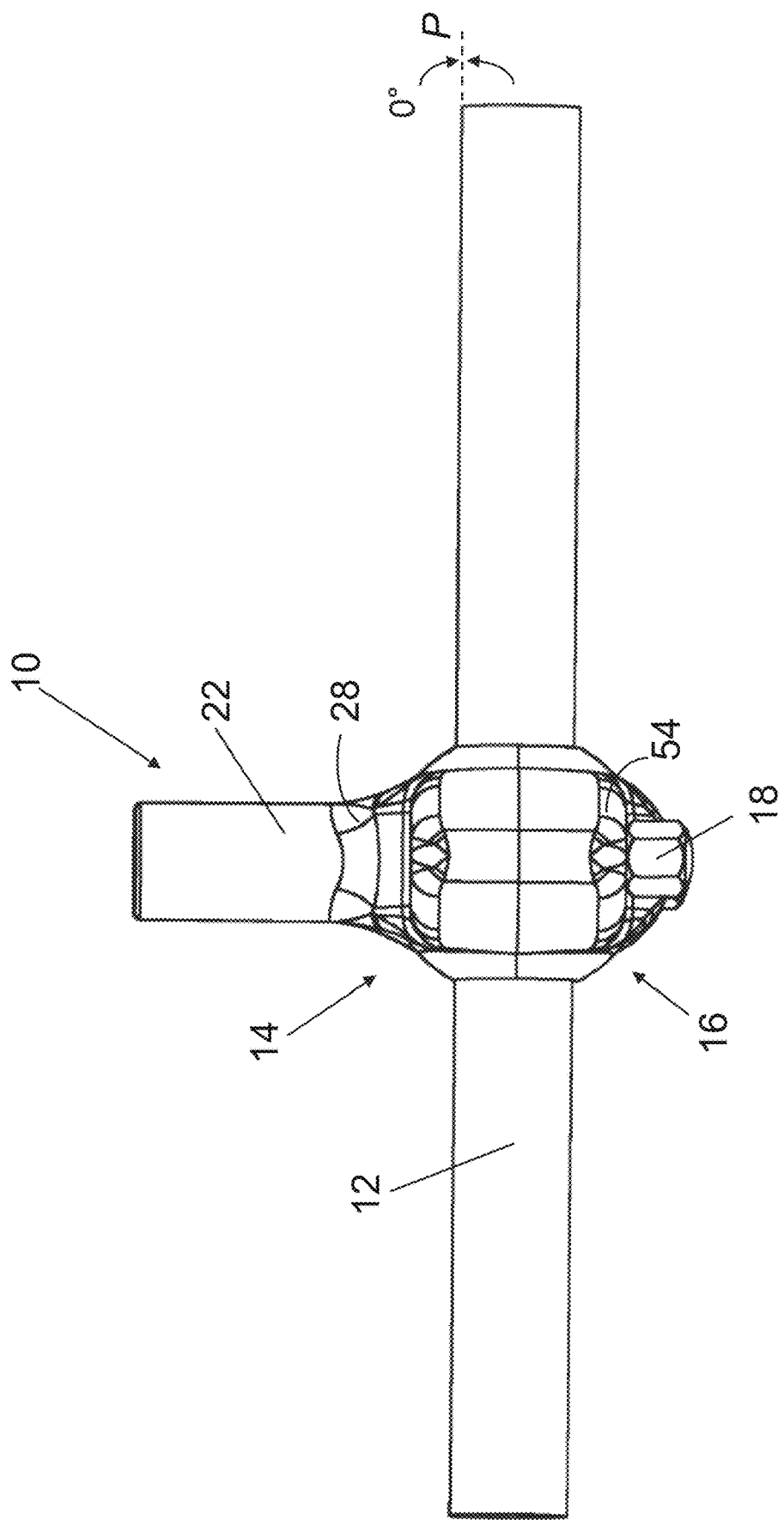

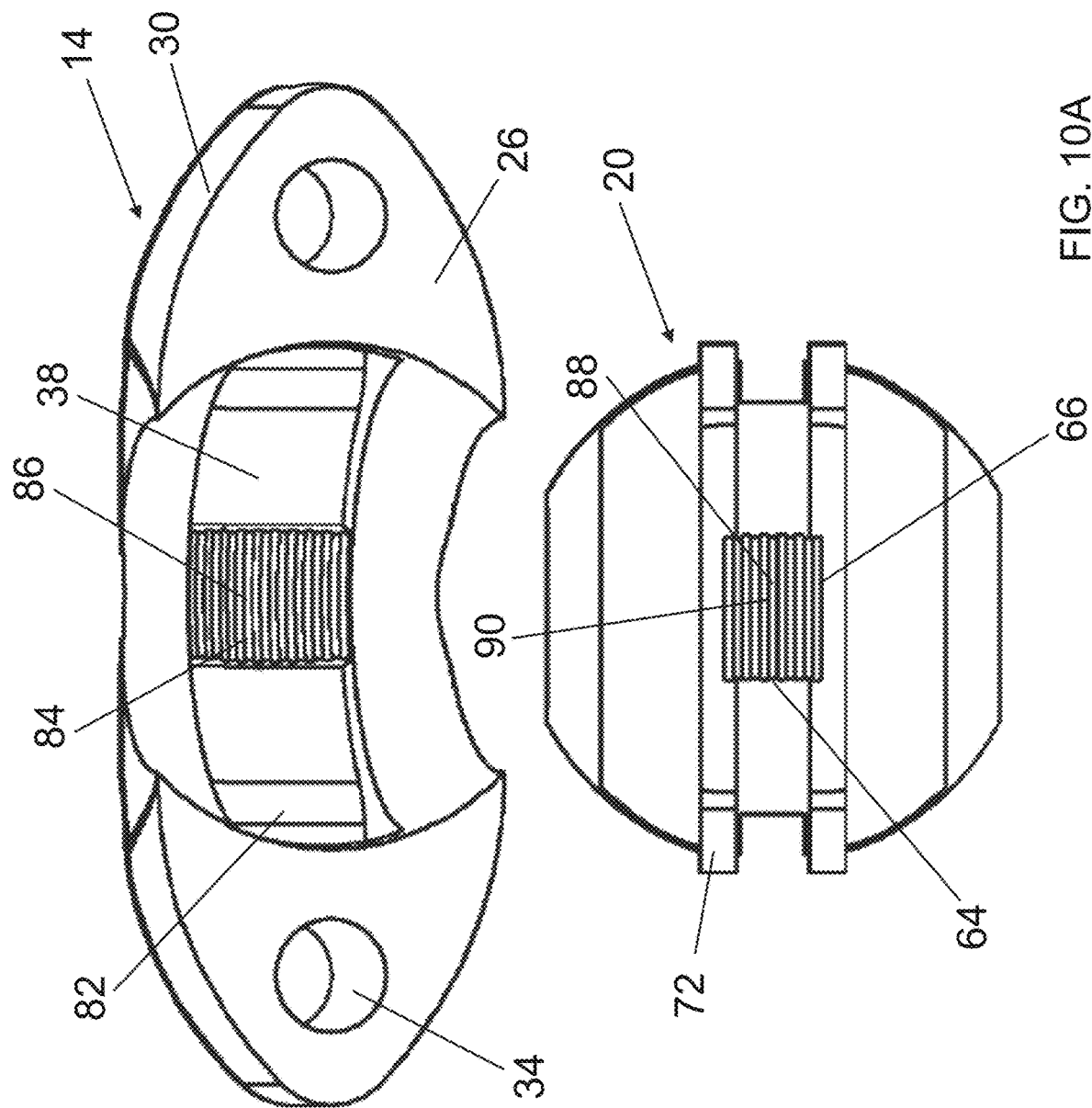

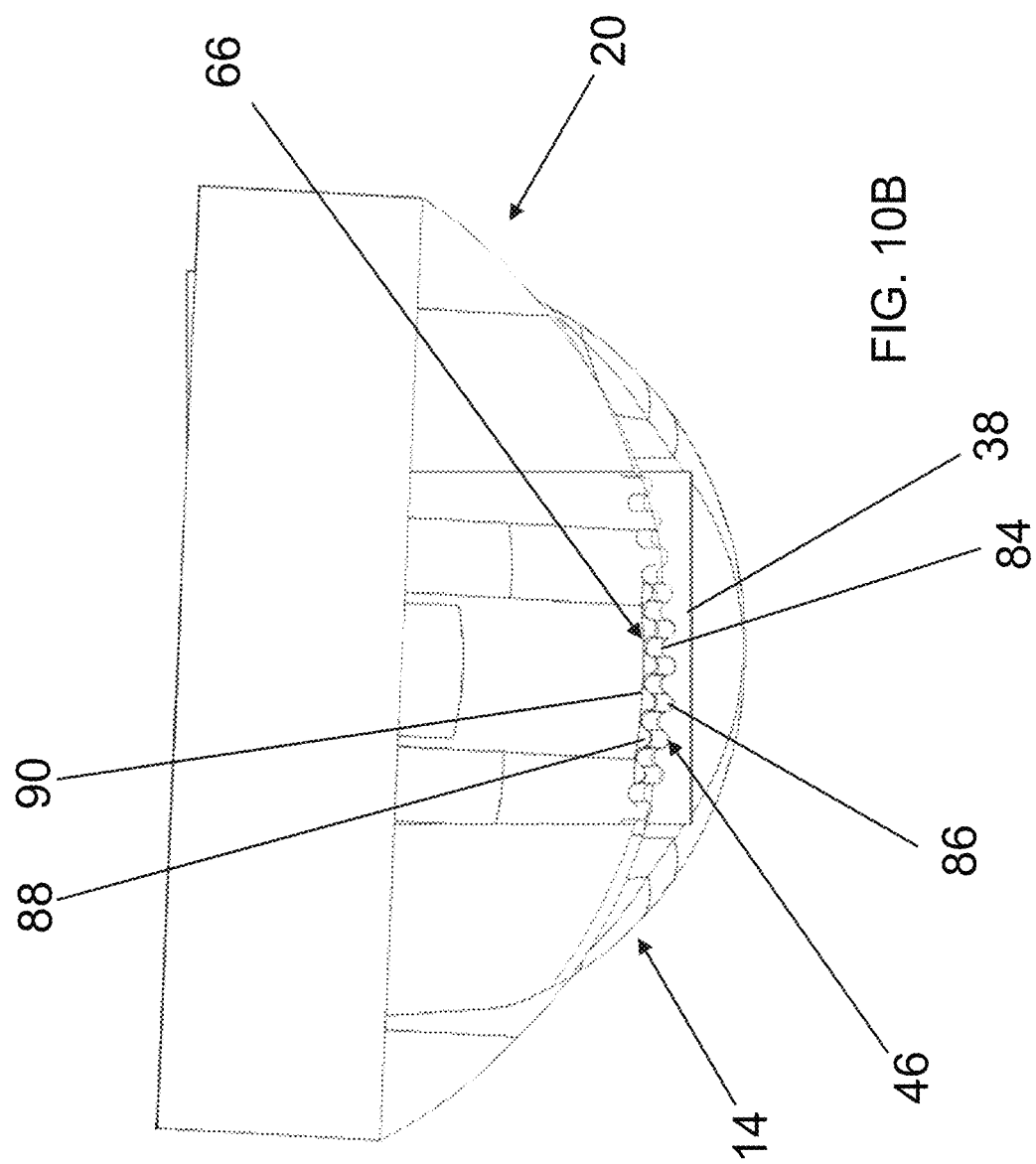

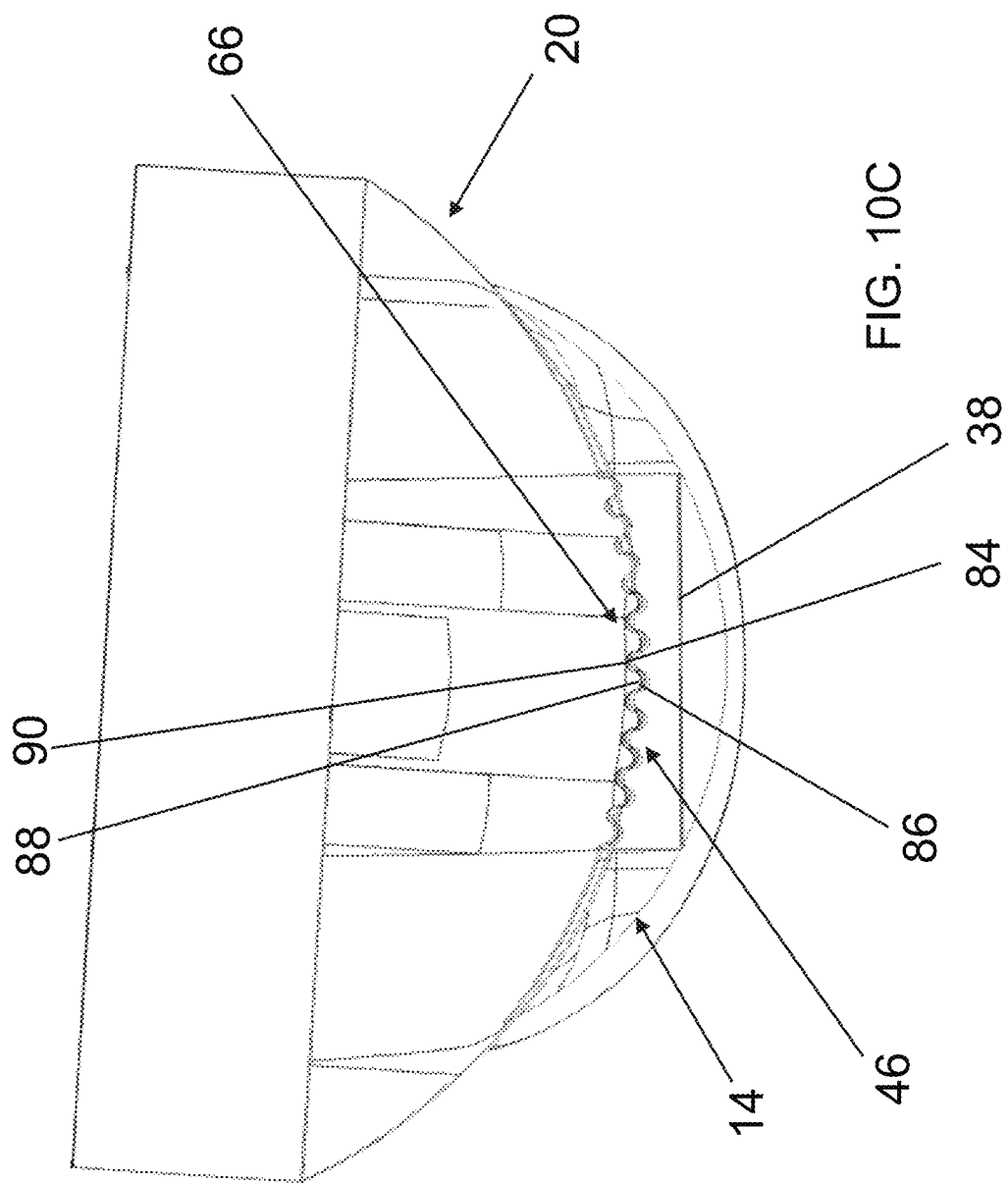

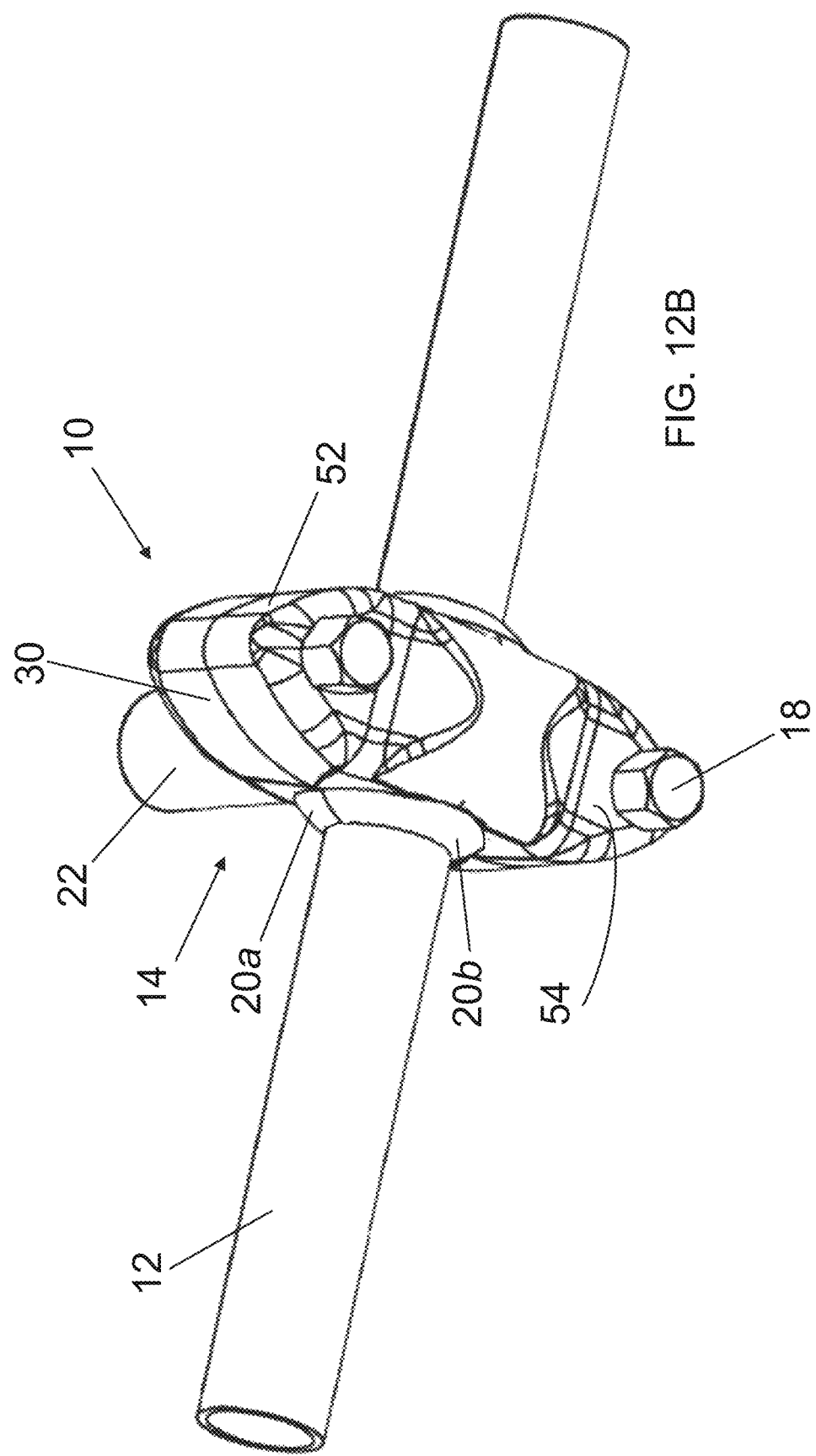

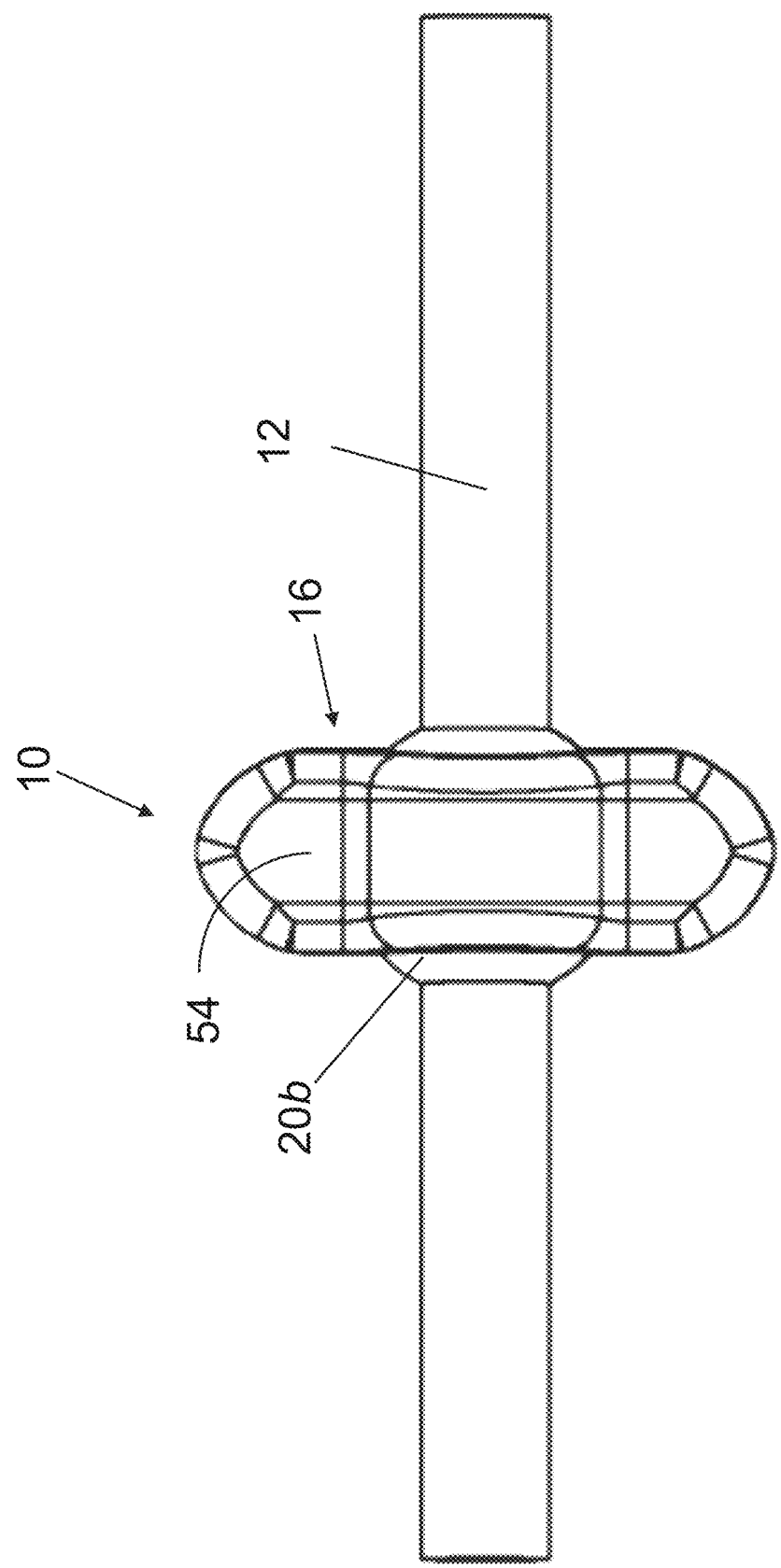

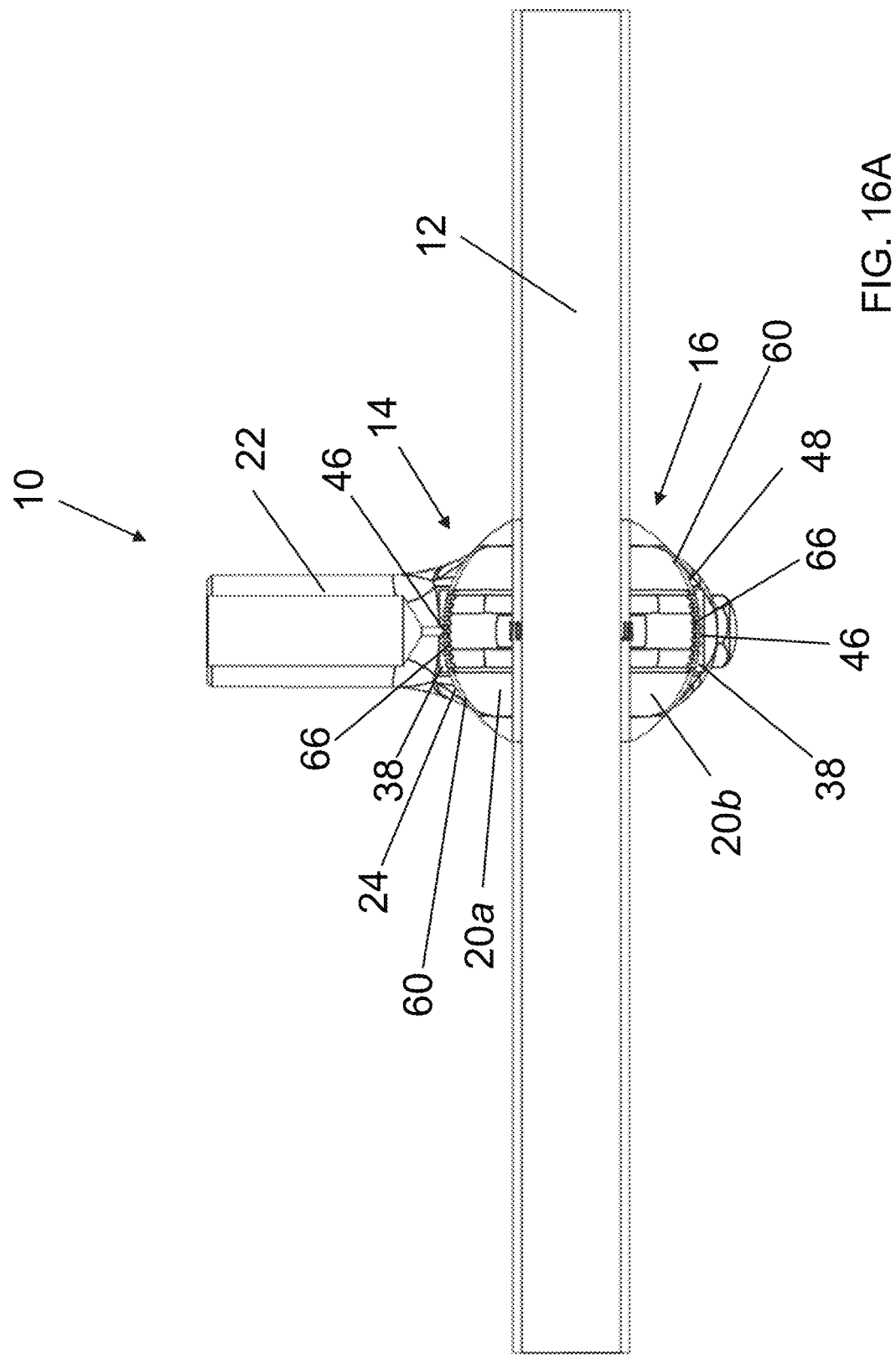

SLOPE ADJUSTING AND LOCKING PIPE HANGER

RELATED PATENT APPLICATION

This application claims the benefit of pending U.S. Provisional Patent Application No. 62/831,213 filed Apr. 9, 2019 entitled SLOPE ADJUSTING AND LOCKING PIPE HANGER which is hereby incorporated herein by reference in its entirety.

FIELD OF THE INVENTION

The present invention relates to a slope adjusting and locking pipe hanger, and more particularly, to a bracket style pipe hanger that includes a plastic or elastomeric insert that pivots to adjust the slope of a pipe for gravity drainage and a series of interlocking tongue and groove ridges and indentations to lock the percentage of slope in place. The pipe hanger provides for supporting a pipe in either a horizontal or vertical orientation along a ceiling, floor, wall, panel or equipment frame. The pipe hanger further provides a smooth contact surface to prevent bacterial build-up and other contaminants from collecting. The pipe hanger is therefore suitable for use in sterile clean room environments.

BACKGROUND OF THE INVENTION

With respect to industrial facilities, especially those in which clean rooms, sanitary and sterile environments are critical to the manufacturing process. The known pipe supports are configured to have a smooth contact surface to prevent bacterial build-up and other contaminants from collecting. Within these industrial manufacturing facilities, such as in the food, dairy, beverage, chemical, personal care, bioprocessing, and pharmaceutical manufacturing industries, standard piping and tubing that transport liquids must be set up to a percentage slope of 2% to provide for gravity drainage for the purpose of bioburden control and cleaning, gravity is an effective way to facilitate drainage. The percentage slope is calculated using the following chart that includes the slope designation used in specific industries and relationship of the percentage slope to inch/foot and millimeter per meter.

| Designation | Slope % | Slope in/ft | Slope mm/m | Slope Degree |
|---|---|---|---|---|
| GSD1 | 0.50 | 1/16"/ft | 5 mm/m | 0.29 |
| GSD2 | 1.00 | 1/8"/ft | 10 mm/m | 0.57 |
| GSD3 | 2.00 | 1/4"/ft | 20 mm/m | 1.15 |

In the prior art, certain pipe supports are built with a swivel affixed to the pipe hanger to self-adjust to the pipe at the specified up to 2% slope required by industrial standards in these industries. The swivel is attached between an anchor securing the pipe hanger to a ceiling, wall or floor and a bracket that supports the pipe. In some embodiments of the prior art, the swivel is formed with a metal ball attached to the end of the anchor and a metal socket at the top of the bracket to provide for the bracket to rotate and rock to at least 2% slope and be held using friction at the specific percentage of slope required for alignment of the piping. This swivel type pipe hanger does not have a locking mechanism. A weld is sometimes used to lock the self-adjusting hanger housing to the hanger rod. This process adds costs, is not routine and needs to be specified by the client. Adjustments to the aligned percentage of slope of the bracket overtime may expose previously protected surfaces that may be a source of bacterial build-up and collecting of contaminants, posing a risk in a sterile clean room environment. Swivel type pipes hanger's and swiveling and rocking may also be a cause of swaying, cracking, or other failures particularly in trapeze style hanger support assemblies that suspend multiple pipes, tubes, and conduits often with as many as ten lines supported by the structure. The support consists of parallel vertical rods that are suspended from a ceiling or other structure setup in succession to support the multiple conduits. The trapeze hanger assembly is used where longitudinal movement from expansion or contraction due to thermal cycling may occur which may cause swaying of the hanger assembly and piping. This swaying causes movement at the metal ball to metal sockets of each swivel type hanger and added stress to non-swiveling hanger supports also on the trapeze. Over time the load of the pipe and its contents and the swaying can cause galling and seizing between the metals which may cause the trapeze assembly to become locked at unconventional angles, possibly causing diminished structural strength and creating undue stress on any line supported by the trapeze structure by non-swiveling hangers or supports. A seized hanger supporting a thin walled pipe, stainless steel or copper tube may crack or rupture due to the trapezes swaying stress and cause the contents from the pipe to leak.

Other pipe hangers of the prior art may conform to a specified of up to 2% slope by cutting the end of a rod used to connect the hanger's housing to a wall, ceiling, structure or floor at an angle to match the percentage slope and have the hanger support the pipe at this angle. This process creates added expense, is not accurate and reduces the hangers load baring structural capacity. Costs are also added to an installation because both standard pipe hangers that align piping at a 0 percent of slope and the required number of angled pipe hangers that align piping at the required percentage slope must be purchased to meet the installation specifications of a sterile facility. A ridged hanger with a 0 percent slope or not matching the specified slope may cause stress on the piping.

SUMMARY OF THE INVENTION

The present invention addresses the shortcomings of the prior art by providing a pipe hanger configured to support piping in a horizontal (0% slope) configuration or be adjusted to align piping up to a 2% slope to provide proper gravity drainage as required to meet the installation specifications of a sterile facility. Unlike the swivel type pipe hangers of the prior art, the slope adjusting pipe hanger of the present invention locks the piping at the specified slope and provides for the same type of pipe hanger to be used throughout the installation of piping within a facility. The slope adjusting pipe hanger comprises an adjustable insert made from rigid plastic or elastomeric material that surrounds the pipe allowing for thermal expansion and contraction without or with reduced movement thereby preventing galling or seizing. The insert with the pipe is supported by upper and lower brackets that have smoothly contoured exterior surfaces to prevent bacterial build-up and the collecting of contaminants in order to use the pipe hanger in a sterile clean room environment. The upper bracket is formed with a cylindrical anchor that may have a threaded socket to attach the slope adjusting pipe hanger to a ceiling, floor, wall, panel or equipment frame. Embodiments of the lower bracket may be provided with captured bolts to more easily attach and secure the lower bracket to the upper bracket around the rotatable insert and a pipe. In other embodiments, the lower bracket is formed with a cylindrical anchor that may have a threaded socket that primarily mounts to the floor. The upper bracket may in this design and others be provided with capturing the bolts that may be covered which provides for the upper bracket to have a smooth uninterrupted exterior surface.

The adjustable insert is formed in a semi-spherical shape with one or more posts that are positioned circumferentially around portions of the insert. At the top of the insert a hub has tongue and groove ridges and indentations formed at a curvature along the surface that provides for an adjustment to the angle of the insert based on the center axis of the insert as a point of rotation when installed within a bracket. The hub and tongue and groove ridges and indentations are positioned between the circumferentially formed posts of the adjustable insert. Each of the brackets have a circumferentially formed channel that extends partially within a center portion of the curved interior surface at the bottom of the bracket to allow for the posts of the adjustable insert to snap or be wedged into and be held within the bracket. The posts may be formed in a hyperbola shape to more easily wedge and be held by the bracket but be movable within the channel. At the base of the channel of the bracket, tongue and groove ridges and indentations may be provided for positioning and aligning the tongue and grooves of the adjustable insert to set the insert at a required percentage of slope for proper gravity drainage. The channel therefore provides a seat for the semi-circular hub and the posts hold the insert within the bracket to provide for the insert to be rotated around the center axis of the insert and be adjusted to the proper angle to set the specified percentage slope for proper gravity drainage.

In installing the slope adjusting pipe hanger, an insert is placed within each of the upper and lower brackets with each hub of the insert snapped and secured within the channel of the bracket by the posts. As the insert is rotated, the tongue and groove ridges and indentations along the surface of the hubs are aligned with the tongue and grooves of the bracket to adjust the insert at the specified percentage of slope as required by installation specifications and typically up to 2% slope. With the insert installed, the posts of the insert extend into a circumferential channel formed within each of the upper and lower brackets. As the insert is pivoted about the center axis to be adjusted to the specified percentage of slope within a bracket, one of the two posts of the insert contact the wall of the channel that acts as a stopper to prevent the insert from being over rotated in one direction. Over rotation could cause a gap between the insert and bracket. Liquid and debris causing contaminants to collect in these gaps. The other post acts as a wedge that prevents rotation of the insert in the opposite direction. The matched curvature of the channel with the bracket to the curvature of the insert increases the alignment and interlocking of the tongue and grooves of the bracket and insert and thereby preventing voids or exposed areas between the bracket and adjustable insert where contaminants or bacteria build-up may form.

Once each of the inserts are adjusted within each upper and lower bracket the inserts are placed around a pipe. Bolts are then inserted and can be loosely engaged to hold together the upper bracket to the lower bracket. This loose connection allows the installer to adjust the angle of the pipe to the proper percentage of slope. As the pipe is moved the inserts will adjust and align the tongue and grooves of the inserts within the tongue and grooves of the brackets to match the slope of the pipe and once the percentage of slope is confirmed as correct, the bolts are fully tightened. In some embodiments, the height of the insert is longer than the radius R of the curvature of the interior surface of the bracket to have the insert extend out of the bracket so that as the bolts are tightened, the inserts are compressed together and into the brackets aiding in securing the pipe at the desired rotated position and thereby setting the percentage of slope of the pipe at the proper gravity drainage gradient. In some embodiments, the height of the insert is slightly longer than the distance from the flat bottom of the bracket to the depth of the channel of the bracket to have the base of each insert extend a short distance out of each bracket so that as the bolts are tightened, the inserts are compressed together and into the brackets to aid in securing the pipe at the desired rotated position and thereby setting the percentage of slope of the pipe.

The insert further provides dampening, shock absorption, and insulation thereby restricting movement of the piping and reducing noise. In some embodiments, the series of tongue and groove ridges and indentations are molded only along the exterior upper surface of the upper adjustable insert and the mating tongue and grooves are formed along only the interior surface of the upper bracket which allows for the slope of larger outside diameter pipes to be set more easily by setting the specified percentage of slope using the upper adjustable insert and upper bracket and allowing for the pipe to be adjusted to the specified percentage of slope by tightening the bolts that attach the upper and lower brackets without the tongue and grooves of the adjustable insert within the lower bracket affecting the alignment of the pipe. The interlocking of the tongue and grooves of the upper bracket and tongue and grooves along the upper surface of the adjustable insert is sufficient to lock the inserts at the proper percentage of slope and have the pipe be held at the proper percentage of slope by tightening the bolts that secure the lower bracket to the upper bracket. In other embodiments, the mating tongue and grooves ridges and indentations are not needed for either the inserts or the brackets. The matching curvatures of the hubs and wedging of the posts of the inserts within the channels to hold an insert within each bracket and fully tightening of the bolts compresses the inserts into the brackets and provides sufficient adjustment to secure the pipe at the specified percentage slope. The force of this compression fit between the upper bracket and upper insert with the lower bracket and lower insert is enough to secure small diameter pipes and tubes that are transporting low weight low pressure gases.

It is an object and advantage of the present invention to simplify the installation of piping at a required specified percentage of slope for gravity drainage using the slope adjusting pipe hanger of the present invention.

It is an object and advantage of the invention that the insert within the slope adjusting pipe hanger be adjustable to set the proper percentage of slope of the piping for gravity drainage.

It is an object and advantage of the present invention that the insert within the slope adjusting pipe hanger be locked into position once rotated to secure the piping at the proper percentage of slope for gravity drainage.

It is an object and advantage of the present invention that the adjustable insert has tongue and groove ridges and indentations and one or both of the upper and lower brackets have mating tongue and groove ridges and indentations to set the proper percentage of slope and interlock to hold a pipe at the proper percentage of slope for gravity drainage.

It is an object and advantage of the present invention that the insert of the slope adjusting pipe hanger provide dampening, shock absorption, insulation, restricts movement and reduces noise.

It is an object and advantage of the present invention that the curvature of the insert mate with the curvature of the bracket to fit and secure the insert in the bracket and remove gaps or air pockets where bacteria or other contaminants may build-up.

It is an object and advantage of the present invention that the height of the insert is longer than the radius R of the curvature of the interior surface of the of the bracket to have the insert extend out of the bracket so that as the bolts are tightened, the inserts are compressed together and into the brackets aiding in securing the pipe at the desired rotated position and thereby setting the percentage of slope of the pipe.

It is an object and advantage of the present invention that the height from the base of the insert to the top or hub of the insert is longer than the distance from the flat bottom surface of the bracket to the deepest point at the center of the channel to compress the inserts together and into the brackets aiding in securing the pipe at the desired rotated position and thereby setting the percentage of slope of the pipe at the proper gravity drainage gradient.

It is an object and advantage of the present invention that the brackets of the slope adjusting pipe hanger of the present invention be contoured with smooth exterior surfaces to prevent bacterial build-up and the collecting of contaminants in order to use the slope adjusting pipe hanger in a sterile clean room environment.

It is an object and advantage of the present invention that the inserts of the slope adjusting pipe hanger be rotated to a desired angle to set the proper percentage of slope for piping and that the slope locking pipe hanger be mounted in any orientation to provide for the same type of pipe hanger to be used throughout an installation of piping within a facility.

The present invention is related to a slope adjusting pipe hanger bracket and insert, comprising a bracket having tongue and groove ridges and indentations; an insert having mating tongue and groove ridges and indentations, the insert configured to be rotated to a specified percentage of slope and be secured at that angle by the alignment of the insert's tongue and groove ridges and indentations with the tongue and groove ridges and indentations of the bracket. Embodiments of the slope adjusting pipe hanger bracket and insert comprise a second bracket having tongue and groove ridges and indentations; a second insert having mating tongue and groove ridges and indentations; and wherein each of the first and second inserts are configured to be installed within each first and second bracket and each first and second insert configured to be rotated to a specified percentage of slope and be secured at that angle by the interlocking of the first insert's tongue and groove ridges and indentations with the tongue and groove ridges and indentations of the first bracket and the alignment of the second insert's tongue and groove ridges and indentations with the tongue and groove ridges and indentations of the second bracket; and wherein the first and second brackets with the first and second inserts secured at the specified percentage of slope are configured to be installed around a pipe to set the slope of the pipe at the specified percentage of slope. Embodiments of the slope adjusting pipe hanger bracket and insert comprise a second bracket having no tongue and groove ridges or indentations; a second insert; and wherein each of the first and second inserts are configured to be installed within each first and second bracket and the first insert is configured to be rotated to a specified percentage of slope and be secured at that angle by the interlocking of the first insert's tongue and groove ridges and indentations with the tongue and groove ridges and indentations of the first bracket; and wherein the first and second brackets and first and second inserts configured to be installed around a pipe with the first and second brackets attached using bolts, the bolts configured to be tightened to have the first insert secured at the specified percentage of slope and with the second insert adjust and secure the slope of the pipe to the specified percentage of slope. In embodiments of the slope adjusting pipe hanger bracket and insert, the bracket comprises at least one channel; and the insert comprises at least one post; and wherein the at least one post of the insert is configured to be installed within the at least one channel to snap in or be wedged within to secure the insert to the bracket. In embodiments of the slope adjusting pipe hanger bracket and insert, the bracket comprises a central portion; and the insert comprises a hub; and wherein the hub of the insert is configured to be installed within the central portion of the bracket. In embodiments of the slope adjusting pipe hanger bracket and insert, the hub of the insert comprises the tongue and groove ridges and indentations that are configured to set the insert at the specified percentage of slope. In embodiments of the slope adjusting pipe hanger bracket and insert, the tongue and groove ridges and indentations of the bracket have a curvature and profile that matches the curvature and profile of the tongue and groove ridges and indentations of the insert thereby increasing the strength of the tongue and groove ridges and indentations and prevents voids or exposed areas between the bracket and insert where contaminants or bacteria build-up may form. In embodiments of the slope adjusting pipe hanger bracket and insert, the bracket has a semi-circular curvature along an interior surface having a dimension and surface area that matches the outer surface of the insert; and wherein the insert configured to be form fit to the matching curvature of the interior surface of the bracket. In embodiments of the slope adjusting pipe hanger bracket and insert, the insert has a height that is longer than the radial distance of the curvature of the interior surface of the bracket, and the insert configured to protrude from the bracket and be compressed to force the insert into the bracket at the desired percentage slope. In embodiments of the slope adjusting pipe hanger bracket and insert, the insert has a height that is longer than the distance from the bottom of the bracket to the deepest point within the channel of the bracket, and the insert configured to protrude from the bracket and be compressed to force the insert into the bracket at the desired percentage slope. In embodiments of the slope adjusting pipe hanger bracket and insert, the bracket comprises contoured smooth exterior surfaces to prevent bacterial build-up and the collecting of contaminants in order to use the slope adjusting pipe hanger in a sterile clean room environment.

The present invention is also related to a slope adjusting pipe hanger, comprising two brackets, each bracket having tongue and groove ridges and indentations; two inserts, each insert having tongue and groove ridges and indentations; and wherein each insert configured to be adjusted within one of the two brackets to a specified percentage of slope to align to or match with the slope of a pipe; and wherein the two brackets configured for attachment to align the pipe within the inserts at the specified percentage of slope and interlock the tongue and groove ridges and indentations of an insert with the tongue and groove ridges and indentations of a bracket; and wherein the slope adjusting pipe hanger configured to secure a pipe at the specified percentage of slope for gravity drainage. In embodiments of the slope adjusting pipe hanger, the two brackets are attached using bolts to align the pipe within the inserts at the specified percentage of slope as the bolts are loosely tightened and interlock the tongue and groove ridges and indentations of an insert with the tongue and groove ridges and indentations of a bracket as the bolts are fully tightened. Embodiments of the slope adjusting pipe hanger comprise a channel within each bracket; at least one post extending from an outer surface of the insert, and wherein the at least one post of the insert configured to be installed within the channel and hold the insert within the bracket. In embodiment of the slope adjusting pipe hanger, the inserts are configured to pivot within the channel of the bracket to provide for the adjustment of the angle of the insert to align with a pipe at the specified percentage of slope as the bolts are loosely tightened and interlock the tongue and groove ridges and indentations of an insert with the tongue and groove ridges and indentations of a bracket as the bolts are fully tightened. In embodiments of the slope adjusting pipe hanger, the inserts are configured to pivot within the channel of the bracket to provide for the adjustment of the angle of the insert to align with a specified percentage of slope. In embodiments of the slope adjusting pipe hanger, the channel comprises the tongue and groove ridges and indentations that are configured to interlock with the tongue and groove ridges and indentations of the insert. In embodiments of the slope adjusting pipe hanger, the insert comprises a hub, the hub providing a location for the tongue and groove ridges and indentations of the insert. In embodiments of the slope adjusting pipe hanger, the interlocking of the tongue and groove ridges and indentations of the insert and the bracket prevent voids or exposed areas where contaminants or bacteria build-up may form between the bracket and the insert. In embodiments of the slope adjusting pipe hanger, the brackets comprise contoured smooth exterior surfaces to prevent bacterial build-up and the collecting of contaminants in order to use the slope adjusting pipe hanger in a sterile clean room environment.

These and other features, advantages and improvements according to this invention will be better understood by reference to the following detailed description and accompanying drawings. While references may be made to upper, lower, vertical and horizontal, and similar directional terms, these terms are used merely to describe the relationship of components and not to limit the installation or use of the present invention to any one orientation.

BRIEF DESCRIPTION OF THE DRAWINGS

Some embodiments of the present invention are illustrated as an example and are not limited by the figures of the accompanying drawings, in which like references may indicate similar elements and in which:

FIG. 2A is an exterior perspective view of an embodiment of an upper bracket in an embodiment of the slope adjusting pipe hanger of the present invention;

FIG. 2B is a side elevation view of the embodiment of the upper bracket of FIG. 2A in an embodiment of the slope adjusting pipe hanger of the present invention;

FIG. 2C is a front elevation view of the embodiment of the upper bracket of FIG. 2A in an embodiment of the slope adjusting pipe hanger of the present invention;

FIG. 2D is an exterior view from the top of the embodiment of the upper bracket of FIG. 2A in an embodiment of the slope adjusting pipe hanger of the present invention;

FIG. 2E is a bottom perspective view of the embodiment of the upper bracket of FIG. 2 in an embodiment of the slope adjusting pipe hanger of the present invention;

FIG. 2F is an interior view from the bottom of the embodiment of the upper bracket of FIG. 2A in an embodiment of the slope adjusting pipe hanger of the present invention;

FIG. 3E is an interior perspective view from the top of a further embodiment of a lower bracket in an embodiment of the slope adjusting pipe hanger of the present invention;

FIG. 3F is a side elevation view of the further embodiment of the lower bracket of FIG. 3E in an embodiment of the slope adjusting pipe hanger of the present invention;

FIG. 3G is an interior view from the top of the further embodiment of the lower bracket of FIG. 3E in an embodiment of the slope adjusting pipe hanger of the present invention;

FIG. 3H is an exterior view from the bottom of the embodiment of the lower bracket of FIG. 3E in an embodiment of the slope adjusting pipe hanger of the present invention;

FIG. 4A is a side elevation view of an embodiment of an insert configured to be adjustable to set a pipe at a specified percentage of slope for gravity drainage in an embodiment of the slope adjusting pipe hanger of the present invention;

FIG. 4B is a cross-sectional view of the embodiment of the adjustable insert of FIG. 4A in an embodiment of the slope adjusting pipe hanger of the present invention;

FIG. 4C is a top view of the embodiment of the adjustable insert of FIG. 4A in an embodiment of the slope adjusting pipe hanger of the present invention;

FIG. 4D is a bottom view of the embodiment of the adjustable insert of FIG. 4A in an embodiment of the slope adjusting pipe hanger of the present invention;

FIG. 5A is a perspective view of an embodiment of two adjustable inserts placed together to form an opening for a pipe in an embodiment of the slope adjusting pipe hanger of the present invention;

FIG. 5B is a cross-sectional view of the embodiment of the two adjustable inserts placed together to form an opening for a pipe of FIG. 5A in an embodiment of the slope adjusting pipe hanger of the present invention;

FIG. 7B is a cross-sectional view of the embodiment of the assembly of FIG. 7A of the slope adjusting pipe hanger of the present invention with a pipe adjusted to a 2% slope gravity drainage angle with the bolts fully tightened and the tongue and groove ridges and indentations engaged.

FIG. 7C is a top view of the embodiment of the assembly of FIG. 7A of the slope adjusting pipe hanger of the present invention with a pipe adjusted to a 2% slope gravity drainage angle;

FIG. 7H is a cross-sectional view from the side through the center along a vertical axis of the embodiment of the assembly of FIG. 7A of the slope adjusting pipe hanger of the present invention with a pipe adjusted to a 2% slope gravity drainage showing the tongue and groove ridges and indentations fully engaged;

FIG. 8C is a side elevation view of an embodiment of the assembly of the slope adjusting pipe hanger of the present invention with a pipe horizontal with no adjustment of the angle of the insert;

FIG. 10A is a perspective view of an embodiment of a bracket and an adjustable insert of the slope adjusting pipe hanger of the present invention showing the alignment of the tongue and groove ridges and indentations to set the specified percentage of slope for gravity drainage;

FIG. 10B is a side elevation view of an embodiment of the posts of the adjustable insert aligned within and secured by the channel of the bracket to provide for the tongue and groove ridges and indentations of the adjustable insert to be aligned at the specified angle for gravity drainage without having the adjustable insert slip or fall out of the bracket in an embodiment of the slope adjusting pipe hanger of the present invention showing the tongue and groove ridges and indentations not-fully engaged FIG. 10C is a side elevation view of an embodiment of the alignment of the posts and tongue and groove ridges and indentations of the adjustable insert aligned with the channel and tongue and groove ridges and indentations of the bracket in an embodiment of the slope adjusting pipe hanger of the present invention showing the tongue and groove ridges and indentations engaged.

FIG. 12B is a perspective view from the bottom of the embodiment of the assembly of FIG. 12A of the slope adjusting pipe hanger of the present invention with a pipe adjusted to a 2% slope for gravity drainage;

FIG. 15E is a top view of the further embodiments of the upper bracket and lower bracket of FIG. 15A in an embodiment of the slope adjusting pipe hanger of the present invention with a pipe installed;

FIG. 16A is a cross-sectional view of an embodiment of the slope adjusting pipe hanger of the present invention with tongue and groove ridges and indentations on both the upper and lower inserts and on both the upper and lower brackets;

DETAILED DESCRIPTION OF THE INVENTION

Figure 1:
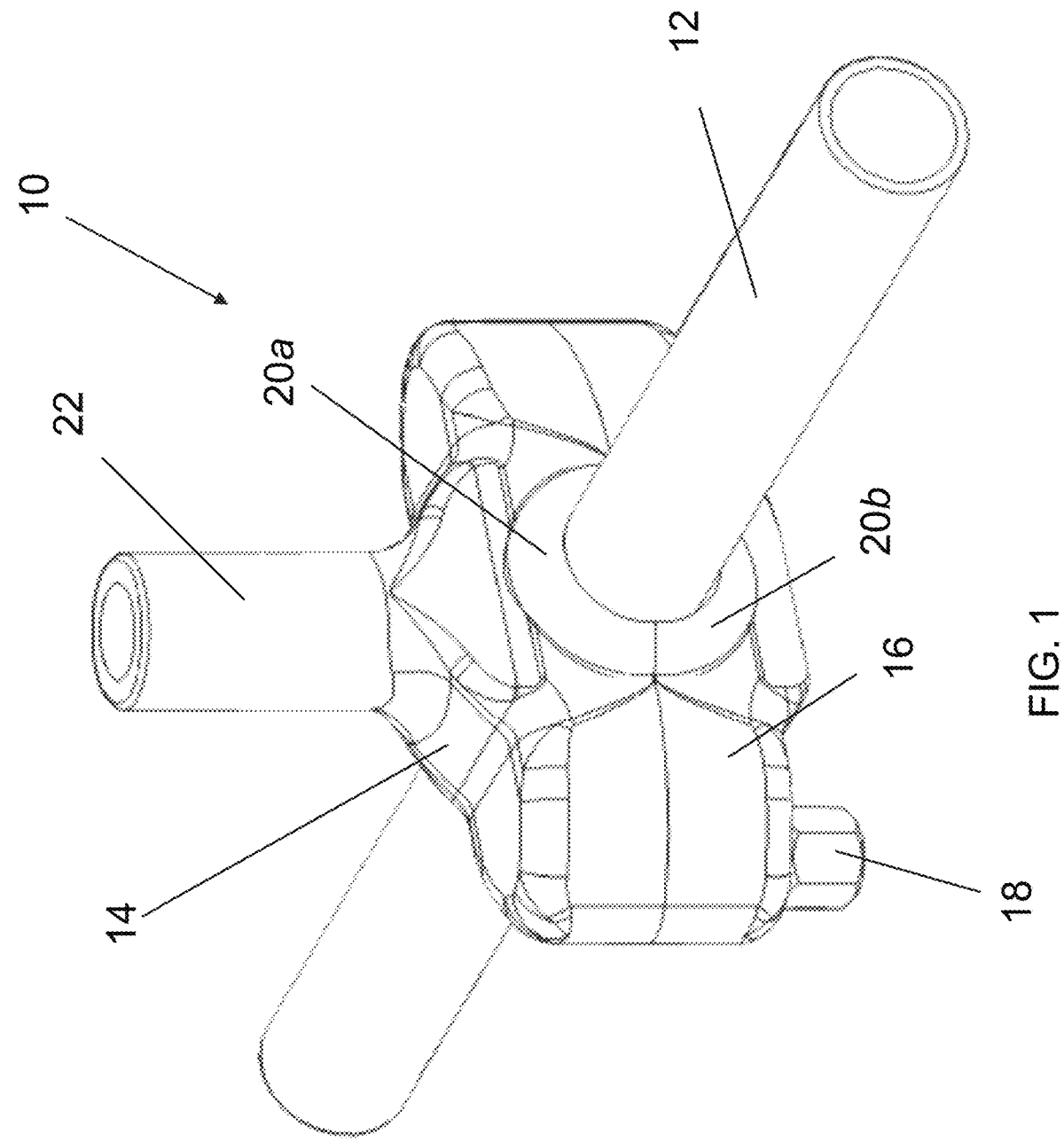
FIG. 1 is a perspective view of an embodiment of the slope adjusting pipe hanger of the present invention with a pipe installed.

A perspective view of the slope adjusting pipe hanger 10 of the present invention with a pipe 12 installed is shown in FIG. 1. The upper bracket 14 is attached to the lower bracket 16 using bolts 18. The upper insert 20a is installed within the upper bracket 14 and the lower insert 20b is installed within the lower bracket 16 with each of the inserts 20a and 20b mated together to surround the pipe 12. The slope adjusting pipe hanger 10 may be mounted to a wall or panel in a horizontal or vertical orientation using a cylindrical anchor 22 that may have internal or external threads for mounting the slope adjusting pipe hanger 10 to a ceiling, floor, wall, panel or equipment frame. As shown in FIG. 2A, the upper bracket 14 is formed with a semi-circular curvature along the interior surface 24 cut through the flat bottom surface 26 of the bracket 14 that provides for the upper bracket 14 to be seated on and/or around the outer surface of a pipe 12. A smooth contoured outer surface 28 and winged braces 30 provide for the bolts 18 to attach a lower bracket 16 to the upper bracket 14. The contoured surface 28 extends along the base of the cylindrical anchor 22, as shown in FIG. 2B, preventing seams or non-uniform surfaces in order to reduce bacterial build-up. As shown in FIG. 2C, the upper bracket 14 may be of any dimension and the semi-circular curvature of the interior surface 24 may be formed at any suitable radius R to accommodate pipes of different diameters. The winged braces 30 extend out from each side of the semi-circular curvature 24 and are of the required thickness and of suitable metallic, plastic or composite material to support and suspend a piping system. For example, larger brackets may be formed with larger or reinforced braces 30 and the semi-circular curvature 24 may have a larger radius R to support larger and heavier pipes. In a top view of the upper bracket 14, in FIG. 2D, the cylindrical anchor 22 may have threads 32 to install a rod or other type of attachment fixture to the cylindrical anchor 22 for attachment of the slope adjusting pipe hanger 10 to a ceiling, wall or other surface. The cylindrical anchor 22 may be of any appropriate length to set an appropriate distance of the pipe hanger 10 and piping system from the surface. As shown in FIG. 2E, bolt holes 34 are formed in the flat bottom surface 26 of each winged brace 30 and within a central portion extending through the interior surface 24 a channel 38 is formed. The channel 38 provides for the posts of the insert 20 to be wedged in and held within the bracket 14. As shown in FIG. 2F, the bolt holes 34 may have threads 40 to provide for the upper bracket 14 to be bolted to the lower bracket 16 without requiring a separate nut. The side surface 44 around the semicircular curvature 24 of the upper bracket 14 may be slightly depressed or have an indented curvature to provide for the curved outer surface of the insert 20 to extend out from the bracket 14 and form a smooth contour around the pipe 12. In some embodiments, tongue and groove ridges and indentations 46 are formed within the upper middle portion of the channel 38 and these tongue and groove ridges and indentations 46 are configured to mate with and interlock with the insert 20 to adjust the insert to the specified percentage of slope for gravity drainage.

Figure 3C:
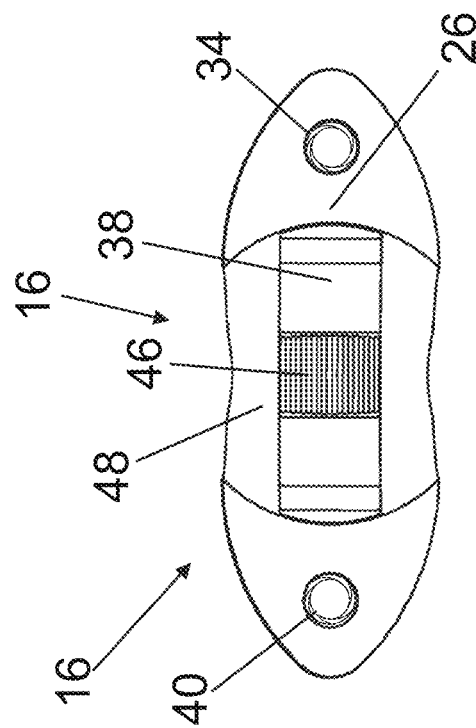
FIG. 3C is an interior view from the top of the embodiment of the lower bracket of FIG. 3A in an embodiment of the slope adjusting pipe hanger of the present invention.
Figure 3D:
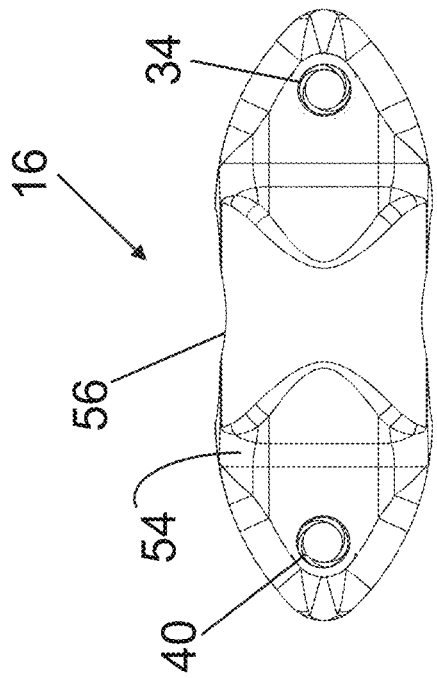
FIG. 3D is an exterior view from the bottom of the embodiment of the lower bracket of FIG. 3A in an embodiment of the slope adjusting pipe hanger of the present invention.
Figure 3A:
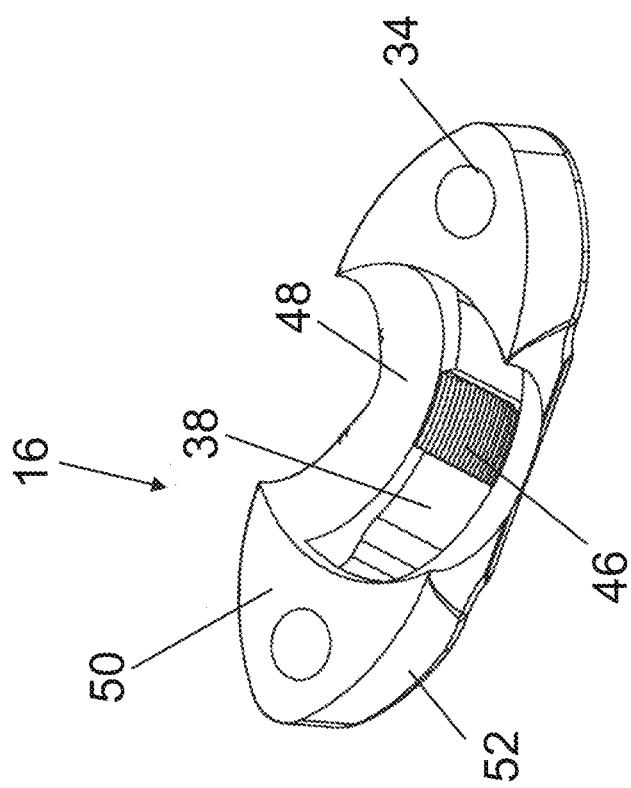
FIG. 3A is an interior perspective view from the top of an embodiment of a lower bracket in an embodiment of the slope adjusting pipe hanger of the present invention.

As shown in FIG. 3A, the lower bracket 16 is formed with a dimensionally identical semi-circular curvature 24 as the upper bracket 14 that provides for the lower bracket 16 to be placed around the outer surface of a pipe 12 and be aligned with the upper bracket 14. The lower bracket 16 similarly has a channel 38 that extends within the curvature of the interior surface 48 within the flat bottom 50 between the winged braces 52 of the lower bracket 16. In some embodiments the middle portion of the channel 38 of the lower bracket 16 may have tongue and groove ridges and indentations 46 that are configured to mate with and interlock with the insert 20 to adjust the insert to the specified percentage of slope for gravity drainage.

Figure 3B:
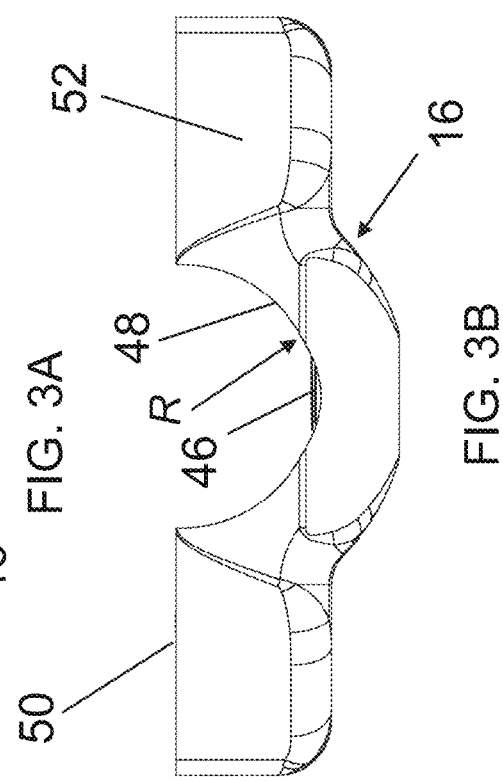
FIG. 3B is a side elevation view of the embodiment of the lower bracket of FIG. 3A in an embodiment of the slope adjusting pipe hanger of the present invention.

As shown in FIG. 3B, the lower bracket 16 may be of any dimension and the semi-circular curvature 24 may be formed at any suitable radius R to accommodate pipes of different diameters and to mate with the dimensions of the upper bracket 14. The winged braces 52 extend out from either side of the semi-circular curvature 24 and the braces 52 may be of the required thickness and of suitable metallic, plastic or composite material to support and suspend a piping system. For example, larger brackets may be formed with larger or reinforced braces 52 and the semi-circular curvature 24 may have a larger radius R to support larger and heavier pipes. As shown in FIG. 3C, bolt holes 34 are formed in the bottom of each winged brace 52 and the bolt holes 34 may have threads 40 to have the bolts 18 be screwed into and be held by the lower bracket 16 prior to installing the lower bracket 16 around a pipe and attaching the lower bracket 16 to the upper bracket 14. As shown in a bottom view of the lower bracket 16 in FIG. 3D the bolt holes 34 extend all the way through the winged braces 52 of the lower bracket 16. The lower bracket 16 has a smooth contoured outer surface 54 that prevents seams or non-uniform surfaces in order to reduce bacterial build-up. The side surface 56 around the semicircular curvature 24 of the lower bracket 16 may be slightly depressed or have an indented curvature to provide for the curved outer surface of the insert 20 to form a smooth contour around the pipe 12.

In a further embodiment, as shown in FIG. 3E, the lower bracket 16 is formed similarly with a dimensionally identical semi-circular curvature of the interior surface 48 to the interior surface 24 of the upper bracket 14 providing for the lower bracket 16 to be placed around the outer surface of a pipe 12 and be aligned with the upper bracket 14 and a channel 38 that extends along an interior surface 48 between the flat bottom 50 of the winged braces 52 of the lower bracket 16. However, in this embodiment, the middle portion of the channel 38 does not have the tongue and groove ridges and indentations 46 and instead only the upper bracket 14 has the tongue and groove ridges and indentations 46 which are sufficient to align the pipe at the specified slope within the upper insert and freely adjust the pipe 12 and the lower insert within the lower bracket to the specified percentage of slope for gravity drainage which is beneficial with slope adjustments of pipes having larger diameters. The other features of this further embodiment of the lower bracket are identical to the previous embodiment as shown in FIGS. 3E-3H.

As shown in FIG. 4A, the insert 20 is formed substantially as a hemisphere with a curved portion of outer surface 60 that is cut along each sidewall 62 to have the insert 20 fit within the semicircular curvatures 24 of the upper and lower brackets 14 and 16. At the top or hub 64 along the outer surface 60 of the insert 20, tongue and groove ridges and indentations 66 that mate with the tongue and groove ridges and indentations 46 in some embodiments of the upper and lower brackets 14 and 16 are formed. The base 68 of the insert is flat and a slot 70 is cut out from the curved outer surface 60. One or more posts 72 extend out from the curved surface 60 of the insert 20. As shown in FIG. 4B, a hemispherical opening is formed through the insert 20 from a first sidewall 62 extending to the opposing sidewall 62 forming a smooth curved interior surface 74 to have the insert 20 be contoured around and seal to a portion of a pipe 12 to prevent gaps or air pockets where bacteria or other contaminants may build-up. The sidewalls 62 of the insert 20 provide the opening for a pipe 12. The base 68 of the insert 20 may extend slightly out of the flat bottom 26 and 50 of the upper and lower brackets 14 and 16 respectfully so that as the bolts 18 are tightened the inserts 20 are compressed into to be seated within each of the brackets 14 and 16. The semicircular curvature of the interior surface 74 may be formed at any radius R to accommodate pipes of different diameters. The insert 20 is dimensioned to fit within the upper and lower brackets 14 and 16 without any gaps where bacteria or other contaminants may form.

As shown in FIG. 4C, the tongue and groove ridges and indentations 66 extend along the hub 64 in a direction as shown by the arrow B that is perpendicular to the axis P that of the pipe 12 that runs through the hemispherical opening of the insert 20. The posts 72 extend in the same direction as tongue and groove ridges and indentations 66 along a portion of the outer surface 60 of the insert 20. Four posts 72 are shown in the embodiment shown in FIG. 4C and each post 72 is seated within the channel 38 to hold the insert 20 within the bracket 14 or 16. As shown in FIG. 4D in a view of the bottom of the insert 20, the hemispherical opening runs along axis A from one sidewall 62 to the other sidewall 62. The posts 72 extend out from the outer surface 60 of the adjustable insert 20 and the base 68 is flat to have the base 68 of an upper and lower insert 20 mate and form a circular opening for a pipe, as shown in FIG. 5A and in the cross-sectional view of FIG. 5B. The posts 72 may fully or partially extend around the outer surface 60 of each insert 20a and 20b to fill the channel 38 within each bracket 14 and 16 and prevent any voids or pockets.

Figure 6A:
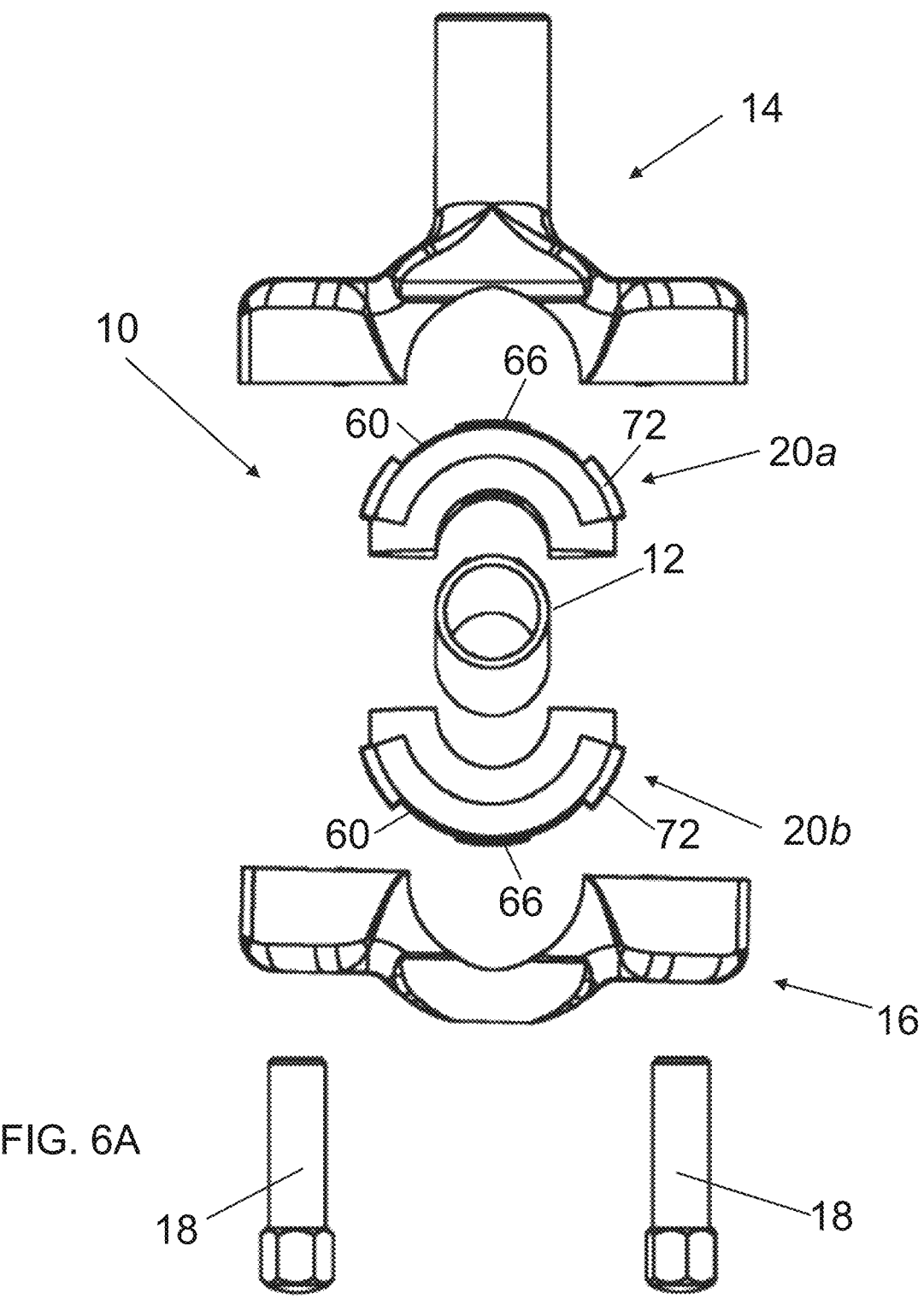
FIG. 6A is an exploded view from the front in an embodiment of the assembly of the slope adjusting pipe hanger of the present invention with a pipe adjusted to a 2% slope gravity drainage angle.
Figure 6B:
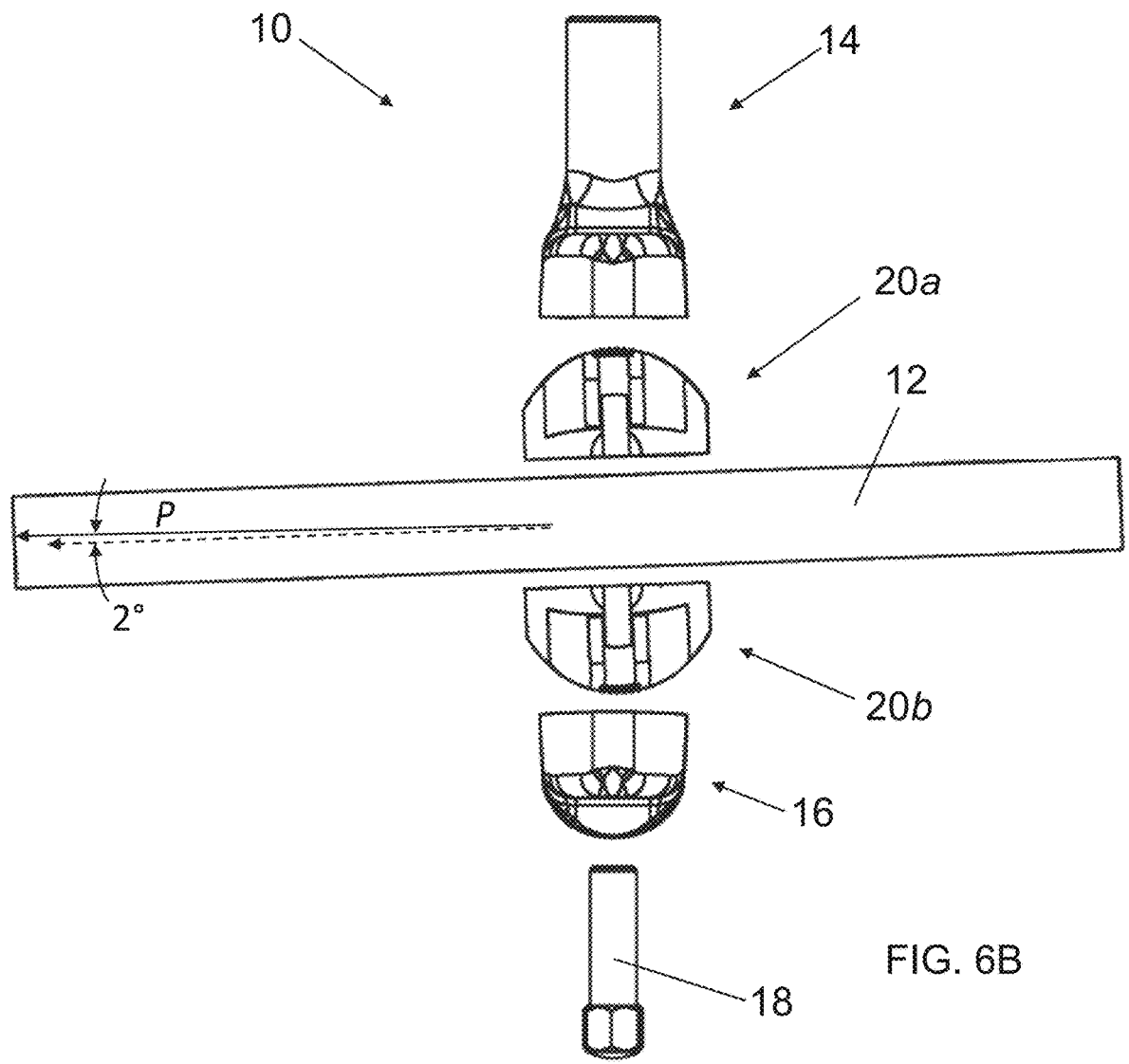
FIG. 6B is an exploded view from the side in an embodiment of the assembly of the slope adjusting pipe hanger of the present invention with a pipe adjusted to a 2% slope gravity drainage angle.

As shown in an exploded view of the slope adjusting pipe hanger 10 of the present invention in FIG. 6A, the tongue and groove ridges and indentations 66 along the outer surface 60 of the insert 20a and 20b align with the middle portion of the channel 38 of the brackets 14 and 16. In this example, the process of assembling the slope adjusting pipe hanger 10 of the present invention to a 2% slope for gravity drainage is shown. A first insert 20a is placed within the upper bracket 14 with the posts 72 wedged and held within the channel 38 of the upper bracket 14. The insert 20a is rotated at an angle perpendicular to the center axis of the pipe 12 to align the tongue and groove ridges and indentations 66 of the insert 20a within the tongue and groove ridges and indentations 46 of the upper bracket 14 to set the insert 20a to the specified 2% slope. The second adjustable insert 20b is similarly placed within the lower bracket 16 to have the posts 72 be inserted into and be wedged within the channel 38 to hold the insert 20b to the lower bracket 16. The insert 20b is rotated to align the tongue and groove ridges and indentations 66 of the insert 20b within the tongue and groove ridges and indentations 46 of the lower bracket 16 to rotate the insert 20b to the specified 2% slope. Once the inserts 20a and 20b are aligned at the specified percentage of slope the brackets 14 and 16 are placed around the pipe 12. The pipe 12 is adjusted to the specified percentage of slope of 2% along its axis and as the inserts 20a and 20b are brought together around the pipe 12 at the correct percentage of slope as shown in FIG. 6B, the bolts 18 are screwed into the bolt holes 34 through the lower bracket 16 and into the upper bracket 14 and as the bolts are tightened the angle of inserts 20a and 20b pivot and adjust to the slope of the pipe 12 and lock the pipe 12 into the specified percentage slope of 2% through the interlocking of the tongue and groove ridges and indentations 66 of each insert 20a and 20b and each bracket 14 and 16.

Figure 7A:
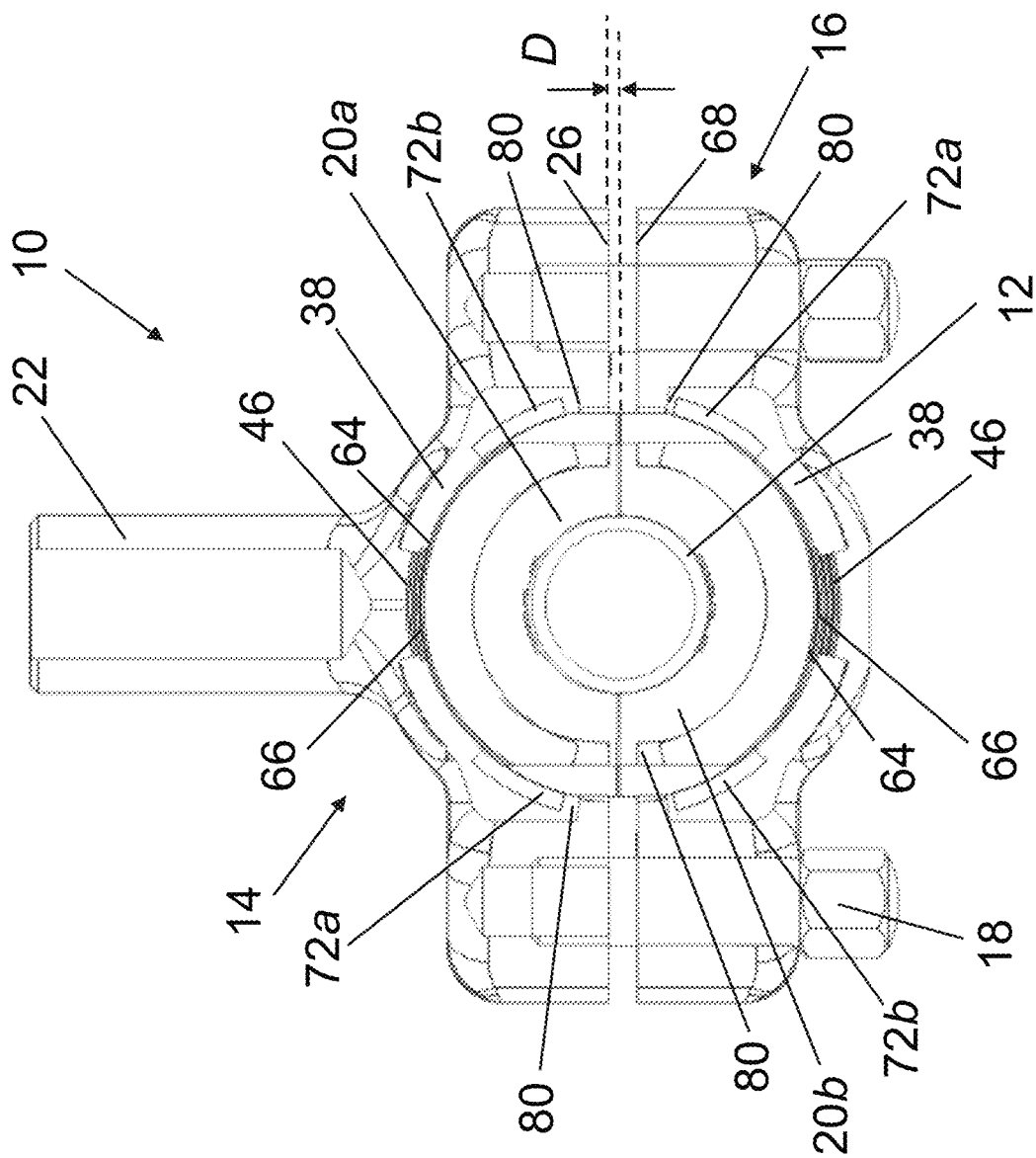
FIG. 7A is a cross-sectional view of an embodiment of the slope adjusting pipe hanger of the present invention with a pipe adjusted to a 2% slope gravity drainage angle and the bolts not fully tightened and the tongue and groove ridges and indentations are not engaged.
Figure 7D:
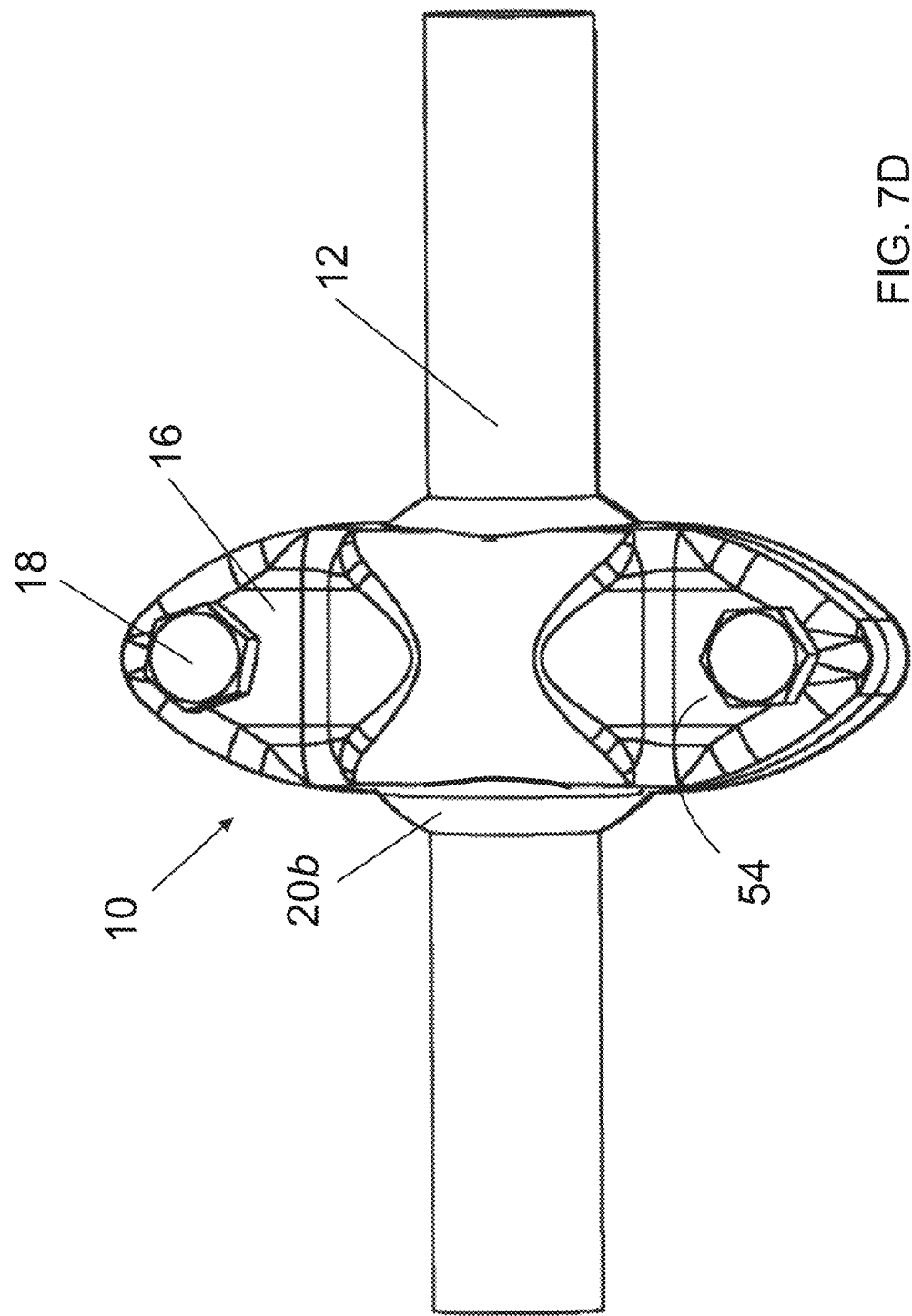
FIG. 7D is a bottom view of the embodiment of the assembly of FIG. 7A of the slope adjusting pipe hanger of the present invention with a pipe adjusted to a 2% slope gravity drainage angle.
Figure 7E:
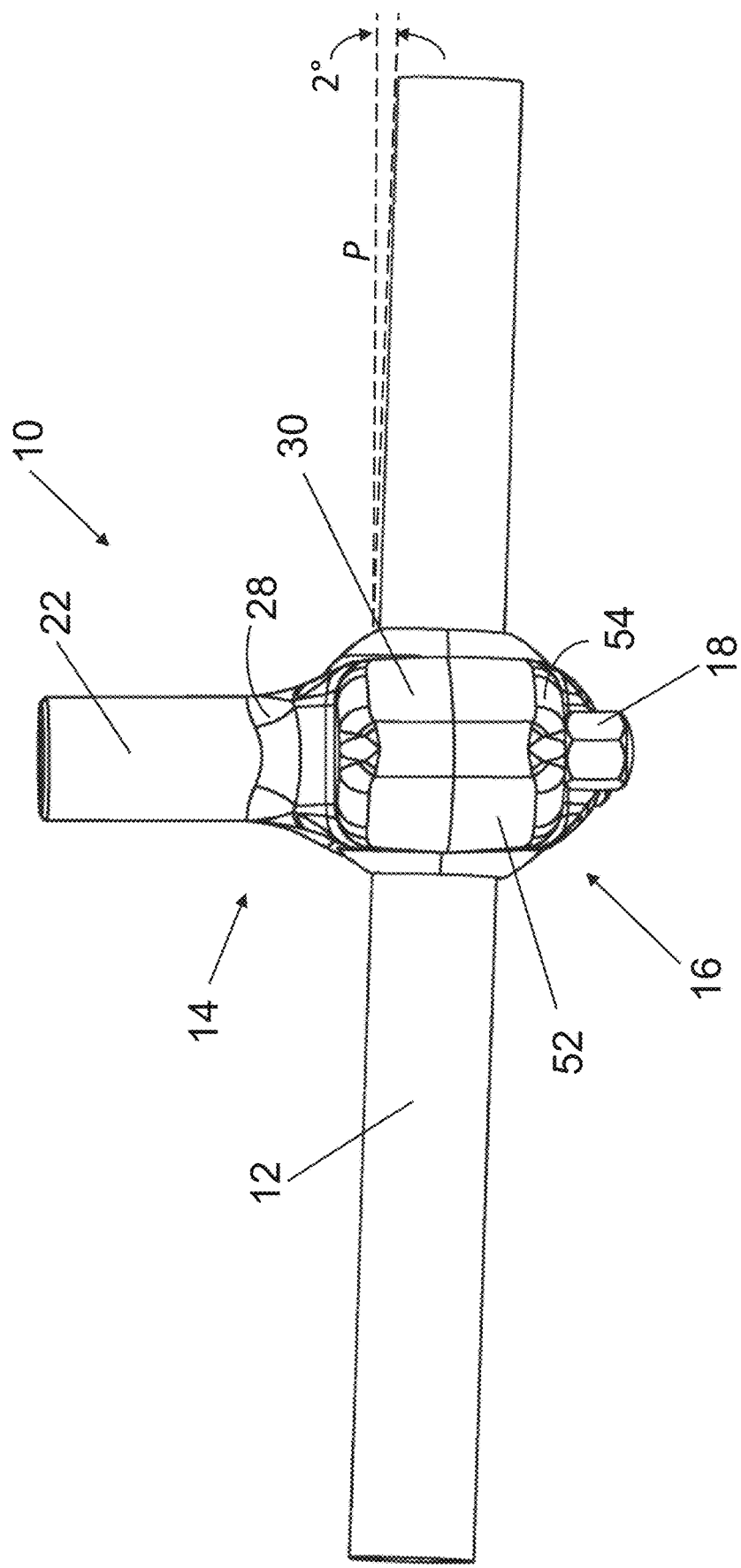
FIG. 7E is a side elevation view of the embodiment of the assembly of FIG. 7A of the slope adjusting pipe hanger of the present invention with a pipe adjusted to a 2% slope gravity drainage angle.
Figure 7F:
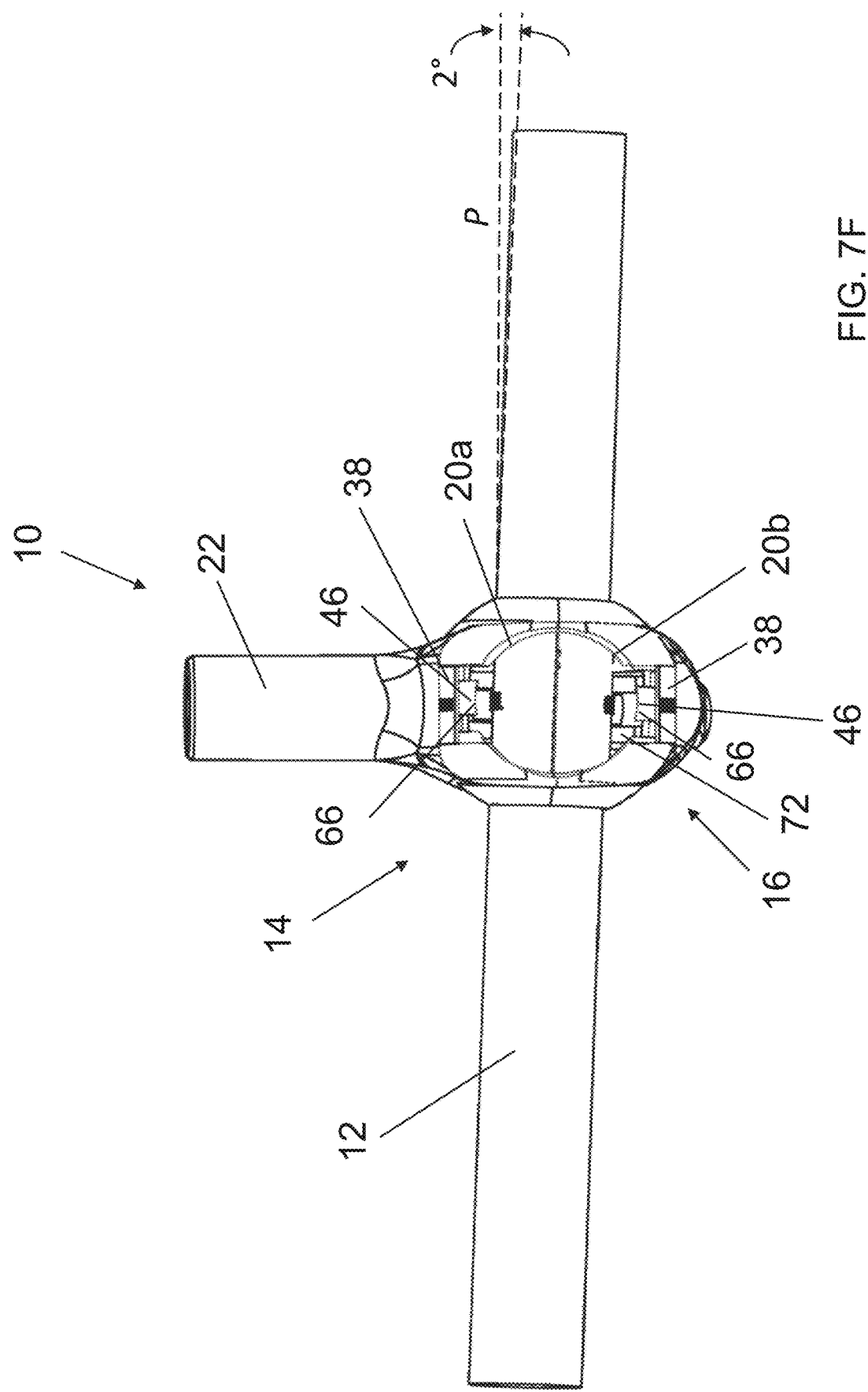
FIG. 7F is a cross-sectional view from the side through a portion of the embodiment of the assembly of FIG. 7A of the slope adjusting pipe hanger of the present invention with a pipe adjusted to a 2% slope for gravity drainage with the cross section showing the post being stopped by the channels edge.
Figure 7G:
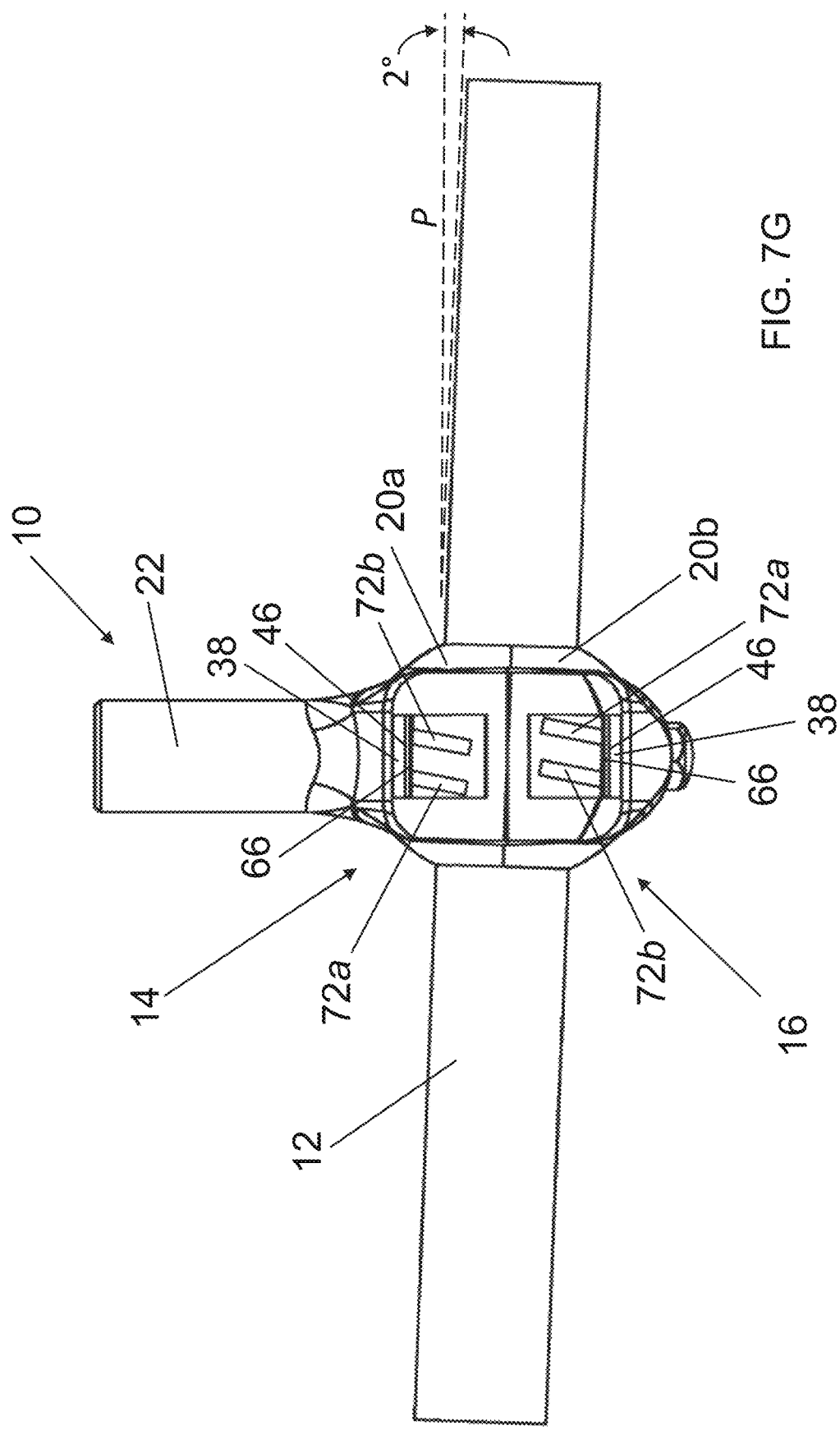
FIG. 7G is a cross-sectional view from the side through a portion of the embodiment of the assembly of FIG. 7A of the slope adjusting pipe hanger of the present invention with a pipe adjusted to a 2% slope gravity drainage showing the posts of the inserts stopped from further rotation by the sidewall of the channels.
Figure 7I:
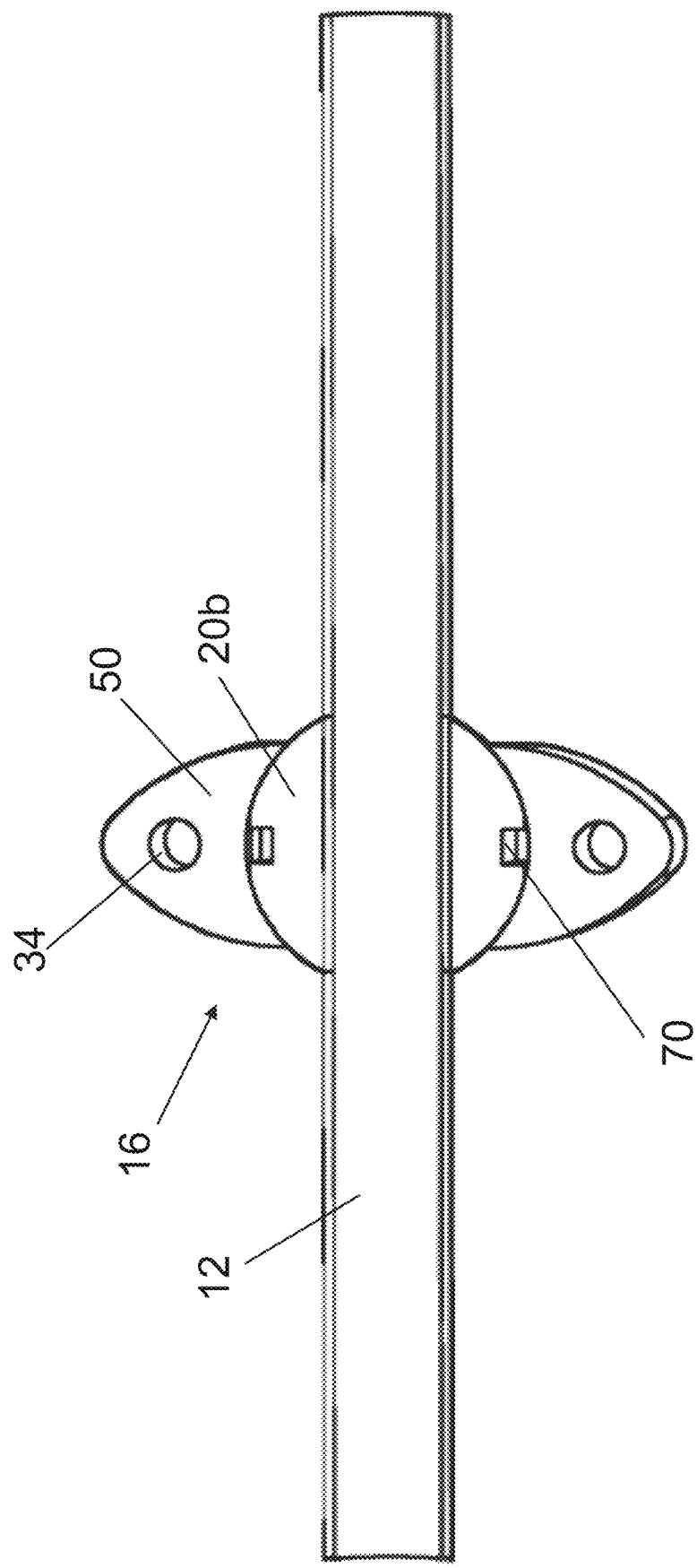
FIG. 7I is a cross-sectional view through the center along a horizontal axis from the top of the embodiment of the assembly of FIG. 7A of the slope adjusting pipe hanger of the present invention with a pipe adjusted to a 2% slope for gravity drainage.
Figure 7J:
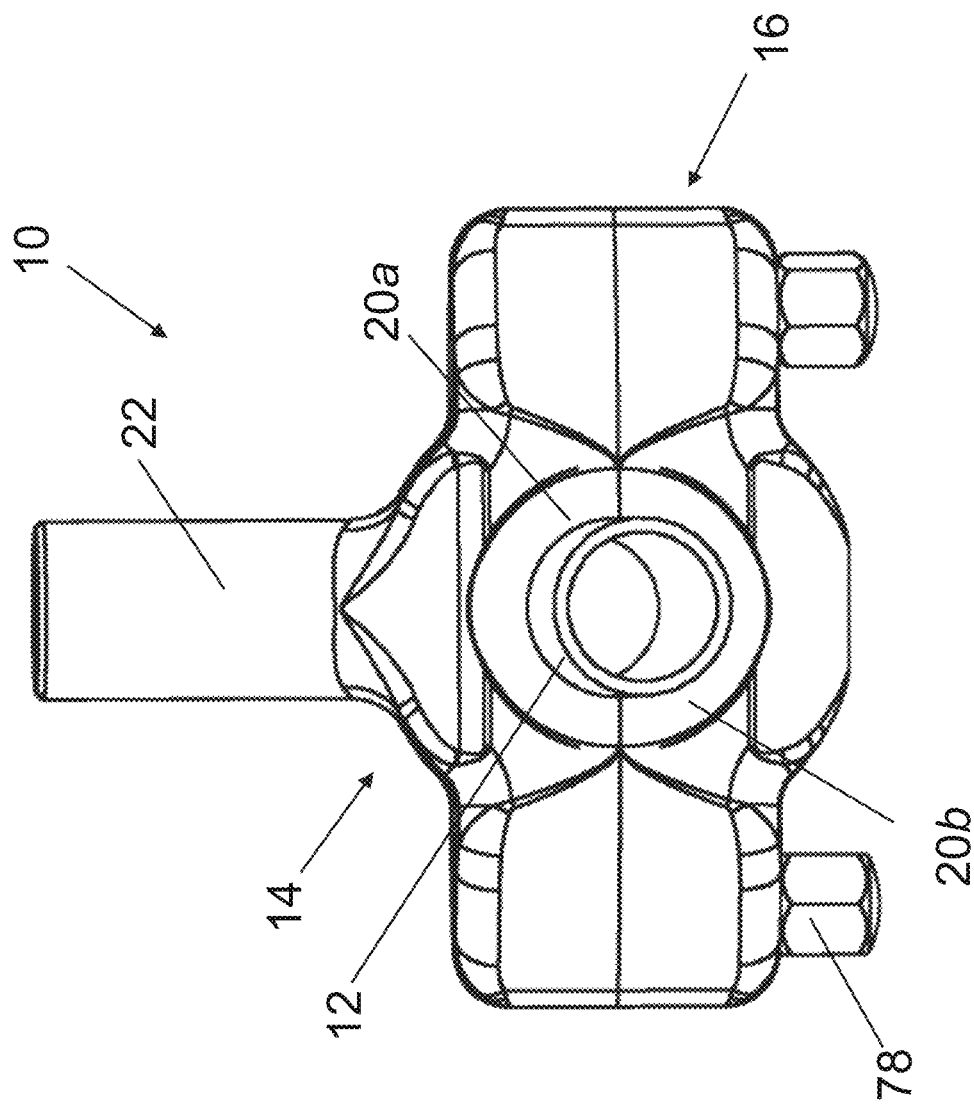
FIG. 7J is a front elevation view of an embodiment of the assembly of the slope adjusting pipe hanger of the present invention with a pipe adjusted to a 2% slope gravity drainage angle.

As shown in a cross-sectional view in assembling the slope adjusting pipe hanger 10 in FIG. 7A, when the inserts 20a and 20b are inserted into the bracket 14 and 16 and the hub 64 of the insert 20 is seated in the channel 38, in some embodiments, the height of the insert 20 is longer than the radius R of the curvature of the interior surface 24 and 48 of the brackets 14 and 16, or in some embodiments, the height of the insert 20 is slightly longer than the distance from the flat bottom 26 of the bracket 14 and 16 to the deepest point within the channel 38 of the bracket 14 and 16 or and in either embodiment, the flat base 68 of the insert 20 protrudes a short distance D beyond the flat bottom surfaces 26 and 52 of the brackets 14 and 16 respectfully. By having the base 68 of the insert 20 protrude from the bracket 14 and 16, then as the bolts 18 are tightened, the plastic or elastomeric material of each insert 20 compresses to align the base 68 of each insert 20 with the bottom 26 of each bracket 14 and 16. As the insert 20 is compressed it is forced into the channel 38 and the tongue and groove ridges and indentations 66 of the insert 20 are interlocked with the mating tongue and groove ridges and indentations of the bracket 46. As shown, each of the inserts 20a and 20b has a post 72a and 72b on either side of the curved outer surface 60 near the base 68 of the insert 20a and 20b. As one of the posts 72a of each insert 20a and 20b is rotated in either direction, further rotation of the insert 20a and 20b in that direction is stopped by each sidewall 80 at the end of the channel 38 of each bracket 14 and 16 which prevents further rotation of the insert 20a and 20b beyond a percentage of slope of not more than 2% which is within specified installation requirements for proper gravity drainage. A cross-sectional view showing the inserts 20a and 20b rotated within the upper and lower brackets 14 and 16 to align the pipe 12 at the specified percentage of slope is shown in FIG. 7B showing the bolts 18 tightened within the bolt holes 34 of the upper bracket 14. By tightening the bolts 18, the upper and lower insert 20a and 20b are forced into the brackets 14 and 16 and are aligned at the specified percentage of slope and locked at that angle by the interlocking of the tongue and groove ridges and indentations 46 and 66 of the bracket 14 and 16 and inserts 20a and 20b preventing rotation of the inserts 20a and 20b or an adjustment of the slope of the pipe 12. With the secure attachment of the lower bracket 16 to the upper bracket 14, the slope adjusting pipe hanger 10 may be anchored to a ceiling, floor or other surface with the pipe 12 held stationary at the specified slope for gravity drainage. Alternatively, the upper bracket may be first attached to a ceiling, wall or other structure and because the insert 20a is held within the channel 38 of the bracket 14, the pipe 12 may be held and adjust to the percentage slope with the aid of the insert 20a and the lower bracket 16 with the mating insert 20b in bolted to the upper insert with the pipe at the specified slope. A view from the top of the slope adjusting pipe hanger 10 with the pipe 12 and the upper bracket 14 is shown in FIG. 7C and a view from the bottom with the pipe 12 and lower bracket 16 is shown in FIG. 7D. A side view showing the adjustment of the slope of the pipe 12 from its axis P prior to adjustment to the 2% slope is shown in FIG. 7E. The rotation of the inserts 20a and 20b within the brackets 14 and 16 respectfully is shown in a cross-sectional view going through the winged brace 30 and 52 of the upper bracket 14 and lower bracket 16 respectfully is shown in FIG. 7F. A cross-sectional view through a portion of the brackets 14 and 16 from top to bottom of the slope adjusting pipe hanger 10 in FIG. 7G shows the inserts 20a and 20b being stopped from further rotation by the posts 72a hitting the sidewall 80 of the channel 38. A cross-sectional side view through the center of the slope adjusting pipe hanger 10 is shown in FIG. 7H showing the engagement and interlocking of the tongue and groove ridges and indentations 46 and 66 of the bracket 14 and 16 and inserts 20a and 20b. A cross-sectional view from the top of the slope adjusting pipe hanger 10 through the pipe 12 is shown in FIG. 7I. The slot 70 provides for a screwdriver or flat blade to be inserted in the slot 70 to pry the insert 20a and 20b out of a bracket 14 and 16. The pipe 12 with the inserts 20a and 20b rotated to the specified percentage of slope is securely held at the gravity drainage angle and unlike the swivel pipe hangers of the prior art, the posts 72 wedged within the channels 38 are unable to rotate in either direction and the set specified angle will not or will minimally degrade over time thereby locking the pipe 12 at the specified percentage of slope for proper gravity drainage. A front view of the assembled slope adjusting pipe hanger 10 with the bolts 18 tightened to press each of the inserts 20a and 20b into the channels 38 interlocking the tongue and grooves as the lower bracket 16 is securely attached to the upper bracket 14 is shown in FIG. 7J with the pipe 12 at the specified percentage of slope of 2% slope. In this embodiment, the bolt heads 78 may be left uncovered if the pipe hanger 10 is installed with the lower bracket 16 beneath the upper bracket 14. Alternatively, and in other orientations, the bolt heads 78 may be covered to remove any non-uniform surfaces.

Figure 8A:
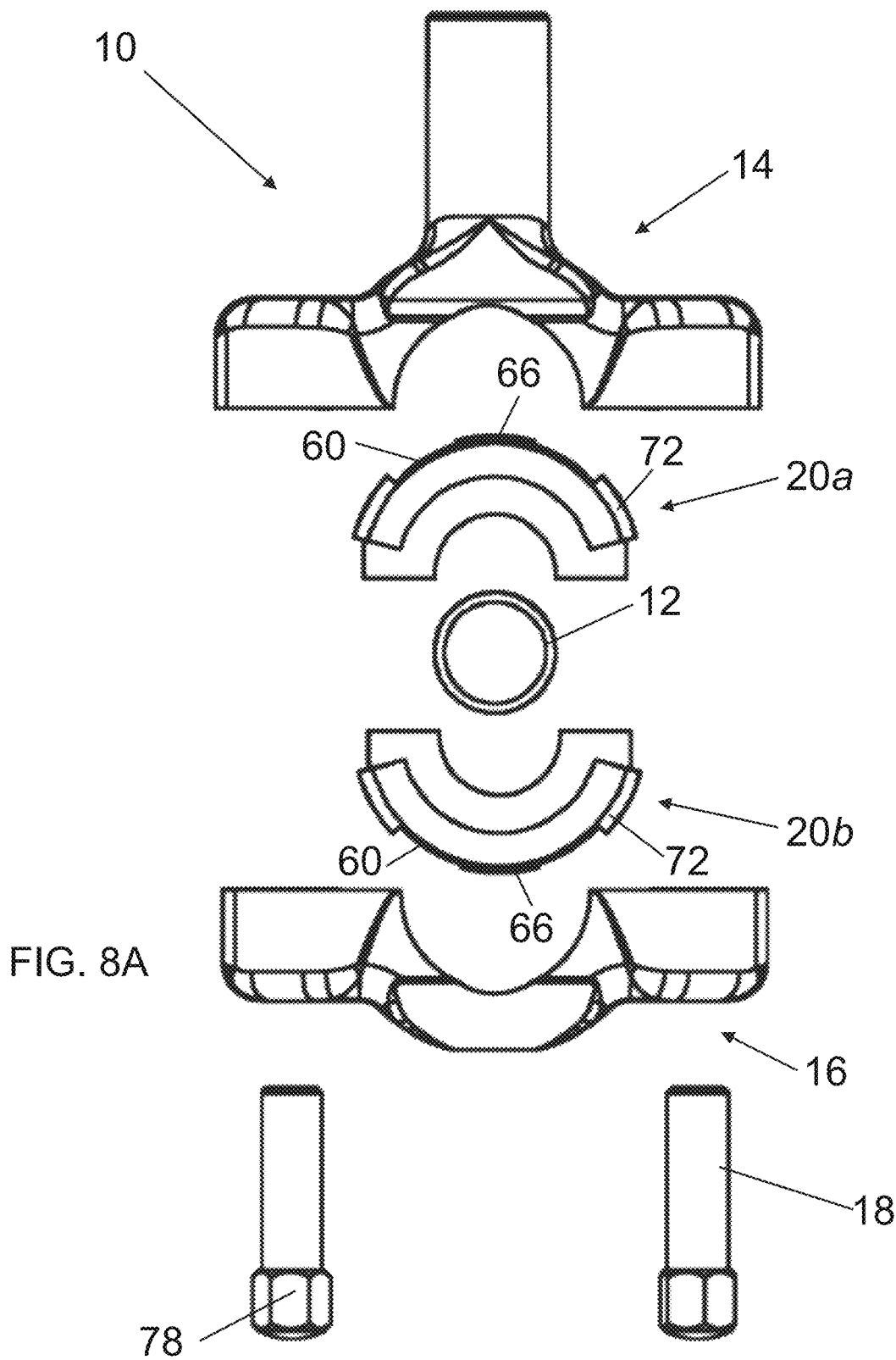
FIG. 8A is an exploded view from the front in an embodiment of the assembly of the slope adjusting pipe hanger of the present invention with a pipe horizontal with no adjustment of the angle of the insert.
Figure 8B:
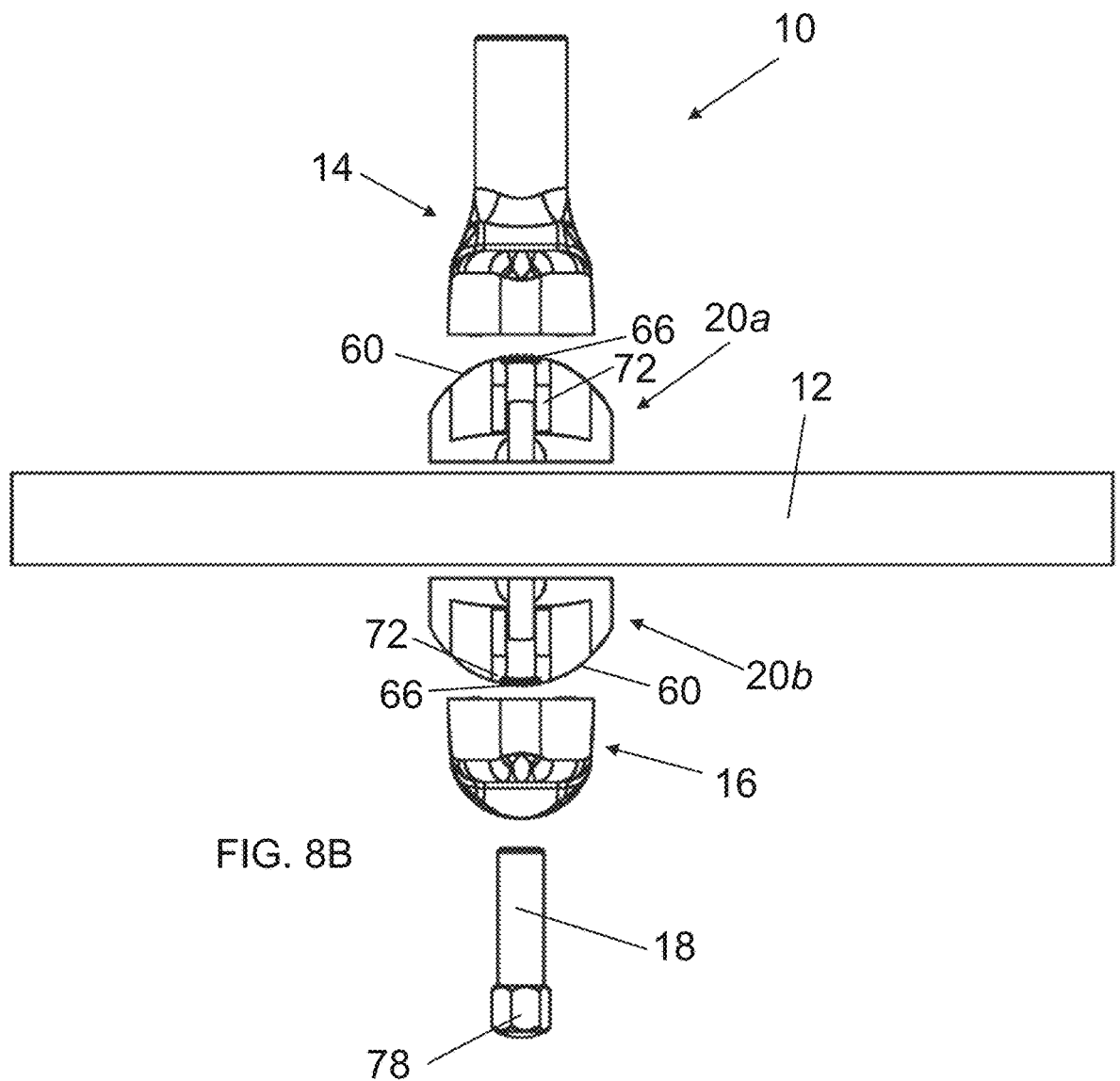
FIG. 8B is an exploded view from the side in an embodiment of the assembly of the slope adjusting pipe hanger of the present invention with a pipe horizontal with no adjustment of the angle of the insert.

Another important feature of the slope adjusting pipe hanger 10 is that the pipe hanger 10 may also be used to hold piping in a horizontal position at 0% slope or in a vertical orientation if required by the specification for installation of a piping system. Therefore, a separate pipe hanger to align pipe at the required specified gravity drainage percentage of slope is not needed. As shown in an exploded view in FIG. 8A, in the process of assembling the slope adjusting pipe hanger 10 of the present invention to a 0% slope or in a horizontal or vertical orientation, a first insert 20a is placed within the upper bracket 14 without rotation by placing the hub 64 within the channel 38 and aligning the tongue and groove ridges and indentations 66 at a 0% slope. The posts 72 are wedged within the channel 38 to secure the insert in the upper bracket 14. A second adjustable insert 20b is similarly placed within the lower bracket 16 without rotation by placing the hub 64 within the channel 38 and aligning the tongue and groove ridges and indentations 66 at a 0% slope. Bolts 18 are screwed into the bolt holes 34 of the lower bracket 16 and the insert 20a and upper bracket 14 are positioned and held around a pipe 12 that is aligned at a 0% slope. The insert 20b and the lower bracket 16 are mated with the insert 20a and upper bracket 14 and the bolts 18 are screwed into the bolt holes 34 of the upper bracket 14. As shown in an exploded side view of the assembly in FIG. 8B, as the bolts 18 are screwed into the bolt holes 34, the pipe 12 is held at a 0% slope with the aid of the alignment of the tongue and groove ridges and indentations 66 of the inserts 20a and 20b within the brackets 14 and 16 to have the pipe hanger 10 be mounted with the pipe 12 in a horizontal or vertical orientation at a 0% slope. A side view of the assembled slope adjusting pipe hanger 10 showing the pipe 12 in a horizontal orientation at a 0% slope is shown in FIG. 8C.

Figure 9A:
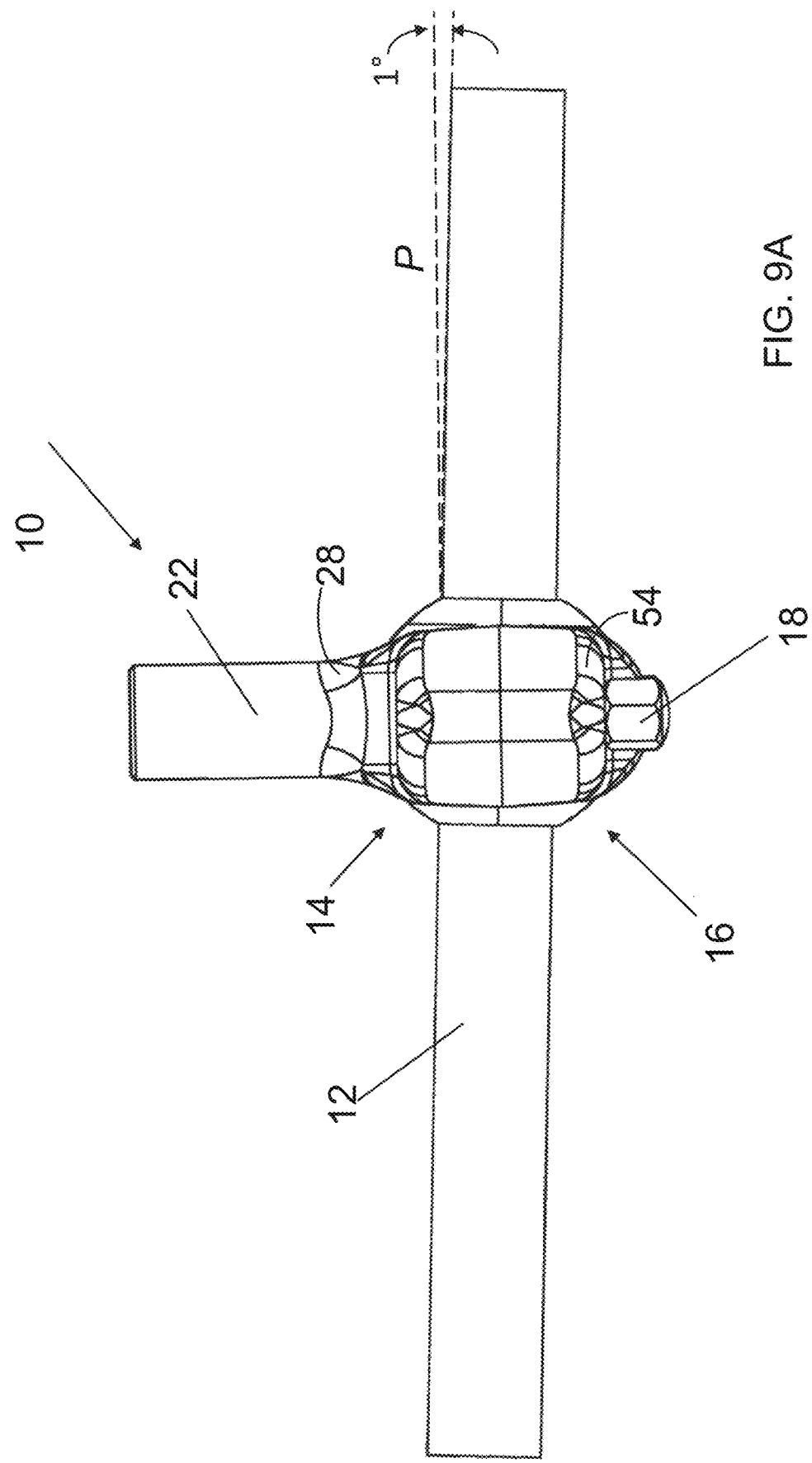
FIG. 9A is a side elevation view of an embodiment of the assembly of the slope adjusting pipe hanger of the present invention with a pipe adjusted to a 1% slope for gravity drainage.
Figure 9B:
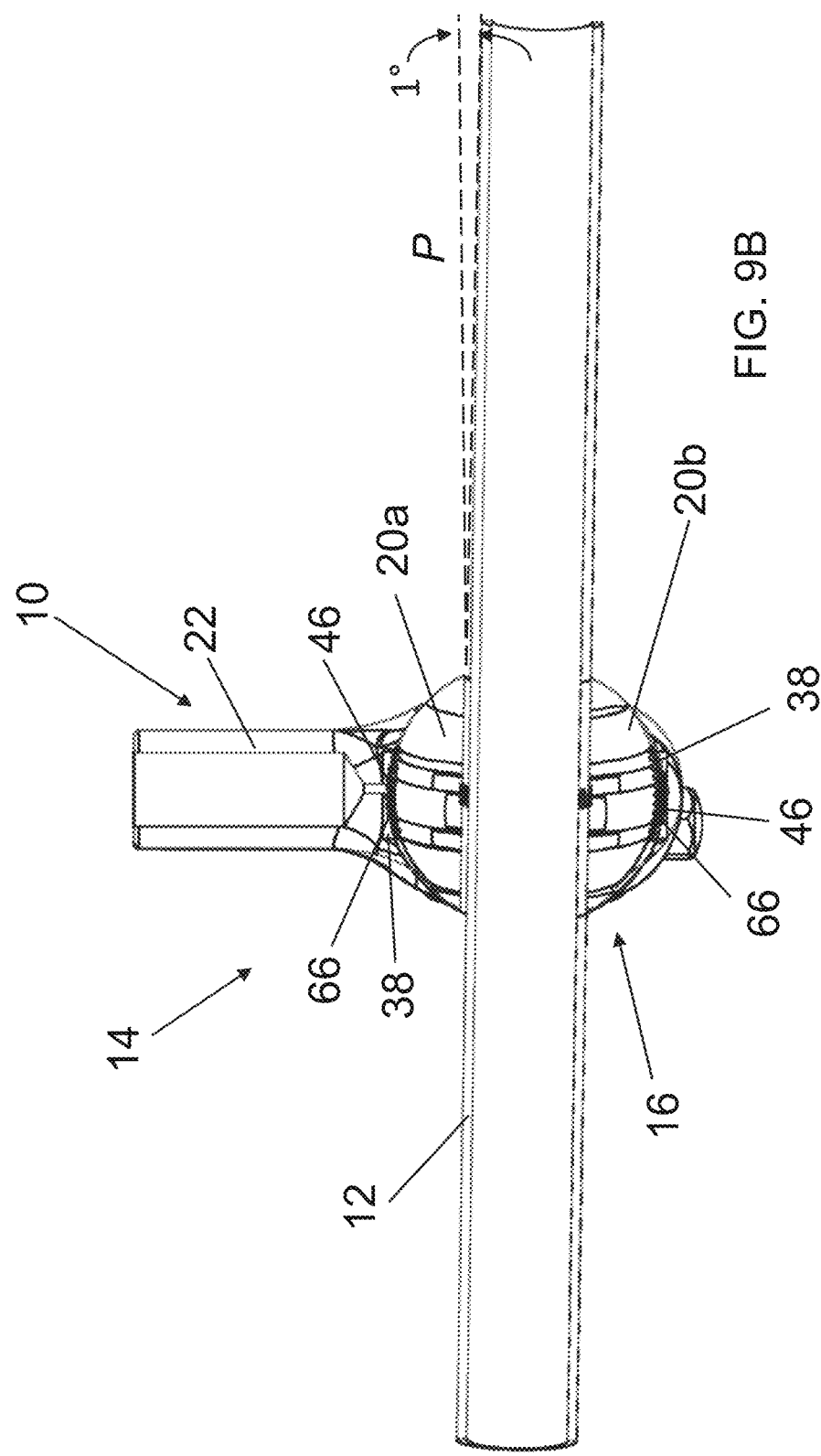
FIG. 9B is a cross-sectional view through the center along a vertical axis of the embodiment of the insert of FIGS. 9A of the slope adjusting pipe hanger of the present invention with a pipe adjusted to a 1% slope for gravity drainage.

The slope adjusting pipe hanger 10 of the present invention further provides for the adjustment of the slope of the pipe 12 to a 1% slope for gravity drainage as shown in FIG. 9A. The tongue and groove ridges and indentations 66 provide for the alignment and interlocking of the inserts 20a and 20b within the brackets 14 and 16 respectfully and alignment of the pipe 12 to a 1% slope with respect to the axis P prior to tightening the bolts 18 as shown in a cross-sectional view in FIG. 9B. As shown, even with a rotation of 1% slope, the tongue and groove ridges and indentations 46 and 66 of the brackets 14 and 16 and the inserts 20a and 20b respectfully interlock while the posts 72 wedged within the channel 38 held the inserts 20a and 20b within the brackets 14 and 16 and prevent further rotation as the posts 72 abut the sidewalls 80. In tightening the bolts 18 and attaching the lower bracket 16 to the upper bracket 16, the pipe 12 with the inserts 20a and 20b rotated is securely held to the specified 1% slope for gravity drainage.

Figure 10D:
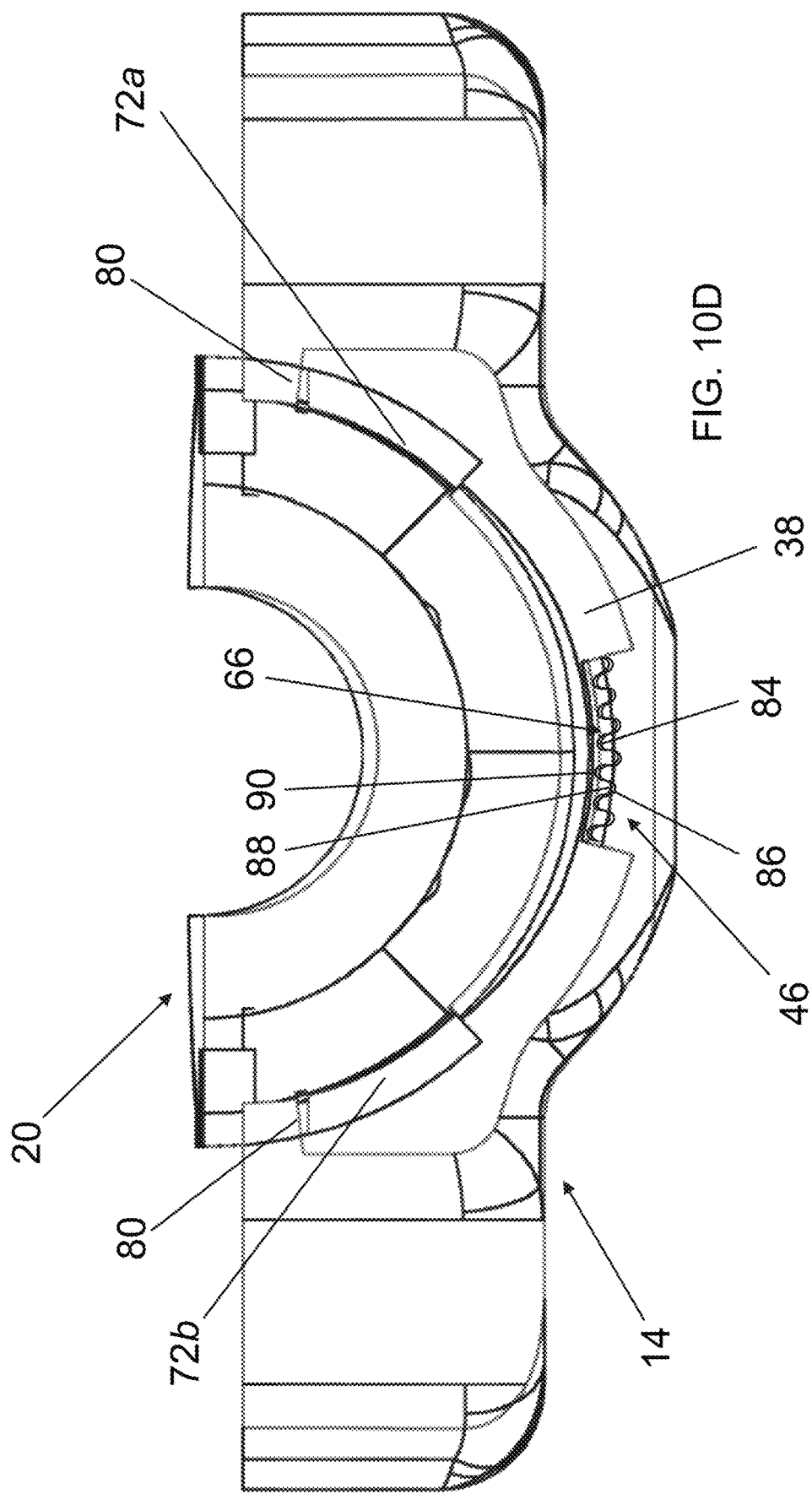
FIG. 10D is a side elevation view of an embodiment of the posts of the adjustable insert aligned within and secured by the channel of the bracket and the tongue and groove ridges and indentations of the adjustable insert configured to be aligned at the specified percentage of slope for gravity drainage in an embodiment of the slope adjusting pipe hanger of the present invention.
Figure 10E:
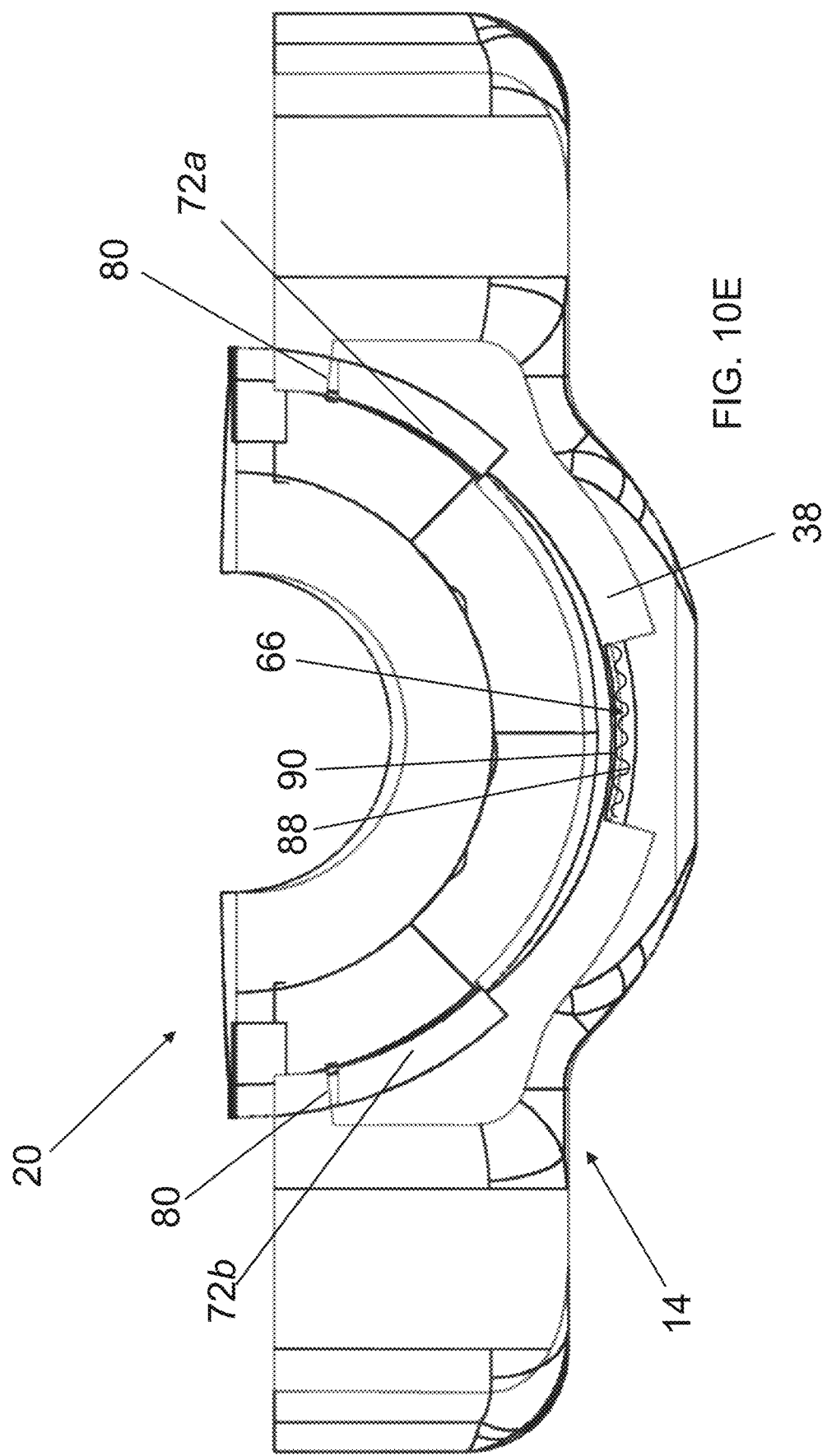
FIG. 10E is a side elevation view of a further embodiment of the adjustable insert aligned within and secured by the channel of the bracket with the bracket having no tongue and groove ridges and indentations in an embodiment of the slope adjusting pipe hanger of the present invention.
Figure 11A:
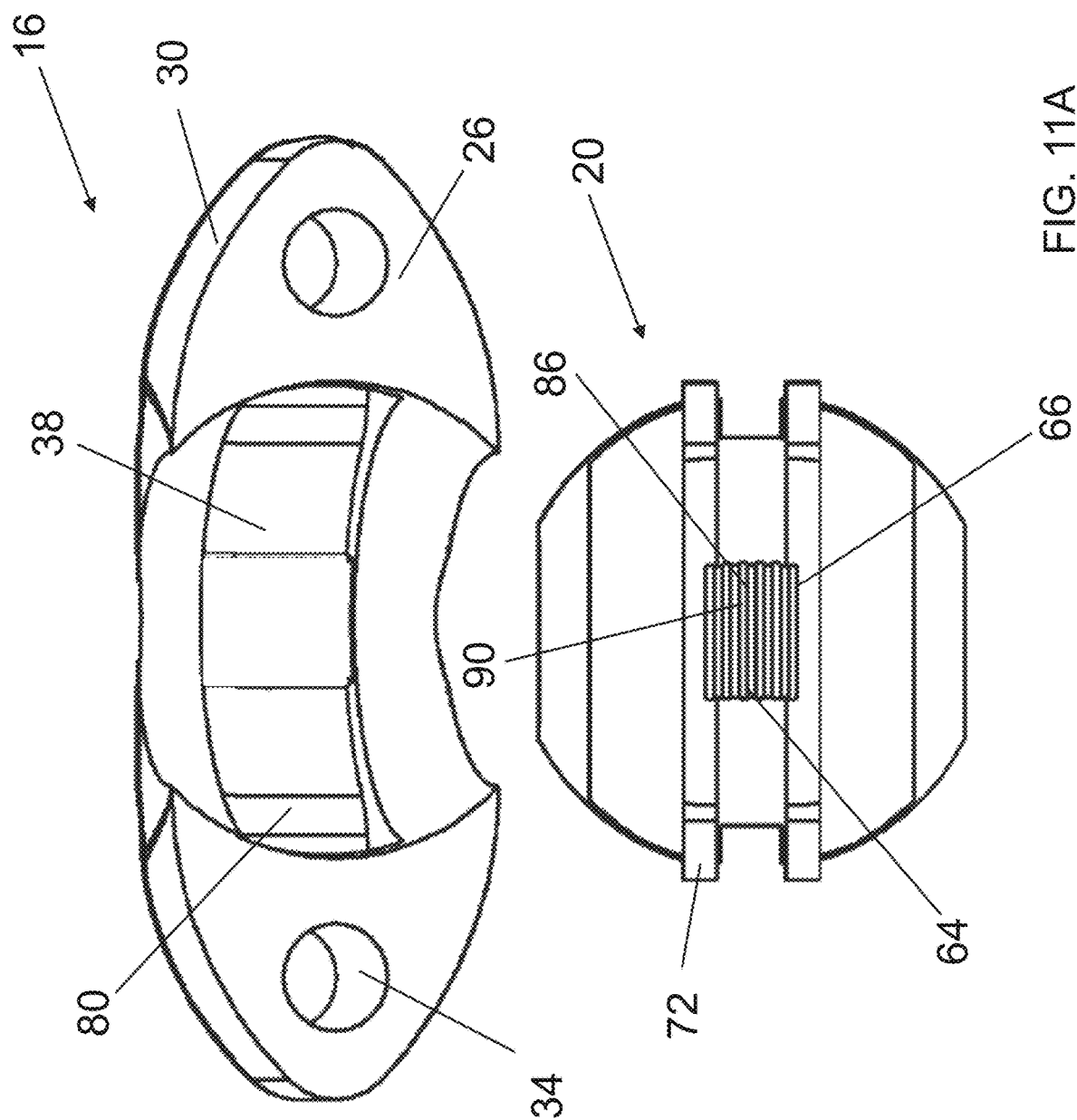
FIG. 11A is a perspective view of the further embodiment of the bracket of FIG. 10E without the tongue and groove ridges and indentations and the adjustable insert with the tongue and groove ridges and indentations in an embodiment of the slope adjusting pipe hanger of the present invention.
Figure 11B:
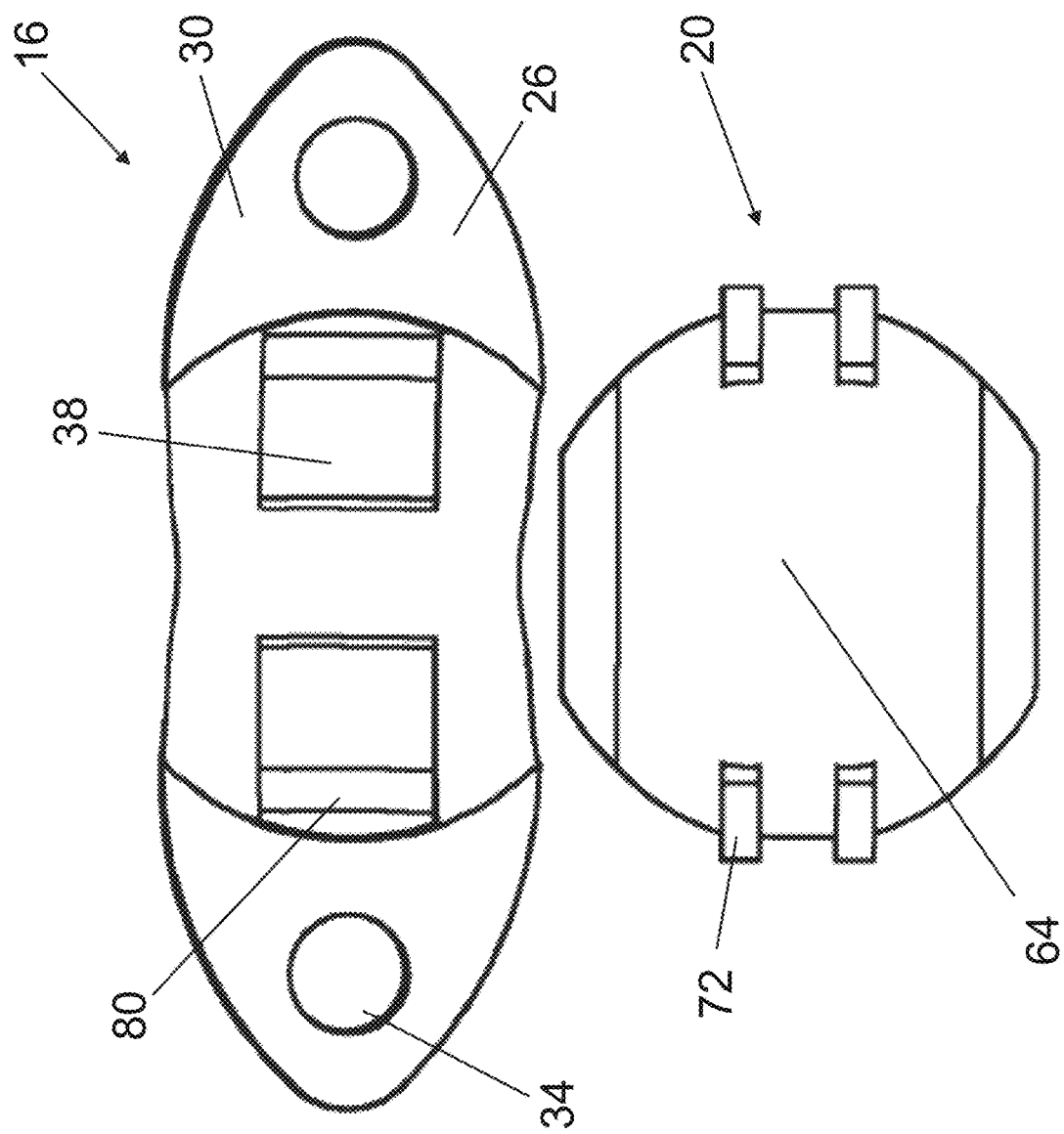
FIG. 11B is a perspective view of the further embodiment of the bracket of FIG. 10E without the tongue and groove ridges and indentations and a further embodiment of the adjustable insert without the tongue and groove ridges and indentations in an embodiment of the slope adjusting pipe hanger of the present invention.

The alignment and orientation of the tongue and groove ridges and indentations 46 and 66 of the bracket 14 and the insert 20 is shown in FIG. 10A showing the series of ridges 84 interlaced between the series of indentations 86 of the bracket 14 matching the profile and dimensions of the series of ridges 88 interlaced between the series of indentations 90 of the insert 20. As shown in this embodiment, the bracket 14 may provide a greater number of ridges 84 and indentations 86 to provide for the area needed to align the insert 20 at the specified percentage of slope of for example a 1% slope or a 2% slope by rotating the insert 20 to the proper percentage of slope when inserting the hub 64 of the insert 20 into the channel 38 of the bracket 14. As the hub 64 is inserted the posts 72 wedge into the channel 38 and are held holding the insert 20 to the bracket 14 to provide for the insert 20 to be more easily rotated to the specified percentage of slope without falling out of the bracket 14. As shown in FIG. 10B with the tongue and groove ridges and indentations 46 and 66 of the bracket 14 and the insert 20 not engaged, the posts 72 hold the insert 20 to the bracket 14 so that it can be rocked back and forth and rotated to the specified percentage of slope. Once properly rotated the tongue and groove ridges and indentations 46 and 66 of the bracket 14 and the insert 20 align and are engaged interlocking the insert 20 to the bracket 14 at the specified percentage of slope as shown in FIG. 10C. The insert 20 once aligned within the channel 38 of the bracket 14 and compressed by the tightening of the bolts 18 interlocks the tongue and groove ridges and indentations 46 and 66 of the bracket 14 and the insert 20 as shown in FIG. 10D. In some embodiments, the upper bracket 14 or the lower bracket 16 may not have the tongue and groove ridges and indentations as shown in FIG. 10E. By not having the tongue and groove ridges and indentations within the bracket 14 or 16, the pipe 12 can be aligned with the one insert 20*a* or 20*b* having the tongue and groove ridges and indentations 66 within one of the brackets 14 or 16 and be freely adjusted with the other insert 20*a* or 20*b* within the other bracket 14 and 16 without having tongue and groove ridges and indentations affect the ability to adjust the slope which is particularly beneficial with pipes of larger diameters. The tightening of the bolts 18 and interlocking of the one set of tongue and groove ridges and indentations of the one insert 20*a* or 20*b* and one bracket 14 or 16 sets and secures the pipe 12 at the specified percentage of slope within the other bracket 14 or 16 of the slope adjusting pipe hanger 10 of the present invention. In FIG. 11B, a further embodiment without tongue and groove ridges and indentations 46 and 66 respectfully on either the inserts 20*a* and/or 20*b* or the brackets 14 and/or 16 is shown. The plastic or elastomeric material of the insert 20*a* and/or 20*b* , the matching of the curvatures of the hubs 64 with the curvature of the channels 38 of each bracket 14 and 16, and the full tightening of the bolts 18 compresses the inserts 20*a* and 20*b* into the brackets 14 and 16 and provides sufficient adjustment of the angle of the inserts 20*a* and 20*b* to secure the pipe 12 at the specified percentage slope. The force of this compression fit between the upper bracket 14 and upper insert 20*a* secured around the pipe 12 with the lower bracket 16 and lower insert 20*b* is enough to secure small diameter pipes and tubes that are transporting low weight low pressure gases at the specified gravity drainage slope.

Figure 12A:
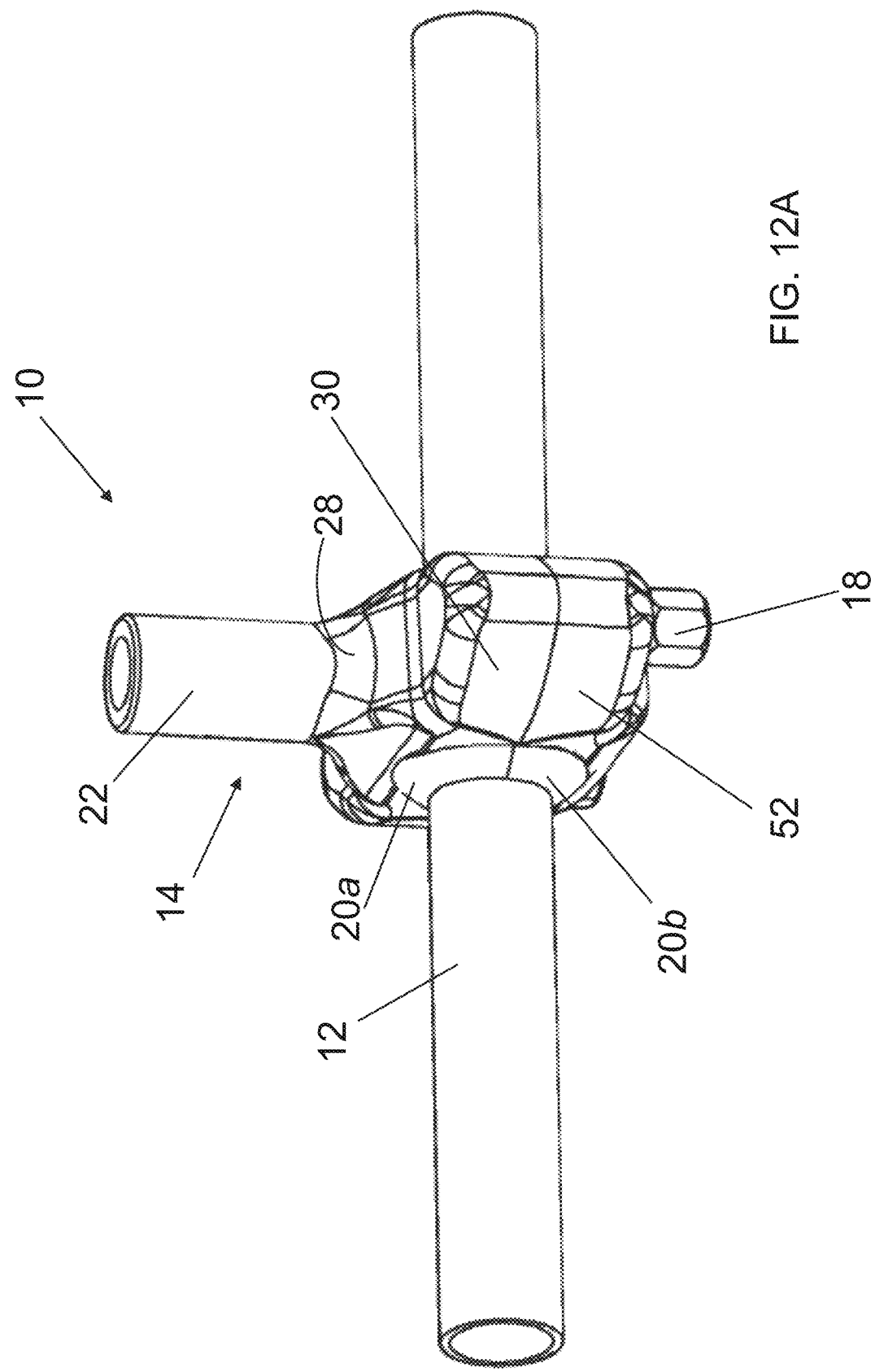
FIG. 12A is a perspective view from the side of an embodiment of the slope adjusting pipe hanger of the present invention with a pipe installed in a horizontal orientation.
Figure 13A:
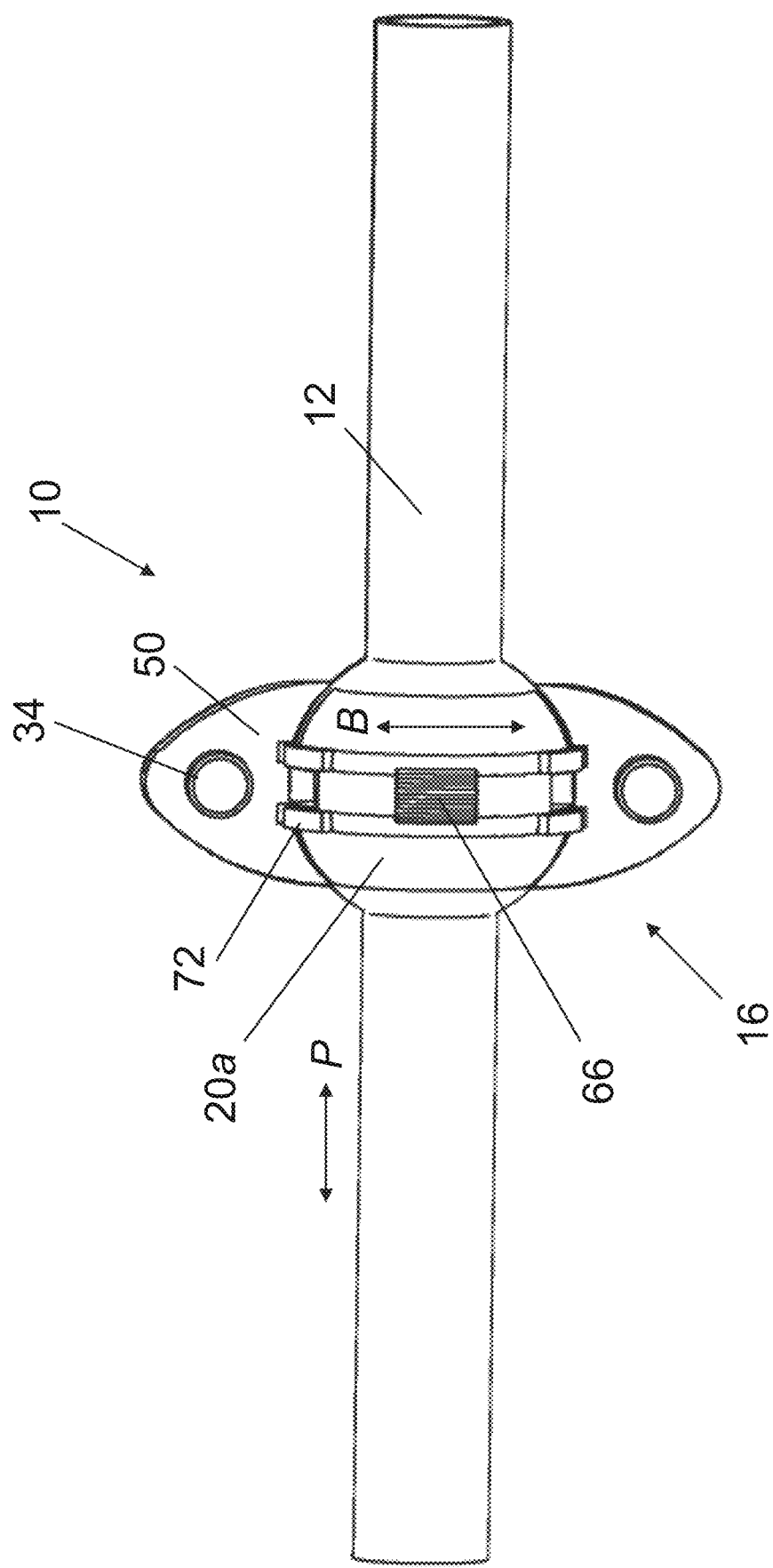
FIG. 13A is a top view of an embodiment of the inserts around a pipe and installed in the lower bracket in an embodiment of the slope adjusting pipe hanger of the present invention.
Figure 13B:
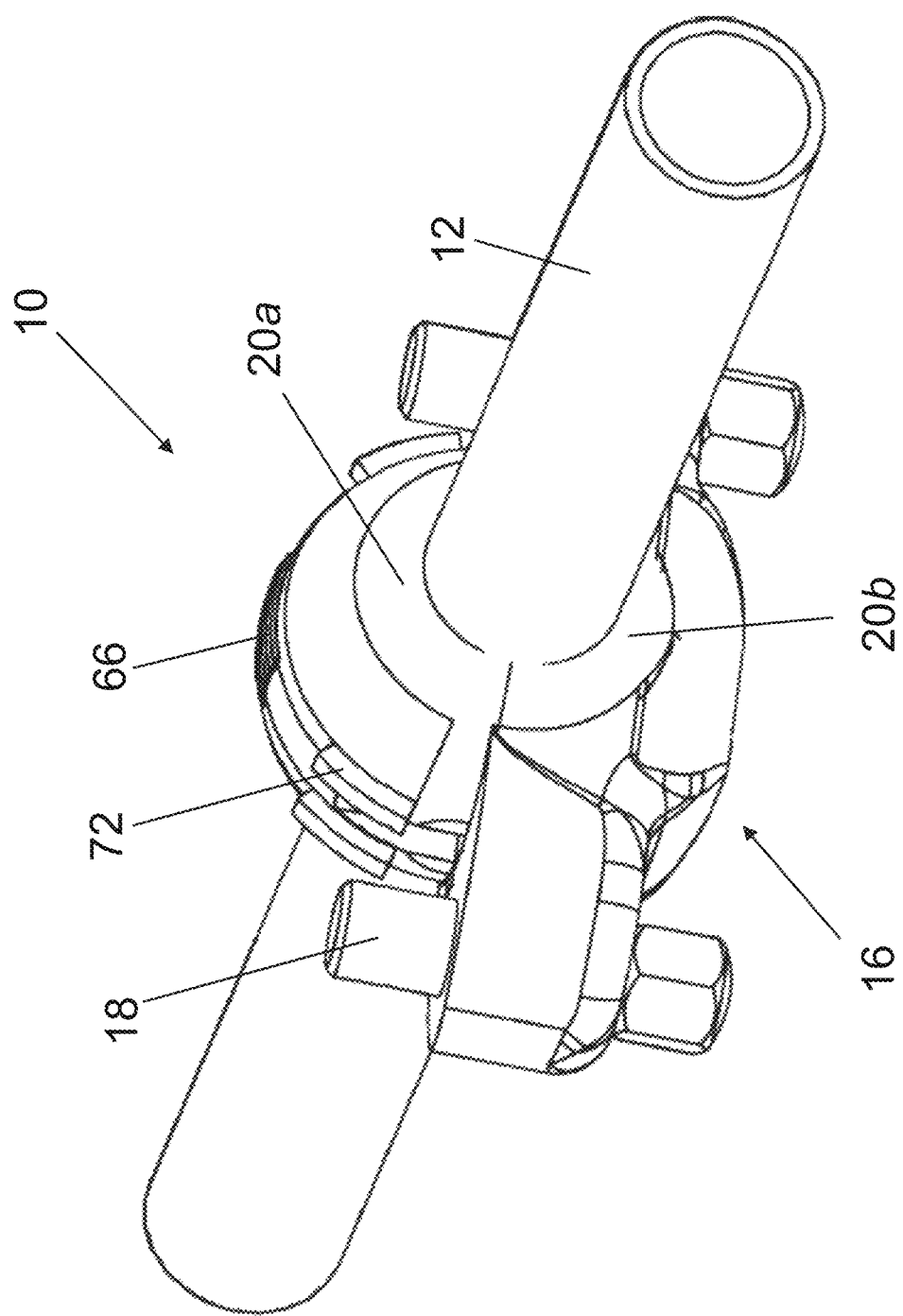
FIG. 13B is a perspective view of the embodiment of FIG. 13A showing the inserts around the pipe and installed in the lower bracket in an embodiment of the slope adjusting pipe hanger of the present invention.

The further diagrams are provided to show the smooth contours of the exterior surfaces and the spatial relationship of the components in various embodiments of the slope adjusting pipe hanger 10 of the present invention as shown in a perspective view from the side in FIG. 12A and in a perspective view from the bottom in FIG. 12B. In FIG. 13A, the inserts 20*a* and 20*b* are shown installed around a pipe 12 and placed within the lower bracket 14 showing the alignment of the tongue and groove ridges and indentations 66 of the insert 20*a* and 20*b* along axis B that is perpendicular to axis P of the pipe. A perspective view of the inserts installed within the lower bracket 16 I shown in FIG. 13B with bolts 18 installed for attachment of the lower bracket 16 with inserts 20*a* and 20*b* to the upper bracket 14. The securing of the insert 20*b* within the bracket 14 using the posts 72 and mating the upper insert 20*a* with the lower insert 20*b* around the pipe 12 provides for the upper bracket 14 to be mounted on a ceiling and the lower bracket 16 with inserts 20*a* and 20*b* with the pipe 12 adjusted to the proper gravity drainage slope to be installed to the upper bracket 14 by simply tightening the bolts 18 into the bolt holes 34 of the upper bracket 16 with the tongue and groove ridges and indentations 66 of the inserts 20*a* and 20*b* interlocking with the tongue and groove ridges and indentations 46 of the brackets 14 and 16 to secure the pipe 12 at the specified slope.

Figure 14B:
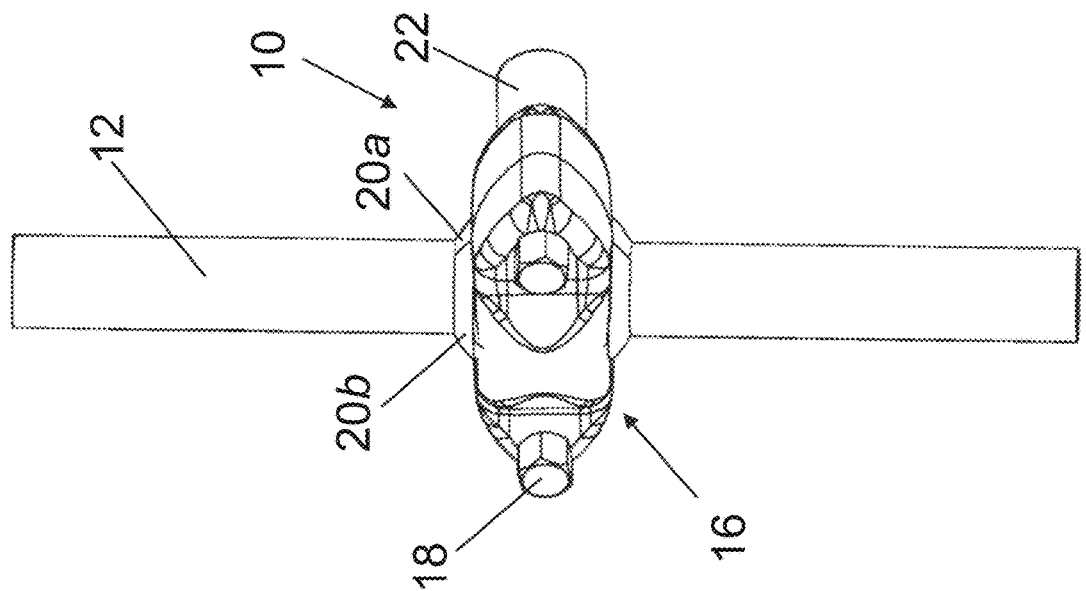
FIG. 14B is a perspective view of an embodiment of the slope adjusting pipe hanger of the present invention with a pipe installed in a vertical orientation.
Figure 14A:
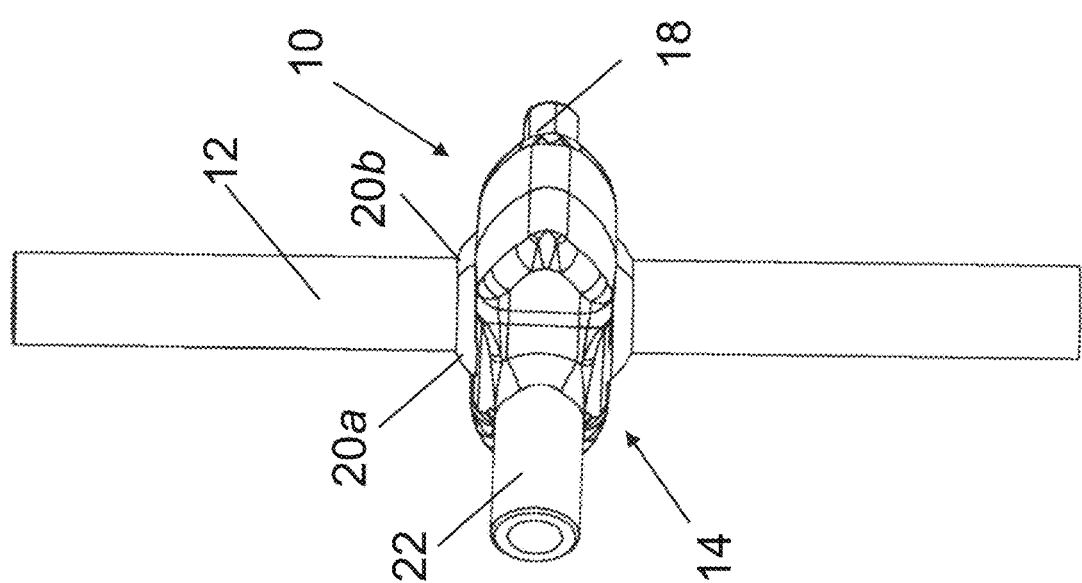
FIG. 14A is a perspective view of an embodiment of the slope adjusting pipe hanger of the present invention with a pipe installed in a vertical orientation.
Figure 15A:
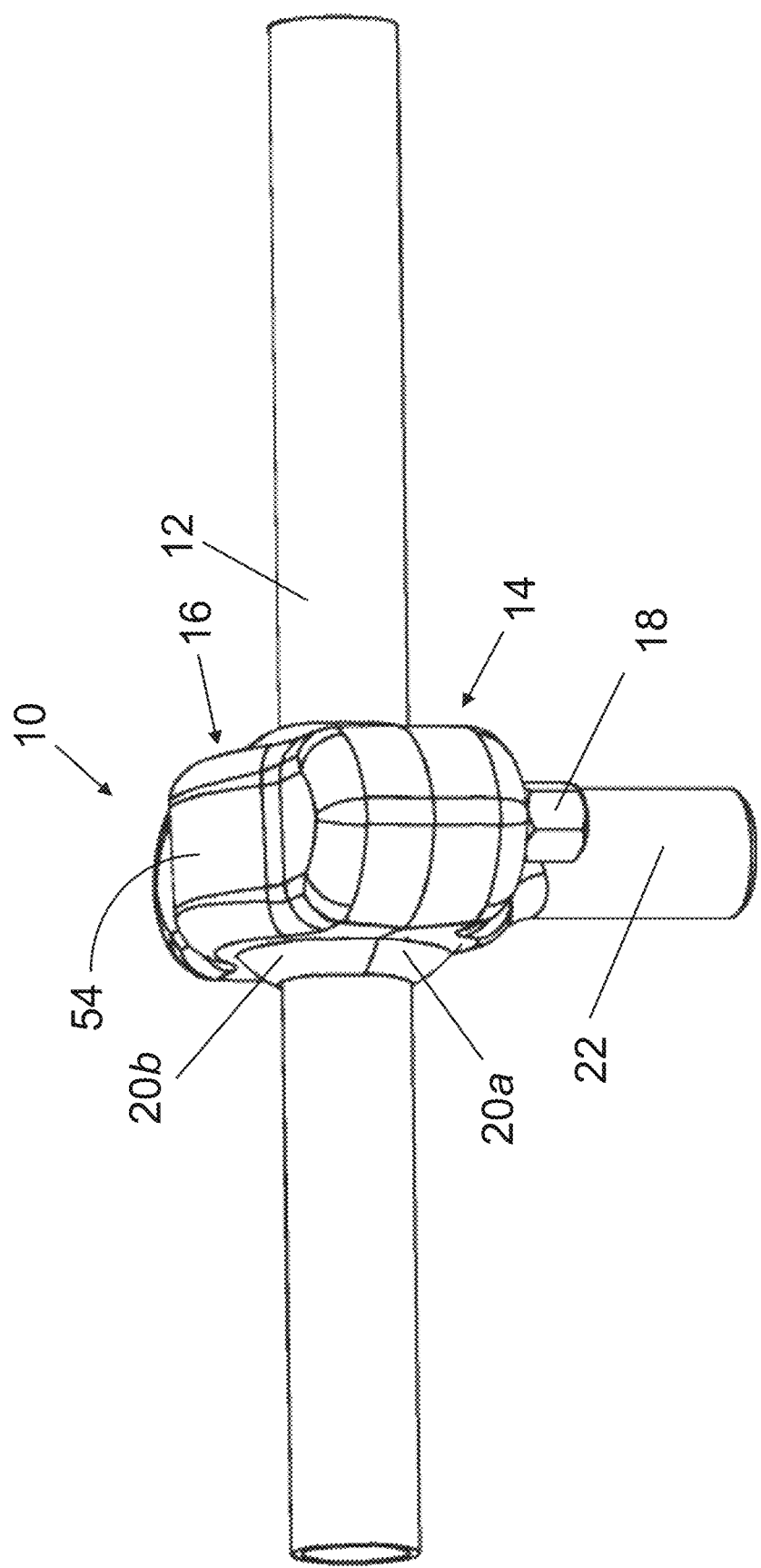
FIG. 15A is a perspective view from the side of further embodiments of the upper bracket and lower bracket with bolts inserted through the upper bracket into the lower bracket in an embodiment of the slope adjusting pipe hanger of the present invention with a pipe installed.
Figure 15B:
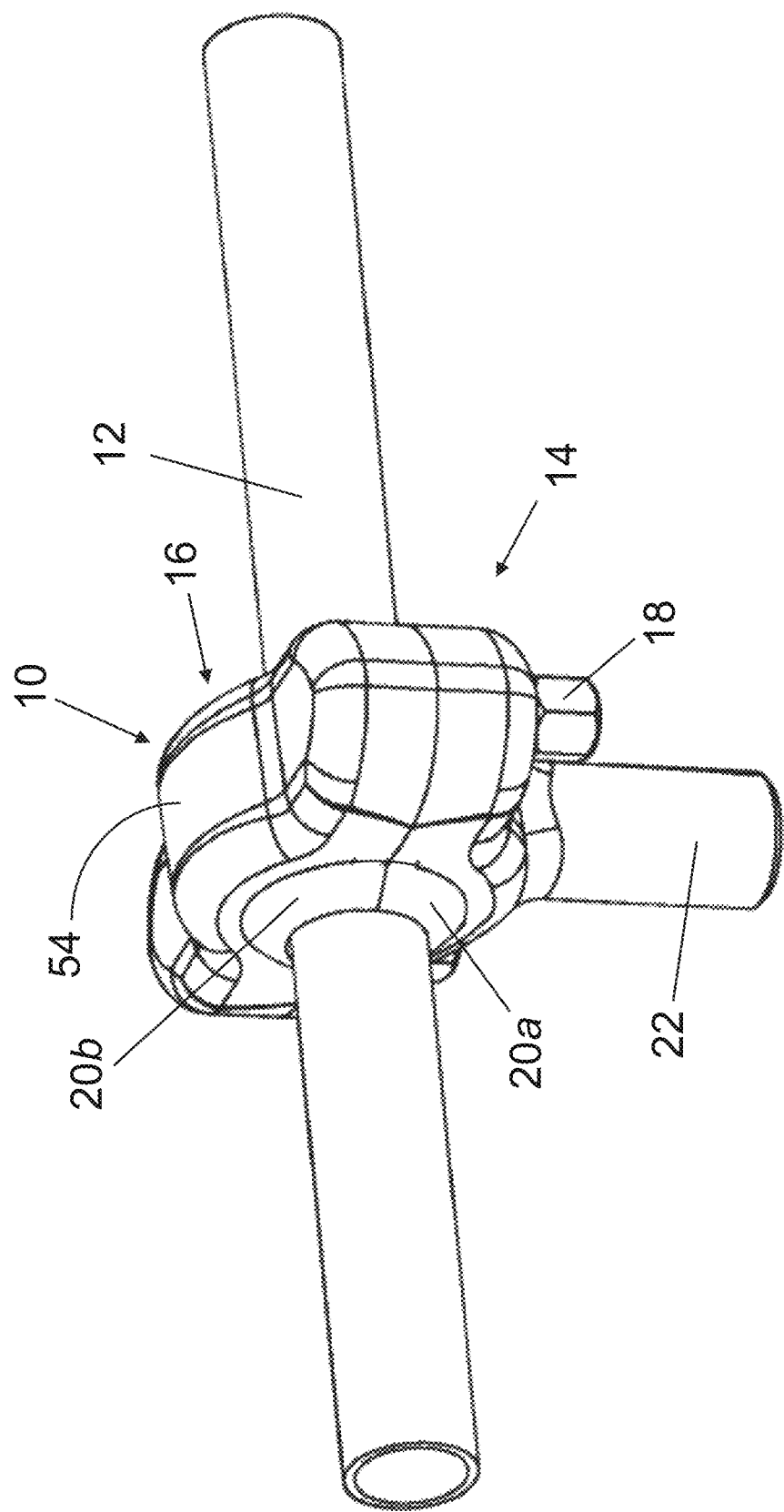
FIG. 15B is a perspective view of the further embodiments of the upper bracket and lower bracket of FIG. 15A in an embodiment of the slope adjusting pipe hanger of the present invention with a pipe installed.
Figure 15C:
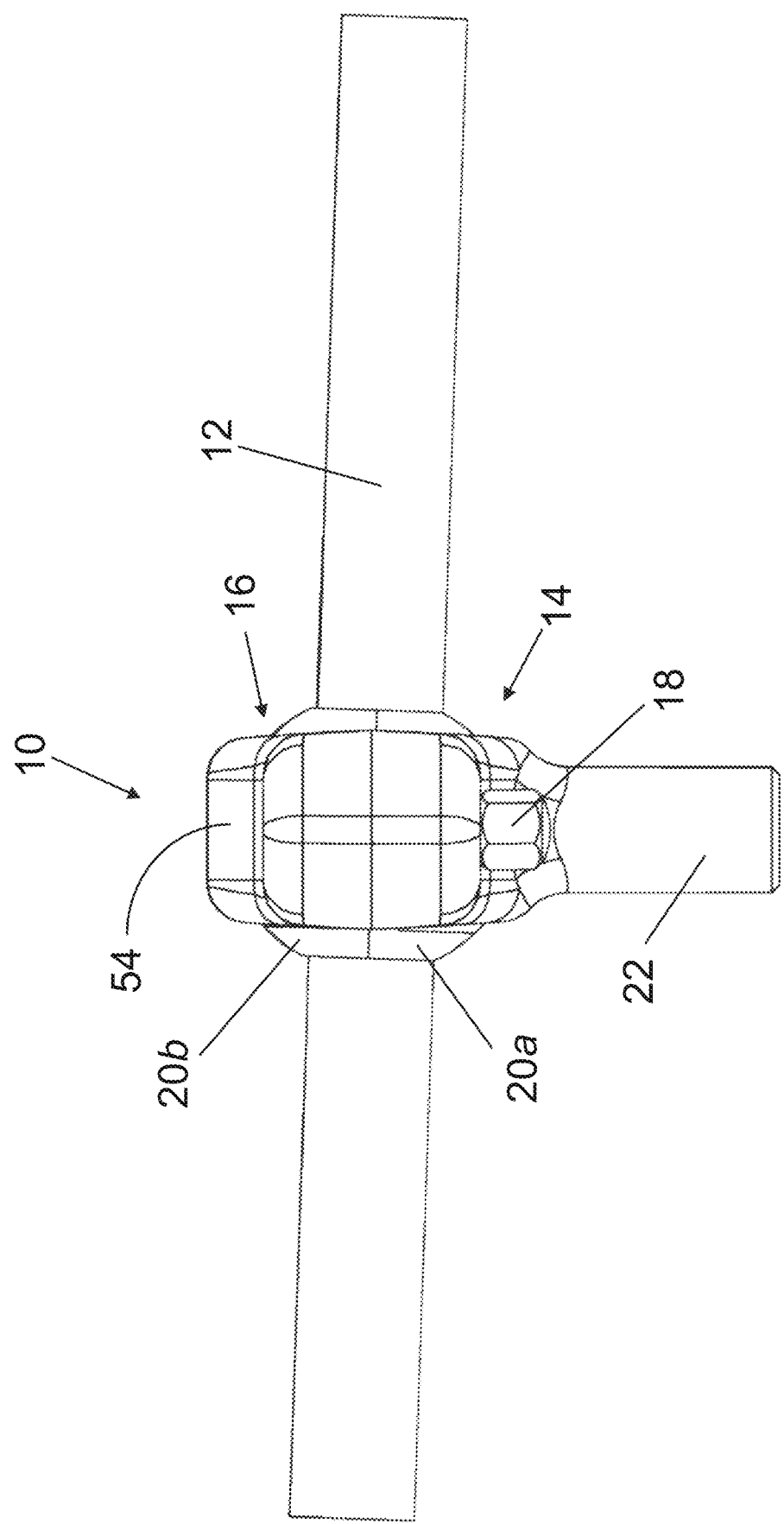
FIG. 15C is a side elevation view of the further embodiments of the upper bracket and lower bracket of FIG. 15A in an embodiment of the slope adjusting pipe hanger of the present invention with a pipe installed.
Figure 15D:
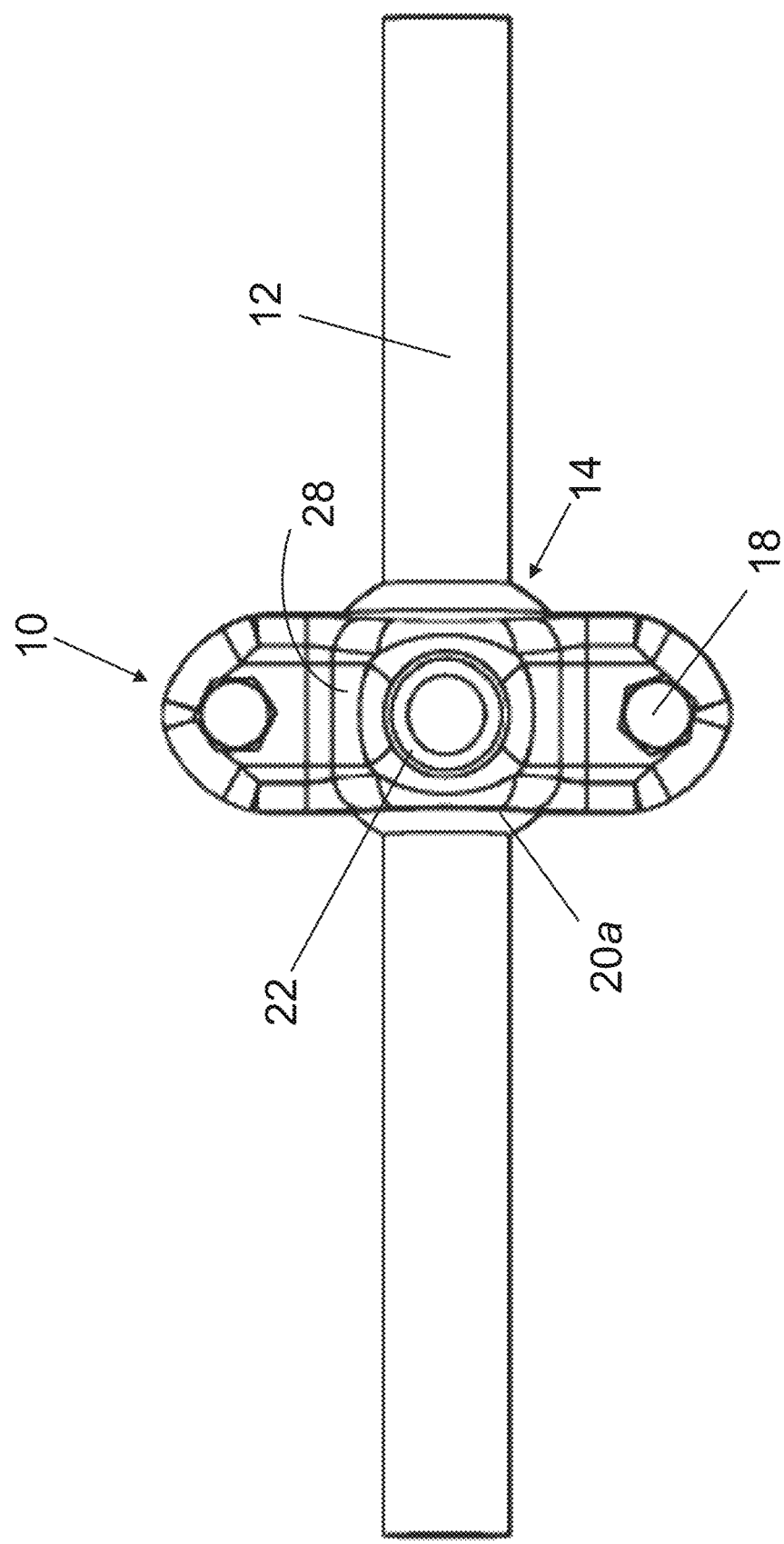
FIG. 15D is a bottom view of the further embodiments of the upper bracket and lower bracket of FIG. 15A in an embodiment of the slope adjusting pipe hanger of the present invention with a pipe installed.
Figure 15F:
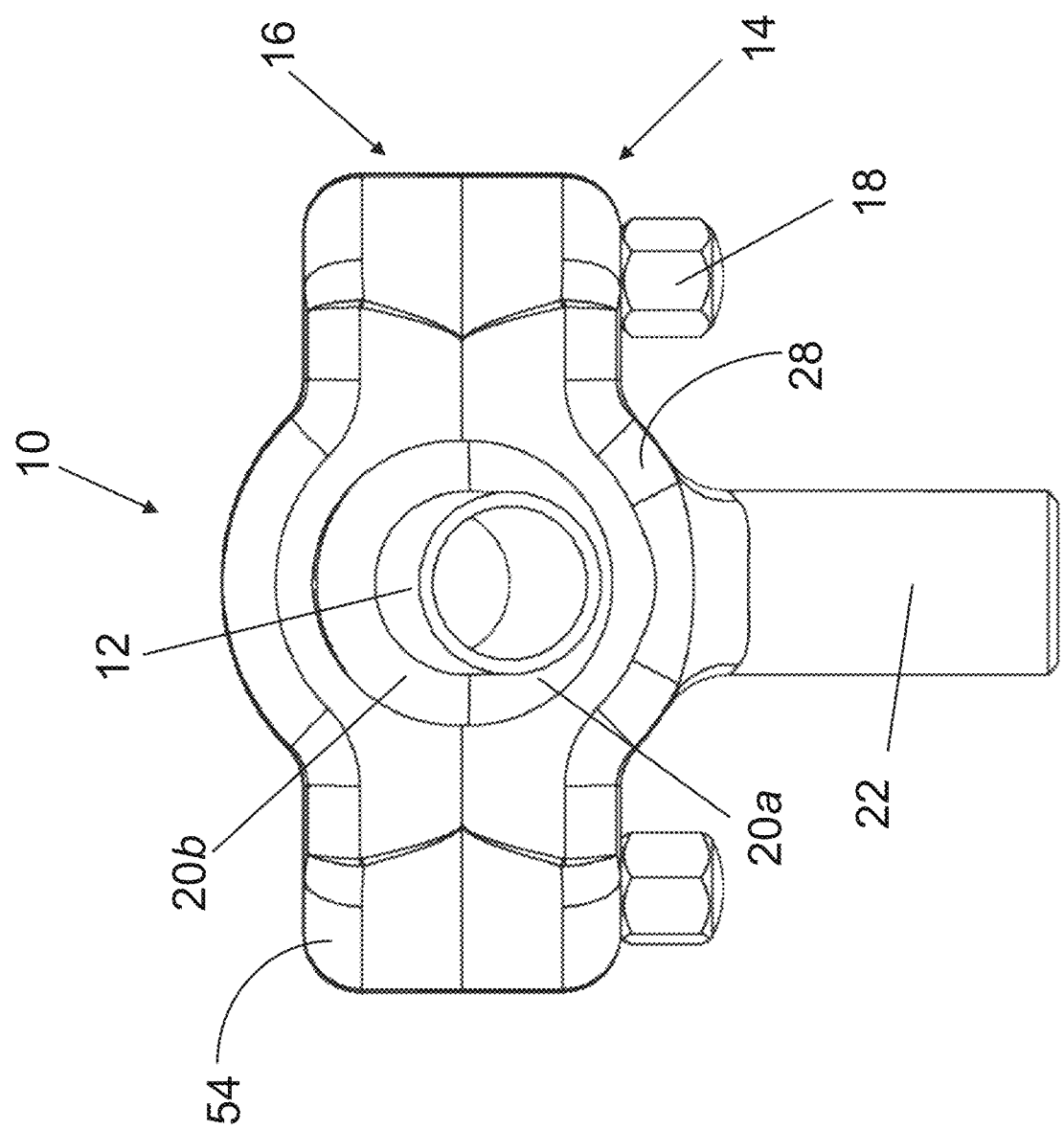
FIG. 15F is a front elevation view of the further embodiments of the upper bracket and lower bracket of FIG. 15A in an embodiment of the slope adjusting pipe hanger of the present invention with a pipe installed.

The pipe hanger may be mounted in a vertical orientation along a wall, panel or equipment frame as shown in FIGS. 14A and 14B. In a further embodiment of the upper bracket 14 and of the lower bracket 16 of the slope adjusting pipe hanger 10 the bolts 18 are inserted through the upper bracket 14 and screwed into the lower bracket 16 to attach and secure the inserts 20*a* and 20*b* at the desired specified percentage of slope as shown in FIG. 15A. The lower bracket 16 has a smooth contoured surface 54 without bolt holes 34. In this embodiment, the cylindrical anchor 22 may be mounted to a floor and the inserts 20*a* and 20*b* surrounding the pipe 12 may be supported within the bracket 14 as the bolts 18 are tightened to align and interlock the tongue and groove ridges and indentations 66 of the inserts 20*a* and 20*b* with the tongue and groove ridges and indentations 46 of the brackets 14 and 16 to secure the pipe 12 at the specified slope. A perspective view from the side of this further embodiment is shown in FIG. 15B and a side elevation view is shown in FIG. 15C. A bottom view looking down the cylindrical anchor 22 is shown in FIG. D and a top view of this further embodiment is shown in FIG. 15E. A front elevation view of this further embodiment with the pipe at a percentage slope of 2% is shown in FIG. 15F.

Figure 16B:
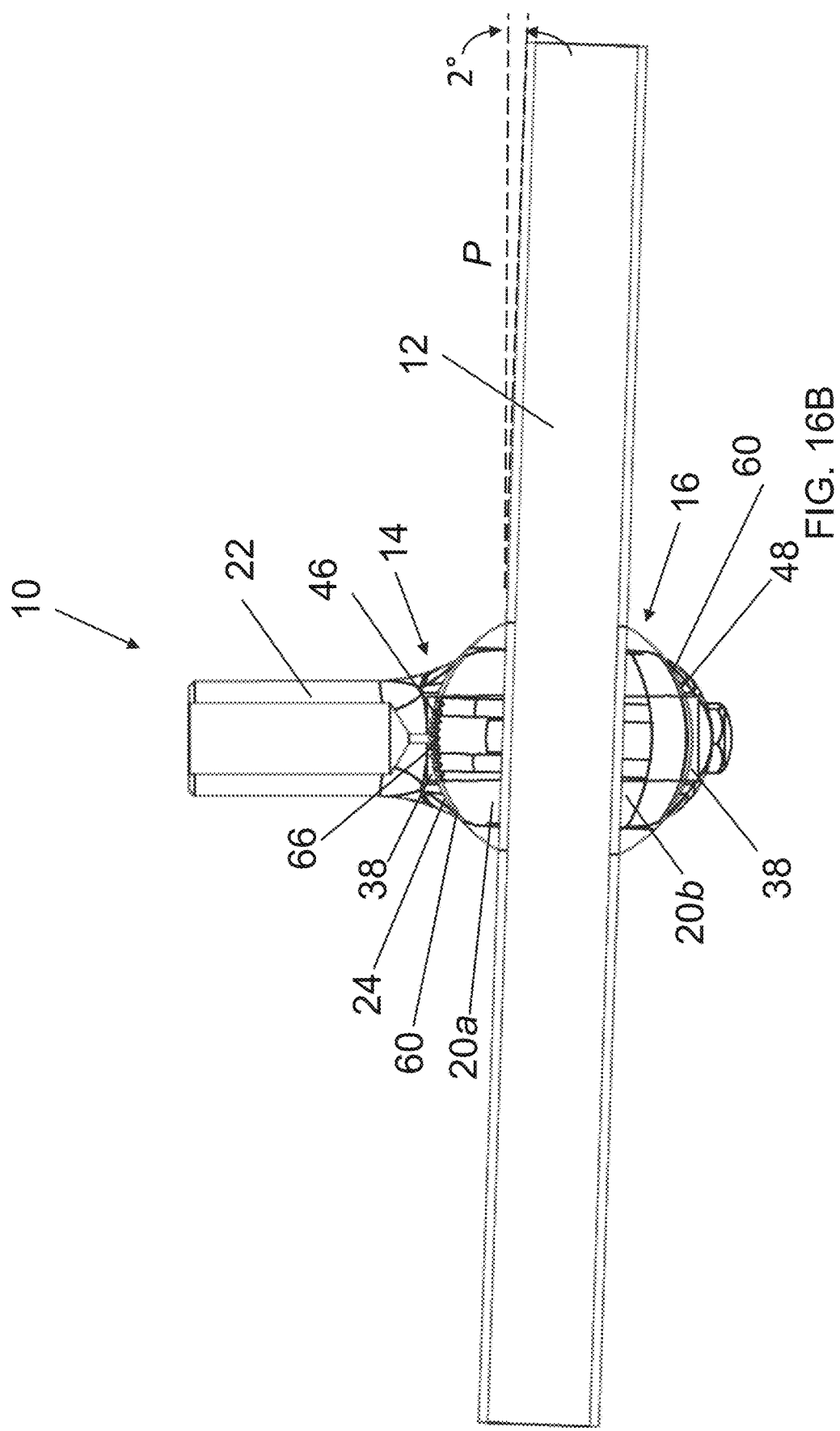
FIG. 16B is a cross-sectional view of a further embodiment of the slope adjusting pipe hanger of the present invention with tongue and groove ridges and indentations on both the upper bracket and upper insert and no tongue and groove ridges and indentations on the lower bracket and lower insert.

In FIG. 16A the internal components from a cross-sectional view showing the matching of the curvature of the interior surface 24 and 48 of the brackets 14 and 16 to the curvature of the outer surface 60 of the inserts 20*a* and 20*b* to form fit the inserts 20*a* and 20*b* within the brackets 14 and 16. As the bolts 18 are screwed tightly into the upper bracket 14 to compress the inserts 20*a* and 20*b* into each of the upper and lower brackets 14 and 16, the tongue and groove ridges and indentations 66 of the inserts 20*a* and 20*b* align and interlock with the tongue and groove ridges and indentations 46 of the brackets 14 and 16 to secure the pipe 12 at the specified slope is shown at a 0% slope. The matching curvature of the interior surface 24 and 48 of the brackets 14 and 16 and matching profile of the tongue and groove ridges and indentations 46 of the bracket to the curvature of the outer surface 60 and matching profile of the tongue and groove ridges and indentations 66 of the inserts 20*a* and 20*b* increases the strength of the tongue and groove ridges and indentations 46 and 66 and prevents voids or exposed areas between the brackets 14 and 16 and inserts 20*a* and 20*b* where contaminants or bacteria build-up may form with FIG. 16A showing the tight fit between the components of the slope adjusting pipe hanger 10 of the present invention.

Figure 16C:
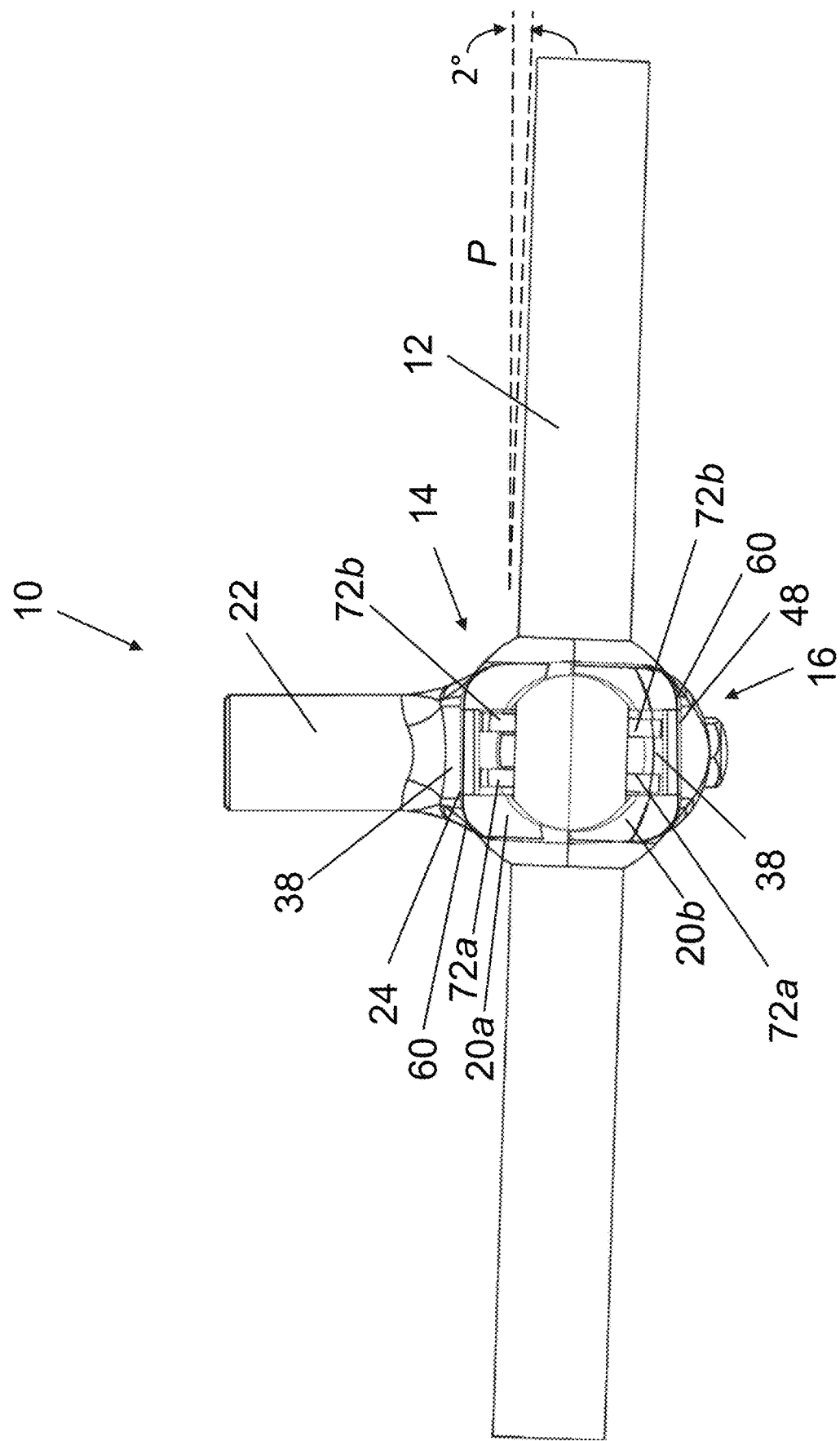
FIG. 16C is a cross-sectional view of a still further embodiment of the slope adjusting pipe hanger of the present invention with no tongue and groove ridges and indentations on either the upper or lower brackets or on either the upper or lower inserts with channels within each bracket and posts along the outer surface of each insert.
Figure 16D:
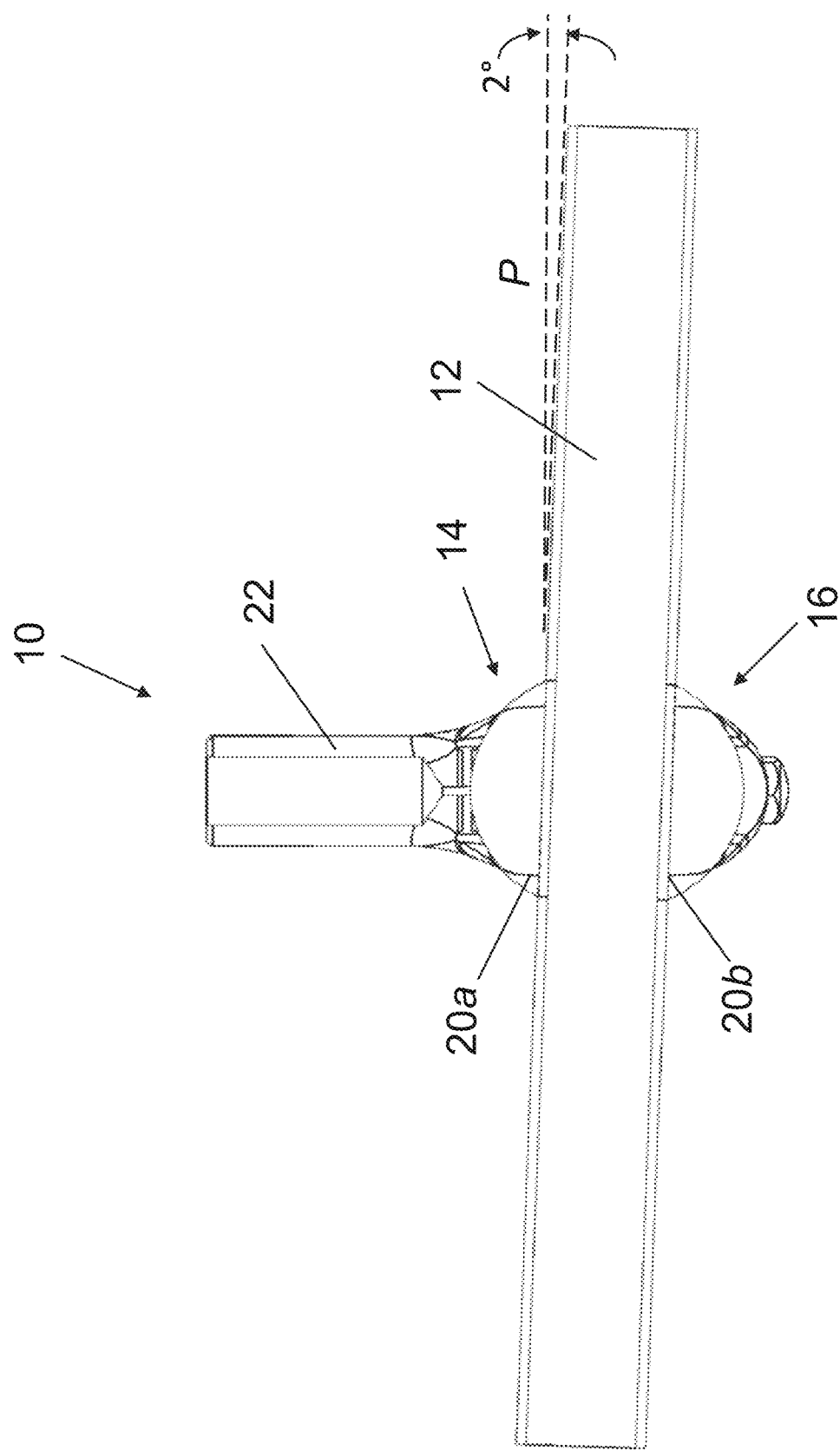
FIG. 16D is a cross-sectional view of a still further embodiment of the slope adjusting pipe hanger of the present invention with no tongue and groove ridges and indentations on either the upper or lower brackets or on either the upper or lower inserts.

In a further embodiment, a cross-sectional view showing the bolts 18 screwed tightly into the upper bracket 14 to compress the inserts 20*a* and 20*b* into each of the upper and lower brackets 14 and 16 and align and interlock the tongue and groove ridges and indentations 66 of the upper insert 20*a* with the tongue and groove ridges and indentations 46 of the upper bracket 14. The upper and lower brackets 14 and 16 have the matching curvature of their interior surfaces 24 and 48 respectfully of the brackets 14 and 16 with the outer surface 60 of each insert 20a and 20b. However, the lower insert 20b and lower bracket 16 in this embodiment do not have the tongue and groove ridges and indentations 66 but due to the form fit of the interior surfaces and the interlocking of the tongue and grooves 46 and 66 of the upper bracket 14 and the upper insert 20a, the pipe 12 can be aligned to the specified slope which is shown as 2° in this example. By not having any tongue and groove ridges and indentations 66 within the lower insert 20b and lower bracket 16 the pipe at the specified angle can freely adjust the lower insert 20b within the lower bracket 16 by pivoting the insert 20b to mate with the flat bottom 68 of the upper insert 20a. As the bolts 18 are tightened the pipe 12 within the adjusted upper and lower inserts 20a and 20b is aligned and secured at the specified angle. In a still further embodiment, as shown in FIG. 16C, there are no tongue and groove ridges and indentations 46 and 66 on the inserts 20a and 20b or on the brackets 14 and 16. In this still further embodiment without tongue and groove ridges and indentations, the plastic or elastomeric material of the insert 20a and/or 20b, the matching of the curvature of the interior surfaces 24 and 48 of the brackets 14 and 16 respectfully to the outer surface 60 of the inserts 20a and 20b and the hub 64 of the inserts 20a and 20b with the channel 38 of each bracket 14 and 16 and the full tightening of the bolts 18 compresses the inserts 20a and 20b into the brackets 14 and 16 and secures the angle of the pipe 12 at the specified percentage of slope so that smaller diameter pipes and tubes that are transporting low weight low pressure gases are secured at the specified gravity drainage slope. As shown in this cross-sectional view the posts 72a and 72b of the inserts 20a and 20b stop the rotation of the inserts 20a and 20b as the posts 72a or 72b abut the sidewall 80 of the channel 38 to prevent over rotation that may cause gaps to prevent the build-up of bacteria or contaminants. Another embodiment without the channels 38 within the brackets 14 and 16 or the posts 72a and 72b of the inserts 20a and 20b is shown in FIG. 16D. In this embodiment, the plastic or elastomeric material of the insert 20a and/or 20b and the matching of the curvature of the hub 64 of the insert 20a and 20b with the curvature of the interior surface 24 and 48 of each bracket 14 and 16 and the full tightening of the bolts 18 compresses the inserts 20a and 20b into the brackets 14 and 16 and secures the angle of the pipe 12 at the specified percentage of slope so that smaller diameter pipes and tubes that are transporting low weight low pressure gases are secured at the specified gravity drainage slope.

Although specific embodiments of the invention have been disclosed herein, it is to be understood that this is for purposes of illustration. This disclosure is not to be construed as limiting the scope of the invention, since the described embodiments may be changed in detail as will become apparent to those skilled in the art in order to adapt the invention to particular applications, without departing from the scope of the following claims and equivalents of the claimed elements.

What is claimed is:

1. A slope adjusting pipe hanger bracket and insert, comprising:
    a bracket having tongue and groove ridges and indentations;
    an insert having mating tongue and groove ridges and indentations, the insert configured to surround a pipe and to be rotated to a specified percentage of slope and be placed in the bracket at said specified percentage of slope interlocking the tongue and groove ridges and indentations of the insert with the tongue and groove ridges and indentations of the bracket; and
    wherein the specified percentage of slope aligns the pipe at an angle of the specified percentage of slope for gravity drainage and locks the pipe at that angle by the alignment and interlocking of the insert's tongue and groove ridges and indentations with the tongue and groove ridges and indentations of the bracket.

2. The slope adjusting pipe hanger bracket and insert of claim 1, comprising:
    a second bracket having tongue and groove ridges and indentations;
    a second insert having mating tongue and groove ridges and indentations the second insert configured to surround the pipe and to be rotated to a specified percentage of slope and be placed in the second bracket at that specified percentage of slope interlocking the tongue and groove ridges and indentations of the second insert with the tongue and groove ridges and indentations of the second bracket;
    wherein the bracket is a first bracket and the insert is a first insert and wherein each of the first and second inserts are configured to be installed within each first and second bracket to support the pipe and each first and second insert configured to be rotated to a specified percentage of slope to align the pipe at the angle of slope for gravity drainage and locks the pipe at that angle by the interlocking of the first insert's tongue and groove ridges and indentations with the tongue and groove ridges and indentations of the first bracket and the alignment and interlocking of the second insert's tongue and groove ridges and indentations with the tongue and groove ridges and indentations of the second bracket; and
    wherein the first and second brackets with the first and second inserts secured at the specified percentage of slope are configured to be installed around the pipe to set a slope of the pipe at the specified percentage of slope.

3. The slope adjusting pipe hanger bracket and insert of claim 1, comprising:
    a second bracket having no tongue and groove ridges or indentations;
    a second insert having no tongue and groove ridges or indentations; and
    wherein each of the first and second inserts are configured to be installed within each first and second bracket to support the pipe and the first insert is configured to be rotated to a specified percentage of slope to align the pipe at that angle of slope for gravity drainage and lock the pipe at that angle by the interlocking of the first insert's tongue and groove ridges and indentations with the tongue and groove ridges and indentations of the first bracket; and
    wherein the first and second brackets and first and second inserts configured to be installed around the pipe with the first and second brackets attached using bolts, the bolts configured to be tightened to have the first insert secured at the specified percentage of slope and with the second insert adjust and secure a slope of the pipe to the specified percentage of slope.

4. The slope adjusting pipe hanger bracket and insert, of claim 1 wherein the bracket comprises at least one channel; and the insert comprises at least one post; and wherein the at least one post of the insert is configured to be installed within the at least one channel to snap in or be wedged within to secure the insert to the bracket.

5. The slope adjusting pipe hanger bracket and insert, of claim 1 wherein the bracket comprises a central portion; and the insert comprises a hub; and wherein the hub of the insert is configured to be installed within the central portion of the bracket.

6. The slope adjusting pipe hanger bracket and insert, of claim 5 wherein the hub of the insert comprises the tongue and groove ridges and indentations that are configured to set the insert at the specified percentage of slope.

7. The slope adjusting pipe hanger bracket and insert, of claim 1 wherein the tongue and groove ridges and indentations of the bracket have a curvature and profile that matches the curvature and profile of the tongue and groove ridges and indentations of the insert thereby increasing the strength of the tongue and groove ridges and indentations and prevents voids or exposed areas between the bracket and insert and thereby preventing contaminants or bacteria build-up between the bracket and the insert.

8. The slope adjusting pipe hanger bracket and insert of claim 1 wherein the bracket having a semi-circular curvature along an interior surface having a dimension and surface area that matches an outer surface of the insert; and wherein the insert configured to be form fit to a matching curvature of the interior surface of the bracket.

9. The slope adjusting pipe hanger bracket and insert of claim 1 wherein the insert having a height that is longer than a radial distance of a curvature of the interior surface of the bracket, the insert configured to protrude from the bracket and be compressed to force the insert into the bracket at a desired percentage slope.

10. The slope adjusting pipe hanger bracket and insert of claim 1 wherein the insert having a height that is longer than a distance from a bottom of the bracket to a deepest point within a channel of the bracket, the insert configured to protrude from the bracket and be compressed to force the insert into the bracket at a desired percentage slope.

11. The slope adjusting pipe hanger bracket and insert of claim 1 wherein the bracket comprises contoured smooth exterior surfaces to prevent bacterial build-up and a collecting of contaminants in order to use the slope adjusting pipe hanger bracket and insert in a sterile clean room environment.

12. A slope adjusting pipe hanger, comprising:
two brackets, each bracket having tongue and groove ridges and indentations;
two inserts, each insert having tongue and groove ridges and indentations; and
wherein each insert configured to be adjusted within one of the two brackets to a specified percentage of slope to align to or match with a slope of a pipe;
and wherein the two brackets configured for attachment to align the pipe within the inserts at the specified percentage of slope and interlock the tongue and groove ridges and indentations of one of the inserts with the tongue and groove ridges and indentations of one of the two brackets; and
wherein the slope adjusting pipe hanger configured to secure the pipe at the specified percentage of slope for gravity drainage.

13. The slope adjusting pipe hanger of claim 12 wherein the two brackets are attached using bolts to align the pipe within the inserts at the specified percentage of slope as the bolts are loosely tightened and interlock the tongue and groove ridges and indentations of one of the inserts with the tongue and groove ridges and indentations of one of the two brackets as the bolts are fully tightened.

14. The slope adjusting pipe hanger of claim 12 comprising:
a channel within each bracket;
at least one post extending from an outer surface of the insert, and
wherein the at least one post of the insert configured to be installed within the channel and hold the insert within the bracket.

15. The slope adjusting pipe hanger of claim 14 wherein the inserts are configured to pivot within the channel of the bracket to provide for an adjustment of an angle of the insert to align with the pipe at the specified percentage of slope as the bolts are loosely tightened and interlock the tongue and groove ridges and indentations of an insert with the tongue and groove ridges and indentations of a bracket as the bolts are fully tightened.

16. The slope adjusting pipe hanger of claim 14 wherein the inserts are configured to pivot within the channel of the bracket to provide for an adjustment of an angle of the insert to align with the specified percentage of slope.

17. The slope adjusting pipe hanger of claim 14 wherein the channel comprises the tongue and groove ridges and indentations that are configured to interlock with the tongue and groove ridges and indentations of the insert.

18. The slope adjusting pipe hanger of claim 12 wherein the insert comprises a hub, the hub providing a location for the tongue and groove ridges and indentations of the insert.

19. The slope adjusting pipe hanger of claim 12 wherein an interlocking of the tongue and groove ridges and indentations of the insert and the bracket prevent voids or exposed areas and thereby prevent contaminants or bacteria build-up between the two brackets and the inserts.

20. The slope adjusting pipe hanger of claim 12 wherein the two brackets comprise contoured smooth exterior surfaces to prevent bacterial build-up and the collecting of contaminants in order to use the slope adjusting pipe hanger in a sterile clean room environment.

* * * * *